(12) United States Patent
Kodera et al.

(10) Patent No.: US 11,964,709 B2
(45) Date of Patent: Apr. 23, 2024

(54) STEERING CONTROL DEVICE

(71) Applicants: JTEKT CORPORATION, Kariya (JP);
TOYOTA JIDOSHA KABUSHIKI KAISHA, Toyota (JP)

(72) Inventors: Takashi Kodera, Okazaki (JP); Toru Takashima, Susono (JP)

(73) Assignees: JTEKT CORPORATION, Kariya (JP);
TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 17/478,562

(22) Filed: Sep. 17, 2021

(65) Prior Publication Data

US 2022/0089214 A1   Mar. 24, 2022

(30) Foreign Application Priority Data

Sep. 24, 2020   (JP) ................................ 2020-159589

(51) Int. Cl.
*B62D 5/04*   (2006.01)
*B62D 6/00*   (2006.01)

(52) U.S. Cl.
CPC ............ *B62D 5/0463* (2013.01); *B62D 6/00* (2013.01)

(58) Field of Classification Search
None
See application file for complete search history.

(56) References Cited

U.S. PATENT DOCUMENTS 11,214,295 B2 * 1/2022 Morino ................. B62D 6/002
11,377,141 B2 * 7/2022 Kitazume ............. B62D 5/0463
2004/0104066 A1 * 6/2004 Sakai ..................... B62D 6/008
  180/402
2018/0281851 A1 * 10/2018 Maeda ................. B62D 5/0493
2019/0233000 A1   8/2019 Matsuda et al.

FOREIGN PATENT DOCUMENTS

| JP | 2004-130971 A |   | 4/2004 |
| JP | 2005041416 A | * | 2/2005 |
| JP | 2013-209026 A |   | 10/2013 |
| JP | 2019043391 A | * | 3/2019 |
| JP | 2019-127237 A |   | 8/2019 |
| WO | 2019/193976 A1 |   | 10/2019 |

OTHER PUBLICATIONS

Machine translation of Shirato et al. (JP 2005041416) (Year: 2024).*
Machine translation of Ito (JP 2019043391) (Year: 2024).*
Feb. 1, 2022 Search Report issued in European Patent Application No. 21197995.0.

* cited by examiner

*Primary Examiner* — Todd Melton
*Assistant Examiner* — Sarah A. Mueller
(74) *Attorney, Agent, or Firm* — Oliff PLC

(57) ABSTRACT

A steering control device controls a reaction motor that generates a steering reaction force applied to a steering wheel of which power transmission to and from turning wheels is cut off. the steering control device includes: a first processor configured to change a virtual operation range of the steering wheel according to a steering state or a vehicle state by controlling the reaction motor; and a second processor configured to change a degree of change of the virtual operation range of the steering wheel according to the steering state or the vehicle state when an operation position of the steering wheel reaches a position in a vicinity of a limit position of the virtual operation range.

5 Claims, 16 Drawing Sheets

DECELERATION                ACCELERATION

STEERING CONTROL DEVICE

CROSS-REFERENCE TO RELATED APPLICATION

This application claims priority to Japanese Patent Application No. 2020-159589 filed on Sep. 24, 2020, incorporated herein by reference in its entirety.

BACKGROUND

1. Technical Field

The disclosure relates to a steering control device.

2. Description of Related Art

A so-called steer-by-wire steering system in which a power transmission path between a steering wheel and turning wheels is cut off is known. This steering system includes a reaction motor that is a source of a steering reaction force which is applied to a steering shaft and a turning motor that is a source of a turning force for turning the turning wheels. When a vehicle is traveling, a control device for the steering system generates a steering reaction force using the reaction motor and turns the turning wheels using the turning motor. There is demand for improvement in the steering characteristics of such a steering system.

For example, a control device described in Japanese Unexamined Patent Application Publication No. 2013-209026 (JP 2013-209026 A) changes a steering angle ratio according to a vehicle speed in view of improvement in steering characteristics. The steering angle ratio is a ratio of a turning angle of turning wheels to a steering angle of a steering wheel. The steering angle ratio is set to become a larger value as the vehicle speed increases. As the steering angle ratio decreases, the turning angle of the turning wheels when the steering wheel is operated changes more quickly. As the steering angle ratio increases, the turning angle of the turning wheels when the steering wheel is operated changes more slowly.

Accordingly, when a vehicle enters a garage or the like in a low speed area, a larger amount of turning is acquired with respect to an amount of steering of the steering wheel and thus operability for the vehicle is secured. When a vehicle performs lane change or the like in a high speed area, the amount of turning becomes smaller with respect to the amount of steering of the steering wheel and thus driving stability of the vehicle is secured.

A control device described in Japanese Unexamined Patent Application Publication No. 2004-130971 (JP 2004-130971 A) has a function of virtually limiting an operation range of a steering wheel. The control device rapidly increases a steering reaction force which is generated by a reaction motor when a steering angle of a steering wheel reaches a threshold value. When the steering reaction force is rapidly increased, a driver has difficulty in operating the steering wheel in a direction in which the absolute value of the steering angle increases. Accordingly, the operation range of the steering wheel can be virtually changed.

The control device described in JP 2004-130971 A changes an allowable range of the steering angle (that is, threshold values which are an upper limit value and a lower limit value of the allowable range) in addition to a steering angle ratio based on a vehicle speed. For example, at the time of traveling at a high speed, the control device limits the allowable range of the steering angle such that it narrows and sets the value of the steering angle ratio (=amount of turning/amount of steering) to a larger value. At the time of traveling at a high speed, since excessive or sudden steering is prevented, it is possible to more stably realize a comfortable feeling of steering. For example, at the time of steering during parking, entrance to a garage, or the like which is often performed at a very low speed, the control device described in JP 2004-130971 A limits the allowable range of the steering angle such that it narrows and sets the value of the steering angle ratio to a smaller value. The turning wheels can be turned by a larger amount with a smaller amount of steering.

SUMMARY

In general control devices in the related art having a function of changing an allowable range of a steering angle according to a vehicle speed, which includes the control device described in JP 2004-130971 A, there is the following concern. For example, when a vehicle is decelerated or accelerated in a state in which an operation position of a steering wheel has reached a limit position of a virtual operation range thereof, the limit position of the virtual operation range changes with change of a vehicle speed. Accordingly, there is concern about occurrence of steering behavior which is not intended by a driver.

For example, when the vehicle is decelerated in a state in which the operation position of the steering wheel has reached the limit position of the virtual operation range thereof, the operation range of the steering wheel narrows with decrease in vehicle speed. It is conceivable that the steering wheel will be rotated such that it is pushed back in a direction opposite to a current steering direction due to a steering reaction force which is generated at the time of narrowing of the operation range. A driver may feel discomfort (a feeling of being repelled) because the steering wheel is unintentionally pushed back.

When the vehicle is accelerated in a state in which the operation position of the steering wheel has reached the limit position of the virtual operation range thereof, the operation range of the steering wheel broadens with increase in vehicle speed. That is, since the current limit position of the operation range does not serve as a limit any more, the steering wheel can be steered further in the current steering direction. A driver may feel a so-called feeling of steering error because the driver does not feel a steering reaction force via the steering wheel as a response.

The disclosure provides a steering control device that can curb change of a feeling of steering which is not intended by a driver.

According to an aspect of the disclosure, there is provided a steering control device. The steering control device controls a reaction motor that generates a steering reaction force applied to a steering wheel of which power transmission to and from turning wheels is cut off. The steering control device includes: a first processor configured to change a virtual operation range of the steering wheel according to a steering state or a vehicle state by controlling the reaction motor; and a second processor configured to change a degree of change of the virtual operation range of the steering wheel according to the steering state or the vehicle state when an operation position of the steering wheel reaches a position in a vicinity of a limit position of the virtual operation range.

With this configuration, the virtual operation range of the steering wheel is more appropriately changed according to the steering state or the vehicle state. Accordingly, it is possible to curb change of steering behavior which is not intended by a driver.

In the steering control device, the first processor may be configured to calculate a limit value of the virtual operation range of the steering wheel according to a value of a vehicle speed. The second processor may be configured to fix the value of the vehicle speed which is used to calculate the limit value when the operation position of the steering wheel reaches the position in the vicinity of the limit position of the virtual operation range.

With this configuration, when the operation position of the steering wheel reaches a position in the vicinity of the limit position of the virtual operation range, the value of the vehicle speed which is used to calculate the limit value of the virtual operation range of the steering wheel is fixed. Accordingly, the limit value of the virtual operation range of the steering wheel cannot be changed with actual change of the vehicle speed. As a result, it is possible to curb change of steering behavior which is not intended by a driver.

In the steering control device, the first processor may be configured to calculate a limit value of the virtual operation range of the steering wheel by dividing a rotation angle of a shaft which rotates with a turning operation of the turning wheels by a speed increasing ratio between the steering wheel and the shaft which is calculated based on a vehicle speed. The second processor may be configured to limit a change per unit time of the speed increasing ratio which is used to calculate the limit value when the operation position of the steering wheel reaches the position in the vicinity of the limit position of the virtual operation range.

With this configuration, when the operation position of the steering wheel reaches a position in the vicinity of the limit position of the virtual operation range, a change per unit time of the speed increasing ratio which is used to calculate the limit value of the virtual operation range of the steering wheel is limited. Accordingly, it is possible to slow down a degree of change of the limit value of the virtual operation range of the steering wheel with respect to actual change of the vehicle speed. As a result, it is possible to curb change of steering behavior which is not intended by a driver.

In the steering control device, the first processor may be configured to calculate a limit value of the virtual operation range of the steering wheel according to a value of a vehicle speed. The second processor may be configured to limit a change per unit time of the limit value calculated by the first processor when the steering wheel is held at a constant steering angle with respect to a neutral position thereof.

With this configuration, when the steering wheel is held at a constant steering angle with respect to the neutral position thereof, the change per unit time of the limit value of the virtual operation range of the steering wheel which is calculated by the first processor is limited. Accordingly, it is possible to slow down a degree of change of the limit value of the virtual operation range of the steering wheel with respect to actual change of the vehicle speed. As a result, when the steering wheel is held at a constant steering angle with respect to the neutral position thereof, it is possible to curb change of steering behavior which is not intended by a driver.

The steering control device may further include a third processor configured to calculate a limiting axial force which is an axial force of a turning shaft that turns the turning wheels which is reflected in the steering reaction force to virtually limit the operation of the steering wheel based on a target rotation angle of a shaft which rotates with the operation of the turning shaft and a vehicle speed. The second processor may be configured to limit a change per unit time of the limiting axial force calculated by the third processor when the operation position of the steering wheel reaches the position in the vicinity of the limit position of the virtual operation range.

With this configuration, when the operation position of the steering wheel reaches a position in the vicinity of the limit position of the virtual operation range, the change per unit time of the limiting axial force which is calculated by the third processor is limited. Accordingly, it is possible to slow down a degree of change of the limiting axial force with respect to the actual change of the vehicle speed, that is, a degree of change of the steering reaction force with respect to the actual change of the vehicle speed. As a result, it is possible to curb change of steering behavior which is not intended by a driver.

In the steering control device, the second processor may be configured to slowly change the value of the vehicle speed which is used to calculate the limit value of the virtual operation range of the steering wheel to a current value of the vehicle speed which is detected by a vehicle speed sensor when the operation position of the steering wheel becomes distant from a position in the vicinity of the limit position of the virtual operation range.

With this configuration, when the limit value of the virtual operation range of the steering wheel is returned to an original limit value based on the current vehicle speed, sudden change of the limit value is curbed. Accordingly, it is possible to curb change of steering behavior which is not intended by a driver.

In the steering control device, the second processor may be configured to slowly change a value of the speed increasing ratio which is used to calculate a limit value of the virtual operation range of the steering wheel to a current value of the speed increasing ratio which is calculated by the first processor when the operation position of the steering wheel becomes distant from a position in the vicinity of the limit position of the virtual operation range.

With this configuration, when the limit value of the virtual operation range of the steering wheel is returned to an original limit value based on the current vehicle speed, sudden change of the limit value is curbed. Accordingly, it is possible to curb change of steering behavior which is not intended by a driver.

In the steering control device, the second processor may be configured to slowly change the limit value of the virtual operation range of the steering wheel to a current limit value which is calculated by the first processor when a state in which the steering wheel is held at the constant steering angle with respect to the neutral position thereof is released.

With this configuration, when the limit value of the virtual operation range of the steering wheel is returned to an original limit value based on the current vehicle speed, sudden change of the limit value is curbed. Accordingly, it is possible to curb change of steering behavior which is not intended by a driver.

In the steering control device, the second processor may be configured to slowly change a value of the limiting axial force which is reflected in the steering reaction force to the current limiting axial force which is calculated by the third processor when the operation position of the steering wheel becomes distant from the position in the vicinity of the limit position of the virtual operation range.

With this configuration, when the value of the limiting axial force which is reflected in the steering reaction force is returned to the original value of the limiting axial force value based on the current vehicle speed, sudden change of the limiting axial force is curbed. Accordingly, it is possible to curb change of steering behavior which is not intended by a driver.

With the steering control device according to the disclosure, it is possible to curb change of a feeling of steering which is not intended by a driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment in which a steering control device is applied to a steer-by-wire steering system will be described.

Figure 1:
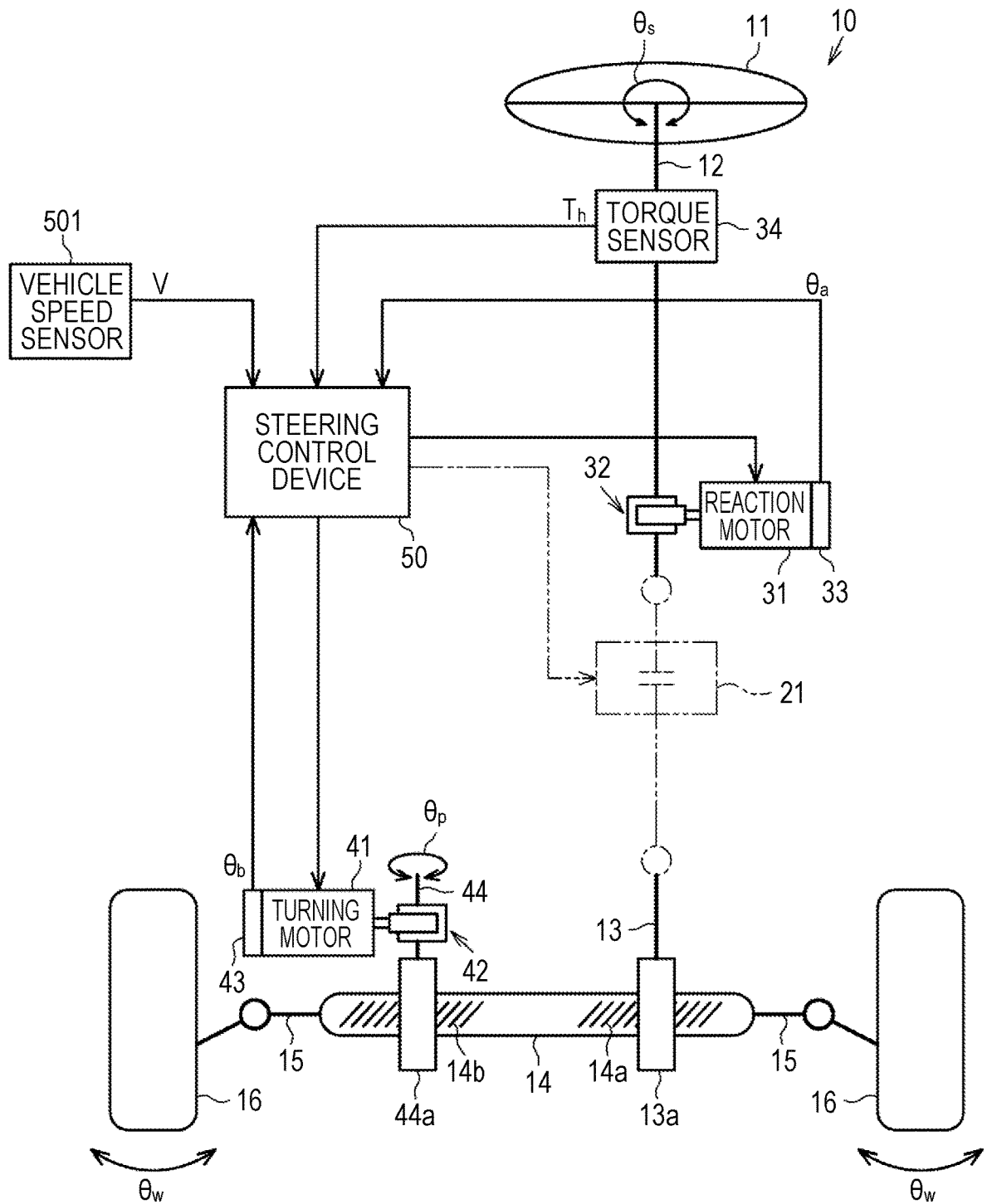
FIG. 1 is a diagram illustrating a configuration of a steer-by-wire steering system in which a steering control device according to a first embodiment is mounted.

As illustrated in FIG. 1, a steering system 10 of a vehicle includes a steering shaft 12 that is connected to a steering wheel 11. The steering system 10 includes a turning shaft 14 that extends in a vehicle width direction (in a right-left direction in FIG. 1). Right and left turning wheels 16 and 16 are connected to both ends of the turning shaft 14 via tie rods 15 and 15. When the turning shaft 14 moves linearly, a turning angle $\theta_w$ of the turning wheels 16 and 16 is changed. The steering shaft 12 and the turning shaft 14 constitute a steering mechanism of the vehicle.

The steering system 10 includes a reaction motor 31, a reduction gear mechanism 32, a rotation angle sensor 33, and a torque sensor 34 as a configuration for generating a steering reaction force. A steering reaction force is a force which acts in a direction opposite to an operating direction of the steering wheel 11 which is operated by a driver. An appropriate feeling of response can be given to the driver by applying the steering reaction force to the steering wheel 11.

The reaction motor 31 is a source of the steering reaction force. For example, a three-phase brushless motor is employed as the reaction motor 31. The reaction motor 31 (accurately, a rotation shaft thereof) is connected to the steering shaft 12 via the reduction gear mechanism 32. A torque of the reaction motor 31 is applied as a steering reaction force to the steering shaft 12.

The rotation angle sensor 33 is provided in the reaction motor 31. The rotation angle sensor 33 detects a rotation angle $\theta_a$ of the reaction motor 31. The rotation angle $\theta_a$ of the reaction motor 31 is used to calculate a steering angle $\theta_s$. The reaction motor 31 and the steering shaft 12 interlock with each other via the reduction gear mechanism 32. Accordingly, the rotation angle $\theta_a$ of the reaction motor 31 and the rotation angle of the steering shaft 12, that is, the steering angle $\theta_s$ which is a rotation angle of the steering wheel 11, have a correlation therebetween. As a result, the steering angle $\theta_s$ can be calculated based on the rotation angle $\theta_a$ of the reaction motor 31.

The torque sensor 34 detects a steering torque $T_h$ which is a torque applied to the steering shaft 12 through a rotating operation of the steering wheel 11. The torque sensor 34 detects the steering torque $T_h$ applied to the steering shaft 12 based on an amount of torsion of a torsion bar which is provided in the middle of the steering shaft 12. The torque sensor 34 is provided on the steering wheel 11 side of the reduction gear mechanism 32 in the steering shaft 12.

The steering system 10 includes a turning motor 41, a reduction gear mechanism 42, and a rotation angle sensor 43 as a configuration for generating a turning force which is power for turning the turning wheels 16 and 16.

The turning motor 41 is a source of the turning force. For example, a three-phase brushless motor is employed as the turning motor 41. A rotation shaft of the turning motor 41 is connected to a pinion shaft 44 via the reduction gear mechanism 42. Pinion teeth 44a of the pinion shaft 44 engage with rack teeth 14b of the turning shaft 14. A torque of the turning motor 41 is applied as a turning force to the turning shaft 14 via the pinion shaft 44. With rotation of the turning motor 41, the turning shaft 14 moves in a vehicle width direction which is a right-left direction in FIG. 1.

The rotation angle sensor 43 is provided in the turning motor 41. The rotation angle sensor 43 detects a rotation angle $\theta_b$ of the turning motor 41. The steering system 10 includes a pinion shaft 13. The pinion shaft 13 is provided to cross the turning shaft 14. Pinion teeth 13a of the pinion shaft 13 engage with the rack teeth 14a of the turning shaft 14. The reason the pinion shaft 13 is provided is that the turning shaft 14 along with the pinion shaft 44 can be supported in a housing which is not illustrated. That is, by a support mechanism (not illustrated) which is provided in the steering system 10, the turning shaft 14 is supported to be movable in an axial direction thereof and is pressed toward the pinion shafts 13 and 44. Accordingly, the turning shaft 14 is supported in the housing. Another support mechanism that supports the turning shaft 14 in the housing without using the pinion shaft 13 may be provided.

The steering system 10 includes a control device 50. The control device 50 controls the reaction motor 31 and the turning motor 41 based on results of detection from various sensors which are provided in the vehicle. Examples of the various sensors include a vehicle speed sensor 501 in addition to the rotation angle sensor 33, the torque sensor 34, and the rotation angle sensor 43. The vehicle speed sensor 501 detects a vehicle speed V which is a traveling speed of the vehicle.

The control device 50 performs reaction control such that a steering reaction force based on the steering torque $T_h$ is generated through drive control of the reaction motor 31. The control device 50 calculates a target steering reaction force based on the steering torque $T_h$ and the vehicle speed V and calculates a steering reaction force command value based on the calculated target steering reaction force. The control device 50 supplies a current required for generating a steering reaction force corresponding to the steering reaction force command value to the reaction motor 31.

The control device 50 performs turning control such that the turning wheels 16 and 16 are turned according to a steering state through drive control of the turning motor 41. The control device 50 calculates a pinion angle $\theta_p$ which is an actual rotation angle of the pinion shaft 44 based on a rotation angle $\theta_b$ of the turning motor 41 which is detected by the rotation angle sensor 43. The pinion angle $\theta_p$ is a value in which a turning angle $\theta_w$ of the turning wheels 16 and 16 is reflected. The control device 50 calculates a steering angle $\theta_s$ based on a rotation angle $\theta_a$ of the reaction motor 31 which is detected by the rotation angle sensor 33 and calculates a target pinion angle which is a target value of the pinion angle $\theta_p$ based on the calculated steering angle $\theta_s$. The control device 50 calculates a difference between the target pinion angle and the actual pinion angle $\theta_p$, and controls supply of electric power to the turning motor 41 such that the difference is cancelled out.

Figure 2:
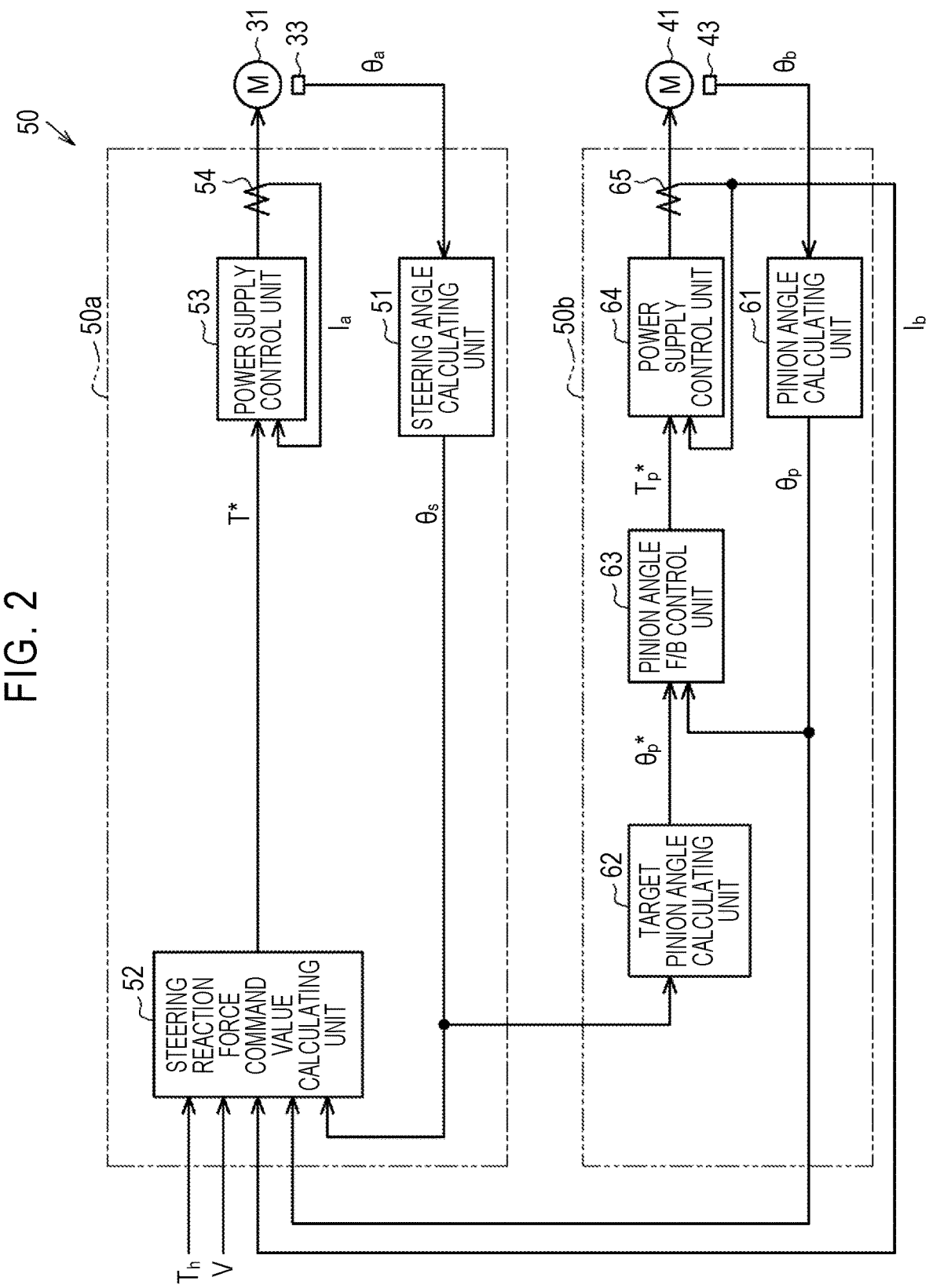
FIG. 2 is a block diagram illustrating a control device according to the first embodiment.

The control device 50 will be described below in detail. As illustrated in FIG. 2, the control device 50 includes a reaction control unit 50a that performs reaction control and a turning control unit 50b that performs turning control.

The reaction control unit 50a includes a steering angle calculating unit 51, a steering reaction force command value calculating unit 52, and a power supply control unit 53. The steering angle calculating unit 51 calculates a steering angle $\theta_s$ of the steering wheel 11 based on the rotation angle $\theta_a$ of the reaction motor 31 which is detected by the rotation angle sensor 33.

The steering reaction force command value calculating unit 52 calculates a steering reaction force command value $T^*$ based on the steering torque $T_h$ and the vehicle speed V. The steering reaction force command value calculating unit 52 calculates the steering reaction force command value $T^*$ such that an absolute value thereof becomes larger as an absolute value of the steering torque $T_h$ becomes larger and the vehicle speed V becomes lower. Details of the steering reaction force command value calculating unit 52 will be described later.

The power supply control unit 53 supplies electric power corresponding to the steering reaction force command value $T^*$ to the reaction motor 31. Specifically, the power supply control unit 53 calculates a current command value for the reaction motor 31 based on the steering reaction force command value $T^*$. The power supply control unit 53 detects a value of an actual current $I_a$ which is generated in a power supply path for the reaction motor 31 using a current sensor 54 which is provided in the power supply path. The value of the current $I_a$ is a value of an actual current which is supplied to the reaction motor 31. The power supply control unit 53 calculates a difference between the current command value and the value of the actual current $I_a$ and controls supply of electric power to the reaction motor 31 such that the difference is cancelled out. Accordingly, the reaction motor 31 generates a torque corresponding to the steering reaction force command value $T^*$. As a result, it is possible to give an appropriate feeling of response based on a road reaction force to a driver.

The turning control unit 50b includes a pinion angle calculating unit 61, a target pinion angle calculating unit 62, a pinion angle feedback control unit 63, and a power supply control unit 64. The pinion angle calculating unit 61 calculates a pinion angle $\theta_p$ which is an actual rotation angle of the pinion shaft 44 based on the rotation angle $\theta_b$ of the turning motor 41 which is detected by the rotation angle sensor 43. The turning motor 41 and the pinion shaft 44 interlock with each other via the reduction gear mechanism 42. Accordingly, there is a correlation between the rotation angle $\theta_b$ of the turning motor 41 and the pinion angle $\theta_p$. The pinion angle $\theta_p$ can be calculated from the rotation angle $\theta_b$ of the turning motor 41 using the correlation. The pinion shaft 44 engages with the turning shaft 14. Accordingly, there is also a correlation between the pinion angle $\theta_p$ and an amount of shift of the turning shaft 14. That is, the pinion angle $\theta_p$ is a value in which the turning angle $\theta_w$ of the turning wheels 16 and 16 is reflected.

The target pinion angle calculating unit 62 calculates a target pinion angle $\theta_p^*$ based on the steering angle $\theta_s$ calculated by the steering angle calculating unit 51 and the vehicle speed V detected by the vehicle speed sensor 501. For example, the target pinion angle calculating unit 62 sets a steering angle ratio which is a ratio of the turning angle $\theta_w$ to the steering angle $\theta_s$ according to the vehicle speed V and calculates the target pinion angle $\theta_p^*$ based on the set steering angle ratio. The target pinion angle calculating unit 62 calculates the target pinion angle $\theta_p^*$ such that the turning angle $\theta_w$ relative to the steering angle $\theta_s$ becomes larger as the vehicle speed V becomes lower and the turning angle $\theta_w$ relative to the steering angle $\theta_s$ becomes smaller as the vehicle speed V becomes higher. In order to realize the steering angle ratio which is set according to the vehicle speed V, the target pinion angle calculating unit 62 calculates a corrected angle for the steering angle $\theta_s$ and calculates the target pinion angle $\theta_p*$ based on the steering angle ratio by adding the calculated corrected angle to the steering angle $\theta_s$.

Figure 3:
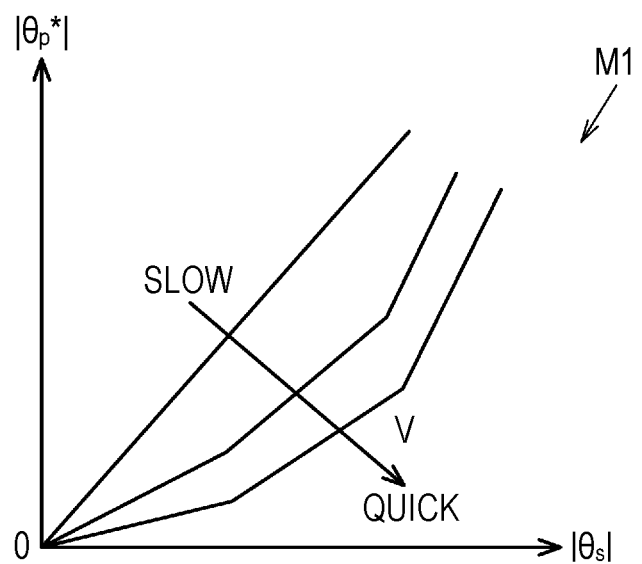
FIG. 3 is a graph illustrating a map for defining a relationship between a steering angle and a target pinion angle based on a vehicle speed according to the first embodiment.

In this embodiment, the target pinion angle calculating unit 62 calculates the target pinion angle $\theta_p*$ using a map M1. The map M1 is stored in a storage device of the control device 50. As illustrated in the graph of FIG. 3, the map M1 is a three-dimensional map in which a relationship between the steering angle $\theta_s$ and the target pinion angle $\theta_p*$ is defined according to the vehicle speed V. The map M1 has the following characteristics. That is, the absolute value of the target pinion angle $\theta_p*$ becomes larger as the absolute value of the steering angle $\theta_s$ becomes larger and the vehicle speed V becomes lower.

As illustrated in FIG. 2, the pinion angle feedback control unit 63 receives the target pinion angle $\theta_p*$ calculated by the target pinion angle calculating unit 62 and the actual pinion angle $\theta_p$ calculated by the pinion angle calculating unit 61. The pinion angle feedback control unit 63 calculates a pinion angle command value $T_p*$ through feedback control of the pinion angle $\theta_p$ such that the actual pinion angle $\theta_p$ conforms to the target pinion angle $\theta_p*$.

The power supply control unit 64 supplies electric power corresponding to the pinion angle command value $T_p*$ to the turning motor 41. Specifically, the power supply control unit 64 calculates a current command value for the turning motor 41 based on the pinion angle command value $T_p*$. The power supply control unit 64 detects a value of an actual current $I_b$ which is generated in a power supply path for the turning motor 41 using a current sensor 65 which is provided in the power supply path. The value of the current $I_b$ is a value of an actual current which is supplied to the turning motor 41. The power supply control unit 64 calculates a difference between the current command value and the value of the actual current $I_b$ and controls supply of electric power to the turning motor 41 such that the difference is cancelled out. Accordingly, the turning motor 41 rotates by an angle corresponding to the pinion angle command value $T_p*$.

Since the target pinion angle $\theta_p*$ relative to the steering angle $\theta_s$ changes according to the vehicle speed V based on the map M1 illustrated in the graph of FIG. 3, the absolute value of the target pinion angle $\theta_p*$ becomes larger as the absolute value of the steering angle $\theta_s$ becomes larger and the vehicle speed V becomes lower. That is, the value of the steering angle ratio which is a ratio of the turning angle $\theta_w$ to the steering angle $\theta_s$ becomes larger as the vehicle speed V becomes higher, and becomes smaller as the vehicle speed V becomes lower.

As the value of the steering angle ratio becomes smaller, the turning angles $\theta_w$ and $\theta_w$ of the turning wheels 16 and 16 when the steering wheel 11 is operated change more quickly. Accordingly, for example, when the vehicle enters a garage or the like in a low speed area, a larger amount of turning is acquired with a smaller amount of steering and thus operability of the vehicle is secured. As the value of the steering angle ratio becomes larger, the turning angles $\theta_w$ and $\theta_w$ of the turning wheels 16 and 16 when the steering wheel 11 is operated change more slowly. Accordingly, for example, when the vehicle performs lane change or the like in a high speed area, driving stability of the vehicle is secured.

Figure 4:
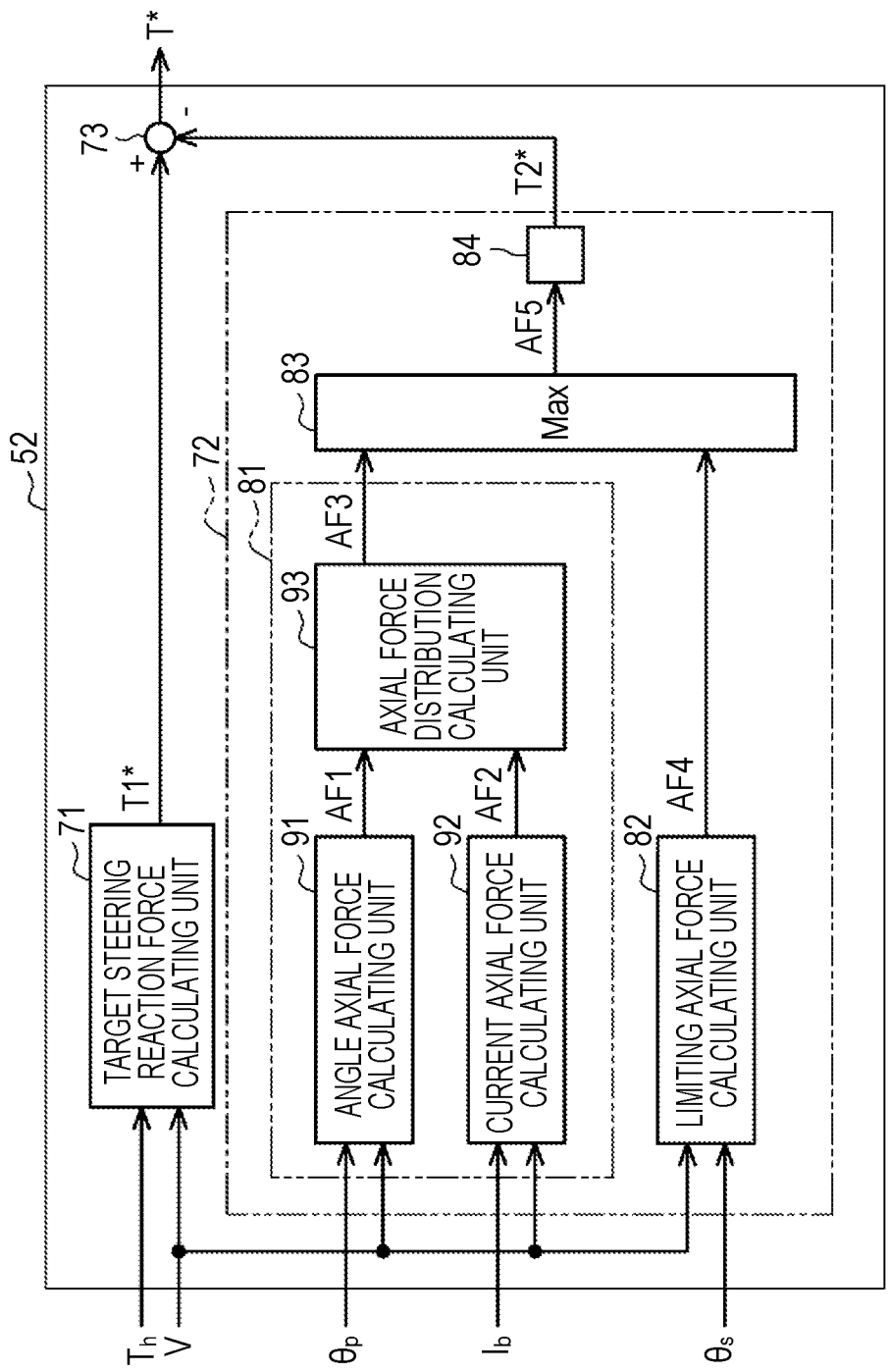
FIG. 4 is a block diagram illustrating a steering reaction force command value calculating unit according to the first embodiment.

The steering reaction force command value calculating unit 52 will be described below in detail. As illustrated in FIG. 4, the steering reaction force command value calculating unit 52 includes a target steering reaction force calculating unit 71, an axial force calculating unit 72, and a subtractor 73.

The target steering reaction force calculating unit 71 calculates a target steering reaction force T1* based on the steering torque $T_h$ and the vehicle speed V. The target steering reaction force T1* is a target value of a torque which is applied in a direction opposite to the operating direction of the steering wheel 11 and which is to be generated by the reaction motor 31. The target steering reaction force calculating unit 71 calculates the target steering reaction force T1* such that the absolute value thereof becomes larger as the absolute value of the steering torque $T_h$ becomes larger and the vehicle speed V becomes lower.

The axial force calculating unit 72 calculates an axial force which is applied to the turning shaft 14 based on the pinion angle $\theta_p$, the value of the current $I_b$ of the turning motor 41, the steering angle $\theta_s$, and the vehicle speed V and calculates a converted torque value (a steering reaction force based on the axial force) T2* obtained by converting the calculated axial force to a torque.

The subtractor 73 calculates a steering reaction force command value T* by subtracting the converted torque value T2* calculated by the axial force calculating unit 72 from the target steering reaction force T1* calculated by the target steering reaction force calculating unit 71.

The axial force calculating unit 72 will be described below in detail. As illustrated in FIG. 4, the axial force calculating unit 72 includes a combined axial force calculating unit 81, a limiting axial force calculating unit 82, a maximum value selecting unit 83, and a converter 84. The combined axial force calculating unit 81 includes an angle axial force calculating unit 91, a current axial force calculating unit 92, and an axial force distribution calculating unit 93.

The angle axial force calculating unit 91 calculates an angle axial force AF1 which is an ideal value of an axial force which is applied to the turning shaft 14 based on the pinion angle $\theta_p$. The angle axial force calculating unit 91 calculates the angle axial force AF1 using an angle axial force map which is stored in the storage device of the control device 50. The angle axial force map is a two-dimensional map with the pinion angle $\theta_p$ set for the horizontal axis and with the angle axial force AF1 set for the vertical axis and defines a relationship between the pinion angle $\theta_p$ and the angle axial force AF1 according to the vehicle speed V. The angle axial force map has the following characteristics. That is, the angle axial force AF1 is set such that the absolute value thereof becomes larger as the absolute value of the pinion angle $\theta_p$ becomes larger and the vehicle speed V becomes lower. With an increase of the absolute value of the pinion angle $\theta_p$, the absolute value of the angle axial force AF1 increases linearly. The angle axial force AF1 is set to the same sign as the sign of the pinion angle $\theta_p$. The angle axial force AF1 is an axial force in which a road surface state or a force acting on the turning shaft 14 is not reflected.

The current axial force calculating unit 92 calculates a current axial force AF2 which is applied to the turning shaft 14 based on the value of the current $I_b$ of the turning motor 41. Here, the value of the current $I_b$ of the turning motor 41 changes due to a difference between the target pinion angle $\theta_p*$ and the actual pinion angle $\theta_p$ due to application of a disturbance based on a road surface state such as a road surface frictional resistance to the turning wheels 16 and 16.

That is, the actual road surface state which is applied to the turning wheels 16 and 16 is reflected in the value of the current $I_b$ of the turning motor 41. Accordingly, an axial force in which an influence of a road surface state is reflected can be calculated based on the value of the current $I_b$ of the turning motor 41. The current axial force AF2 is calculated by multiplying the value of the current $I_b$ of the turning motor 41 by a gain which is a coefficient based on the vehicle speed V. The current axial force AF2 is an axial force in which a road surface state or a force acting on the turning shaft 14 via the turning wheels 16 and 16 is reflected.

The axial force distribution calculating unit 93 individually sets distribution proportions of the angle axial force AF1 and the current axial force AF2 based on various state variables in which vehicle behavior, a steering state, and a road surface state are reflected. The axial force distribution calculating unit 93 calculates a combined axial force AF3 by summing the values obtained by multiplying the angle axial force AF1 and the current axial force AF2 by the distribution proportions individually set therefor.

The distribution proportions may be set based on only the vehicle speed V which is one vehicle state variable. In this case, for example, as the vehicle speed V becomes higher, the distribution proportion for the angle axial force AF1 is set to an increasingly larger value and the distribution proportion for the current axial force AF2 is set to an increasingly smaller value. As the vehicle speed V becomes lower, the distribution proportion for the angle axial force AF1 is set to an increasingly smaller value and the distribution proportion for the current axial force AF2 is set to an increasingly larger value.

The limiting axial force calculating unit 82 calculates a limiting axial force AF4 for virtually limiting an operation range of the steering wheel 11 based on the pinion angle $\theta_p$. The limiting axial force AF4 is calculated based on a point of view for quickly increasing a torque in a direction opposite to the steering direction and generated by the reaction motor 31 when the operation position of the steering wheel 11 approaches a limit position of the operation range or when the turning shaft 14 approaches a limit position of a physical operation range thereof. The limit position of the operation range of the steering wheel 11 is determined, for example, by a length of a spiral cable which is provided in the steering wheel 11. The limit position of the physical operation range of the turning shaft 14 is a position at which a movable range of the turning shaft 14 is physically restricted due to occurrence of a so-called "end contact" in which a rack end which is an end of the turning shaft 14 comes into contact with a housing which is not illustrated. The limiting axial force AF4 is set to the same sign as the sign of the pinion angle $\theta_p$. Details of the limiting axial force calculating unit 82 will be described later.

The maximum value selecting unit 83 receives the combined axial force AF3 calculated by the combined axial force calculating unit 81 and the limiting axial force AF4 calculated by the limiting axial force calculating unit 82. The maximum value selecting unit 83 selects an axial force with the larger absolute value of the combined axial force AF3 and the limiting axial force AF4 which are received, and sets the selected combined axial force AF3 or the limiting axial force AF4 as a final axial force AF5 which is used to calculate the steering reaction force command value T*.

The converter 84 calculates a converted torque value T2* by converting the final axial force AF5 set by the maximum value selecting unit 83 to a torque. Here, when the operation position of the steering wheel 11 has not reached a position in the vicinity of the limit position of the operation range thereof or when the turning shaft 14 has not reached a position in the vicinity of the limit position of the physical operation range thereof and when the limiting axial force AF4 calculated by the limiting axial force calculating unit 82 is less than the combined axial force AF3 calculated by the combined axial force calculating unit 81, the combined axial force AF3 is set as the final axial force AF5. In this case, since the converted torque value T2* obtained by converting the final axial force AF5 to a torque is reflected in the steering reaction force command value T*, a steering reaction force based on the vehicle behavior or the road surface state can be applied to the steering wheel 11. A driver can feel the steering reaction force via the steering wheel 11 as a response and thus ascertain the vehicle behavior or the road surface state.

When the operation position of the steering wheel 11 approaches the limit position of the operation range thereof or when the turning shaft 14 approaches the limit position of the physical operation range thereof and when the limiting axial force AF4 calculated by the limiting axial force calculating unit 82 is larger than the combined axial force AF3 calculated by the combined axial force calculating unit 81, the limiting axial force AF4 is set as the final axial force AF5. In this case, since the converted torque value T2* obtained by converting the final axial force AF5 to a torque is reflected in the steering reaction force command value T*, the steering reaction force increases quickly. Accordingly, a driver has difficulty operating the steering wheel 11 in a direction in which the absolute value of the steering angle $\theta_s$ increases. As a result, the driver can feel a feeling of ending from the steering reaction force (response) and thus recognize that the steering wheel 11 has reached the limit position of the virtual operation range thereof.

Figure 5:
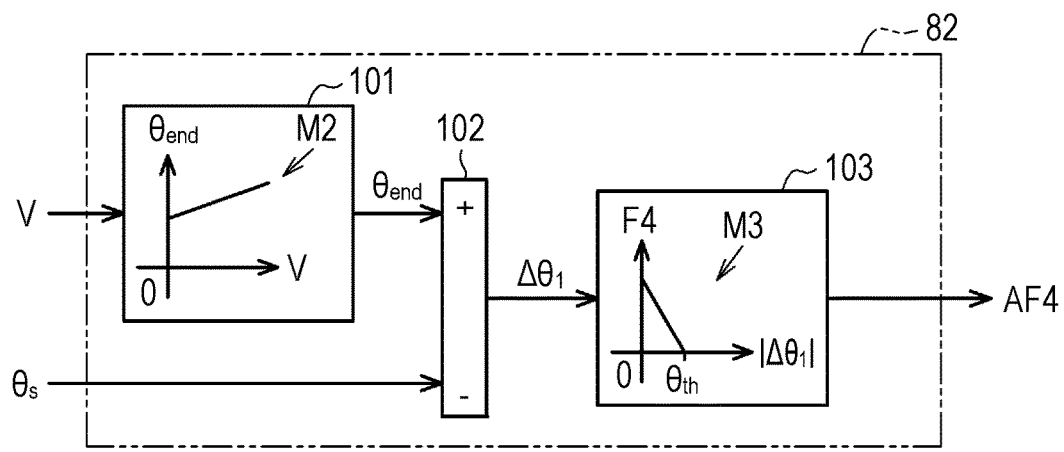
FIG. 5 is a block diagram illustrating a limiting axial force calculating unit according to the first embodiment.

The limiting axial force calculating unit 82 will be described below in detail. As illustrated in FIG. 5, the limiting axial force calculating unit 82 includes a steering end angle calculating unit 101, a subtractor 102, and an axial force calculating unit 103.

The steering end angle calculating unit 101 calculates a steering end angle $\theta_{end}$ according to the vehicle speed V. The steering end angle $\theta_{end}$ is a steering angle corresponding to the limit position of the virtual operation range of the steering wheel 11 or a pinion angle corresponding to the limit position of the physical operation range of the turning shaft 14. The steering end angle $\theta_{end}$ is set based on a value in the vicinity of the steering angle $\theta_s$ when the steering wheel 11 has reached the limit position of the operation range thereof or the pinion angle $\theta_p$ when the turning shaft 14 has reached the limit position of the operation range thereof.

In this embodiment, the steering end angle calculating unit 101 calculates the steering end angle $\theta_{end}$ using a map M2 which is stored in the storage device of the control device 50. The map M2 is a two-dimensional map with the vehicle speed V set for the horizontal axis and with the steering end angle $\theta_{end}$ set for the vertical axis and defines a relationship between the vehicle speed V and the steering end angle $\theta_{end}$. The map M2 has the following characteristics. That is, the absolute value of the steering end angle $\theta_{end}$ becomes larger as the vehicle speed V becomes higher.

The subtractor 102 calculates an angle difference $\Delta\theta_1$ by subtracting the steering angle $\theta_s$ calculated by the steering angle calculating unit 51 from the steering end angle $\theta_{end}$ calculated by the steering end angle calculating unit 101. In addition, the subtractor 102 may calculate the angle difference $\Delta\theta_1$ by subtracting the pinion angle $\theta_p$ calculated by the pinion angle calculating unit 61 from the steering end angle $\theta_{end}$.

The axial force calculating unit 103 calculates the limiting axial force AF4 based on the angle difference $\Delta\theta_1$ calculated by the subtractor 102. The axial force calculating unit 103 calculates the limiting axial force AF4 using a map M3 which is stored in the storage device of the control device 50. The map M3 is a two-dimensional map with the angle difference $\Delta\theta_1$ set for the horizontal axis and with the limiting axial force AF4 set for the vertical axis and defines a relationship between the angle difference $\Delta\theta_1$ and the limiting axial force AF4. The map M3 has the following characteristics. That is, when the absolute value of the angle difference $\Delta\theta_1$ is equal to or less than an end determination threshold value $\theta_p$, which is set with respect to "0," the limiting axial force AF4 is generated and the limiting axial force AF4 increases quickly in a direction in which the absolute value thereof increases with a decrease of the absolute value of the angle difference $\Delta\theta_1$ to "0." When the absolute value of the angle difference $\Delta\theta_1$ is greater than the end determination threshold value $\theta_{th}$, the value of the limiting axial force AF4 is maintained at "0." In addition, the limiting axial force AF4 is set to the same sign as the sign of the pinion angle $\theta_p$.

With this configuration, the virtual operation range of the steering wheel 11 is changed to a more appropriate operation range according to the vehicle speed V. Here, since the steering end angle $\theta_{end}$ which is the limit value of the virtual operation range of the steering wheel 11 is changed according to the vehicle speed V, there is concern as will be described below. That is, when the vehicle decelerates or accelerates in a state in which the operation position of the steering wheel 11 has reached the limit position of the virtual operation range thereof, the limit position of the virtual operation range changes with the change of the vehicle speed V. Accordingly, there is concern about occurrence of steering behavior which is not intended by a driver.

Figure 10:
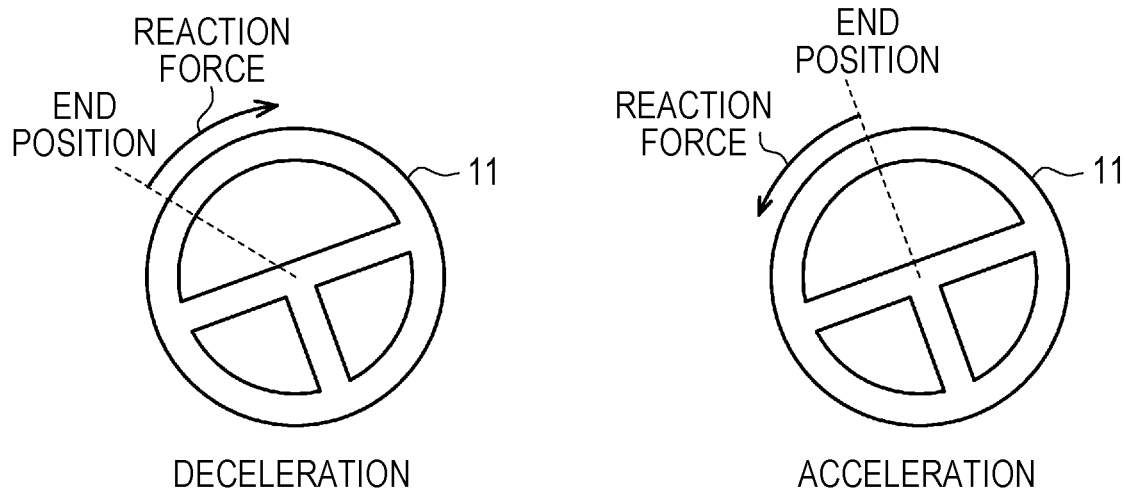
FIG. 10 is a front view of a steering wheel illustrating steering behavior in a vehicle in which the steering control device according to the first embodiment is mounted.

As illustrated in the left part of FIG. 10, for example, when the vehicle decelerates in a state in which the operation position of the steering wheel 11 has reached the limit position of the virtual operation range thereof, the operation range of the steering wheel 11 narrows with the decrease of the vehicle speed V. It is conceivable that the steering wheel 11 rotates such that it is pushed back in a direction opposite to the current steering direction due to a steering reaction force which is generated when the operation range narrows. A driver may feel discomfort (a feeling of being repelled) because the steering wheel 11 is unintentionally pushed back.

As illustrated in the right part of FIG. 10, when the vehicle accelerates in a state in which the operation position of the steering wheel 11 has reached the limit position of the virtual operation range thereof, the operation range of the steering wheel 11 broadens with the increase of the vehicle speed V. That is, since the current limit position of the operation range is not a limit any more, the steering wheel 11 can be additionally steered in the current steering direction. A driver does not feel a steering reaction force as a response via the steering wheel 11 and thus may feel a so-called feeling of steering error.

Figure 6:
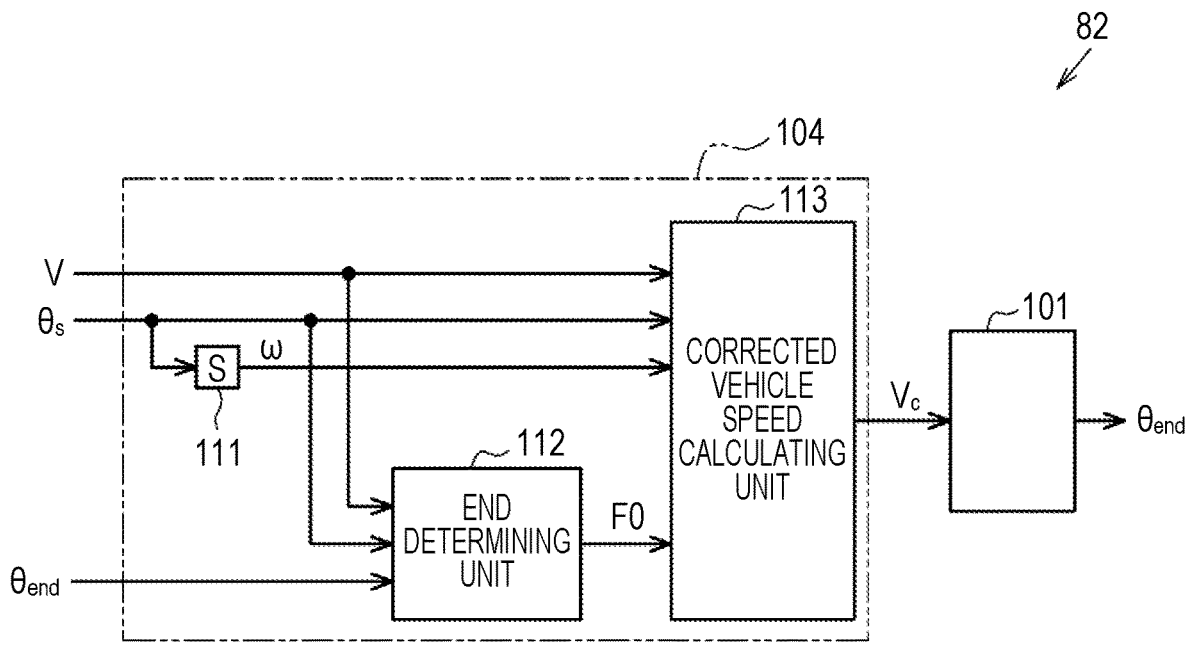
FIG. 6 is a block diagram illustrating a correction processing unit of the limiting axial force calculating unit according to the first embodiment.

Therefore, in this embodiment, the following configuration is employed as the limiting axial force calculating unit 82 such that occurrence of change in steering behavior which is not intended by a driver can be curbed. As illustrated in FIG. 6, the limiting axial force calculating unit 82 includes a correction processing unit 104 in addition to the steering end angle calculating unit 101, the subtractor 102, and the axial force calculating unit 103.

The correction processing unit 104 corrects the vehicle speed V detected by the vehicle speed sensor 501 according to the steering state of the steering wheel 11. The correction processing unit 104 includes a differentiator 111, an end determining unit 112, and a corrected vehicle speed calculating unit 113.

The differentiator 111 calculates a steering angular velocity $\omega$ by differentiating the steering angle $\theta_s$ calculated by the steering angle calculating unit 51. The end determining unit 112 receives the vehicle speed V detected by the vehicle speed sensor 501, the steering angle $\theta_s$ calculated by the steering angle calculating unit 51, and the steering end angle $\theta_{end}$ calculated by the steering end angle calculating unit 101, and determines whether the operation position of the steering wheel 11 has reached a position in the vicinity of the limit position of the virtual operation range thereof based on the vehicle speed V, the steering angle $\theta_s$, and the steering end angle $\theta_{end}$. The end determining unit 112 sets a value of a flag F0 as an end determination result indicating whether the operation position of the steering wheel 11 has reached the limit position of the operation range or a position in the vicinity thereof. Details of the end determining unit 112 will be described later.

The corrected vehicle speed calculating unit 113 receives the vehicle speed V detected by the vehicle speed sensor 501, the steering angle $\theta_s$ calculated by the steering angle calculating unit 51, the steering angular velocity $\omega$ calculated by the differentiator 111, and the value of the flag F0 set by the end determining unit 112. The corrected vehicle speed calculating unit 113 calculates a corrected vehicle speed $V_c$ by correcting the value of the vehicle speed V detected by the vehicle speed sensor 501 based on the vehicle speed V, the steering angle $\theta_s$, the steering angular velocity $\omega$, and the value of the flag F0. Details of the corrected vehicle speed calculating unit 113 will be described later.

The steering end angle calculating unit 101 receives the corrected vehicle speed $V_c$ which is the vehicle speed V corrected by the corrected vehicle speed calculating unit 113 and calculates the steering end angle $\theta_{end}$ based on the received corrected vehicle speed $V_c$.

Figure 7:
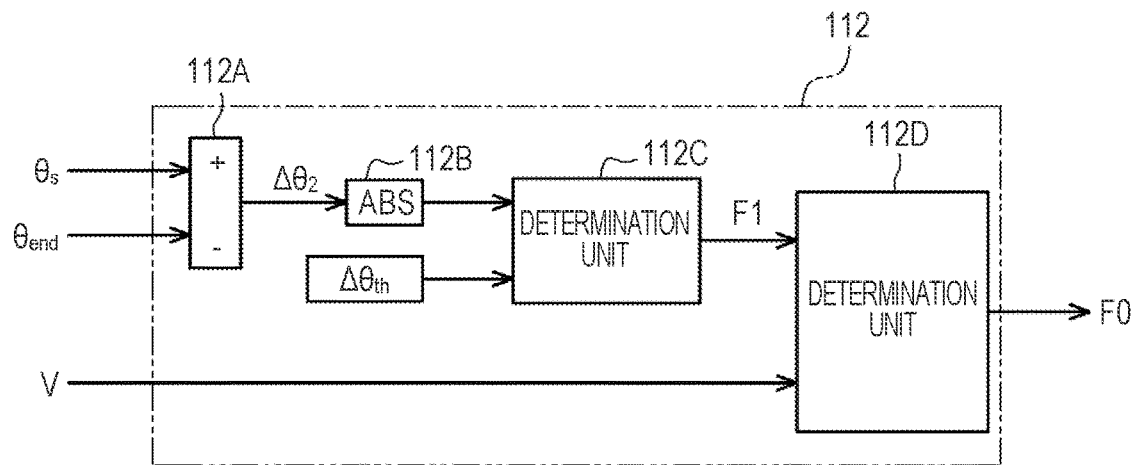
FIG. 7 is a block diagram illustrating an end determining unit according to the first embodiment.

The configuration of the end determining unit 112 will be described below in detail. As illustrated in FIG. 7, the end determining unit 112 includes a subtractor 112A, an absolute value calculating unit 112B, and two determination units 112C and 112D.

The subtractor 112A receives the steering angle $\theta_s$ calculated by the steering angle calculating unit 51 and the steering end angle $\theta_{end}$ calculated by the steering end angle calculating unit 101. The subtractor 112A calculates an angle difference $\Delta\theta_2$ by subtracting the steering end angle $\theta_{end}$ from the steering angle $\theta_s$.

The absolute value calculating unit 112B calculates an absolute value of the angle difference $\Delta\theta_2$ calculated by the subtractor 112A. The determination unit 112C receives the absolute value of the angle difference $\Delta\theta_2$ calculated by the absolute value calculating unit 112B and an angle difference threshold value $\Delta\theta_{th}$ stored in a storage device of the vehicle. The angle difference threshold value $\Delta\theta_{th}$ is set based on a point of view for determining whether the operation position of the steering wheel 11 has reached the vicinity of the limit position of the virtual operation range. When the absolute value of the angle difference $\Delta\theta_2$ is less than the angle difference threshold value MA, the determination unit 112C determines that the operation position of the steering wheel 11 has reached the vicinity of the limit position of the virtual operation range and sets a value of a flag F1 to "1." When the absolute value of the angle difference $\Delta\theta_2$ is equal to or greater than the angle difference threshold value $\Delta\theta_{th}$, the determination unit 112C determines that the operation position of the steering wheel 11 has not reached the vicinity of the limit position of the virtual operation range and sets the value of the flag F1 to "0."

The determination unit 112D receives the value of the flag F1 set by the determination unit 112C and the vehicle speed V detected by the vehicle speed sensor 501. When the value of the flag F1 is "0" or when the vehicle speed V is equal to or higher than a vehicle speed threshold value, the determination unit 112D sets the value of the flag F0 as an end determination result to "0." For example, when the value of the flag F1 is "1" and the vehicle speed V is lower than the vehicle speed threshold value, the determination unit 112D sets the value of the flag F0 as the end determination result to "1."

The end determining unit 112 may determine whether the operation position of the steering wheel 11 has reached the vicinity of the limit position of the virtual operation range without using the vehicle speed V. In this case, a configuration in which the determination unit 112D is omitted may be employed as the end determining unit 112. The flag F1 set by the determination unit 112C is the flag F0 as the end determination result.

Figure 8:
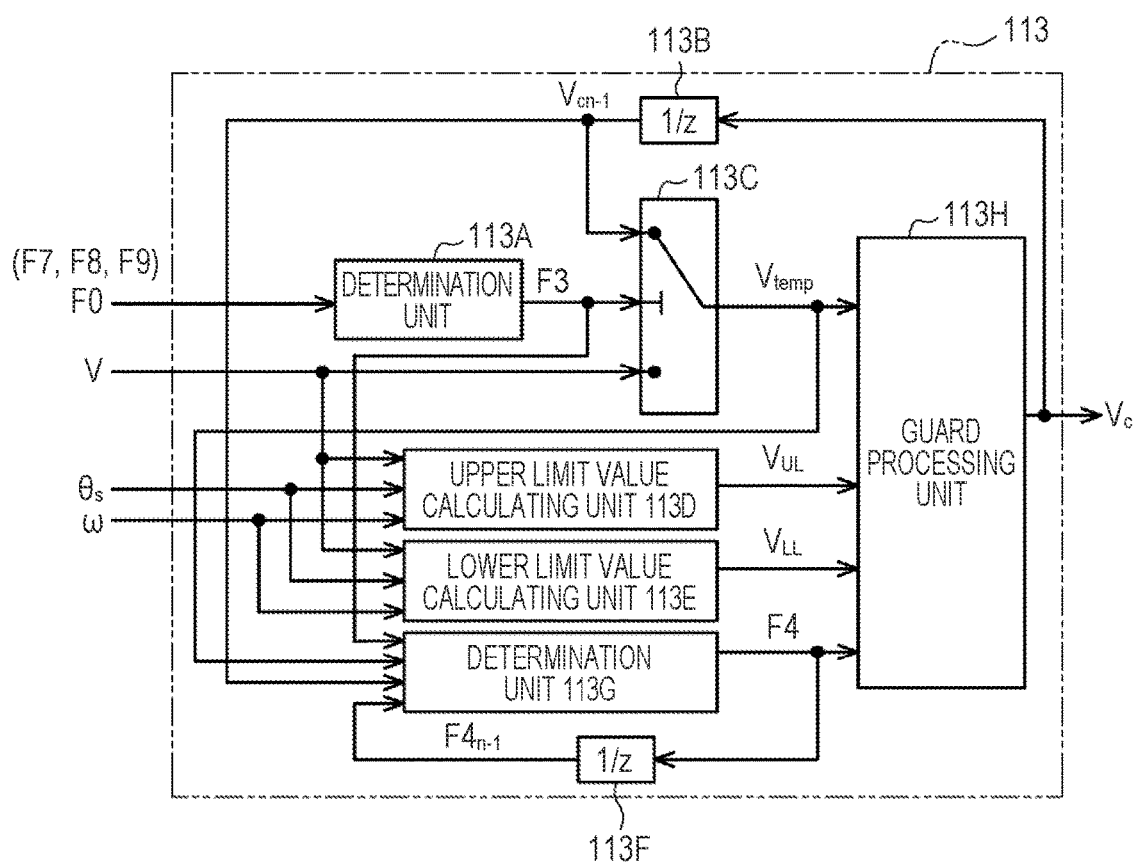
FIG. 8 is a block diagram illustrating a corrected vehicle speed calculating unit according to the first embodiment.

The configuration of the corrected vehicle speed calculating unit 113 will be described below in detail. As illustrated in FIG. 8, the corrected vehicle speed calculating unit 113 includes a determination unit 113A, a previous value storage unit 113B, a switch 113C, an upper limit value calculating unit 113D, a lower limit value calculating unit 113E, a previous value storage unit 113F, a determination unit 113G, and a guard processing unit 113H.

The determination unit 113A receives the value of the flag F0 set by the end determining unit 112 and sets a value of a flag F3 indicating whether the value of the vehicle speed V which is used to calculate the target pinion angle $\theta_p^*$ is to be fixed according to the received value of the flag F0. When the value of the flag F0 is "1," that is, when the steering wheel 11 is held at a constant steering angle $\theta_s$, the determination unit 113A determines that the value of the vehicle speed V which is used to calculate the target pinion angle $\theta_p^*$ is to be fixed and sets the value of the flag F3 to "1." When the value of the flag F0 is "0," that is, when the steering wheel 11 is not held at a constant steering angle $\theta_s$, the determination unit 113A determines that the value of the vehicle speed V which is used to calculate the target pinion angle $\theta_p^*$ is not to be fixed and sets the value of the flag F3 to "0."

The previous value storage unit 113B receives the corrected vehicle speed $V_c$ calculated by the guard processing unit 113H which will be described later and stores the received corrected vehicle speed $V_c$. The guard processing unit 113H calculates the corrected vehicle speed $V_c$ at intervals of a predetermined operation cycle, and the corrected vehicle speed $V_c$ stored in the previous value storage unit 113B is updated whenever the corrected vehicle speed $V_c$ is calculated by the guard processing unit 113H. That is, the corrected vehicle speed $V_c$ stored in the previous value storage unit 113B is a previous value of a current value of the corrected vehicle speed $V_c$ (the corrected vehicle speed $V_c$ before one operation cycle) calculated by the guard processing unit 113H.

The switch 113C receives the vehicle speed V detected by the vehicle speed sensor 501 and a previous value $V_{cn-1}$ of the corrected vehicle speed $V_c$ stored in the previous value storage unit 113B as data inputs. The switch 113C receives the value of the flag F3 set by the determination unit 113A as a control input. The switch 113C selects one of the vehicle speed V detected by the vehicle speed sensor 501 and the previous value $V_{cn-11}$ of the corrected vehicle speed $V_c$ stored in the previous value storage unit 113B as a temporary vehicle speed value $V_{temp}$ based on the value of the flag F3. When the value of the flag F3 is "0," the switch 113C selects the vehicle speed V detected by the vehicle speed sensor 501 as the temporary vehicle speed value $V_{temp}$. When the value of the flag F3 is "1" (more accurately when the value of the flag F3 is not "0"), the switch 113C selects the previous value $V_{c-n1}$ of the corrected vehicle speed $V_c$ as the temporary vehicle speed value $V_{temp}$.

When a state in which the steering wheel 11 is held at the constant steering angle $\theta_s$ is maintained, the state in which the value of the flag F3 is set to "1" is maintained. In a period in which the value of the flag F3 is set to "1," the previous value $V_{cn-1}$ of the corrected vehicle speed $V_c$ stored in the previous value storage unit 113B is normally selected as the temporary vehicle speed value $V_{temp}$.

The switch 113C may receive the value of the flag F0 set by the end determining unit 112 as a control input. When this configuration is employed, a configuration in which the determination unit 113A is omitted may be employed as the corrected vehicle speed calculating unit 113.

The upper limit value calculating unit 113D receives the vehicle speed V detected by the vehicle speed sensor 501, the steering angle $\theta_s$ calculated by the steering angle calculating unit 51, and the steering angular velocity $\omega$ calculated by the differentiator 111, and calculates an upper limit value $V_{UL}$ for a change per operation cycle of the temporary vehicle speed value $V_{temp}$ based on the vehicle speed V, the steering angle $\theta_s$, and the steering angular velocity $\omega$ which are received. Details of the upper limit value calculating unit 113D will be described later.

The lower limit value calculating unit 113E receives the vehicle speed V detected by the vehicle speed sensor 501, the steering angle $\theta_s$ calculated by the steering angle calculating unit 51, and the steering angular velocity $\omega$ calculated by the differentiator 111, and calculates a lower limit value $V_{LL}$ for a change per operation cycle of the temporary vehicle speed value $V_{temp}$ based on the vehicle speed V, the steering angle $\theta_s$, and the steering angular velocity $\omega$ which are received. Details of the lower limit value calculating unit 113E will be described later.

The previous value storage unit 113F receives a value of a flag F4 set by the determination unit 113G which will be described later and stores the received value of the flag F4. The determination unit 113G sets the value of the flag F4 at intervals of a predetermined operation cycle, and the value of the flag F4 stored in the previous value storage unit 113F is updated whenever the value of the flag F4 is set by the determination unit 113G. That is, the value of the flag F4 stored in the previous value storage unit 113F is a previous value of the value of the flag F4 (the value of the flag F4 before one operation cycle) which is a current value set by the determination unit 113G.

The determination unit 113G determines whether a change per operation cycle of the corrected vehicle speed $V_c$ is to be limited, and sets the value of the flag F4 indicating the determination result. The determination unit 113G receives the value of the flag F3 set by the determination unit 113A, the previous value $V_{cn-1}$ of the corrected vehicle speed $V_c$ stored in the previous value storage unit 113B, the temporary vehicle speed value $V_{temp}$ selected by the switch 113C, and the previous value $F4_{n-1}$ of the flag F4 stored in the previous value storage unit 113F. The determination unit 113G sets the value of the flag F4 based on the value of the flag F3, the previous value $V_{cn-1}$ of the corrected vehicle speed $V_c$, the temporary vehicle speed value $V_{temp}$, and the previous value $F4_{n-1}$ of the flag F4. This determination is specifically performed as follows.

When the value of the flag F3 set by the determination unit 113A changes from "1" to "0," that is, when the state in which the steering wheel 11 is held at a constant steering angle $\theta_s$ changes to a state in which the steering wheel 11 is not held at the constant steering angle, the determination unit 113G sets the value of the flag F4 to "1."

Thereafter, the determination unit 113G sets the value of the flag F4 to "0" when the following Expression (A1) is satisfied. The determination unit 113G maintains the state in which the value of the flag F4 is set to "1" when the following Expression (A1) is not satisfied.

$$|V_{temp} - V_c| V_{th} \tag{A1}$$

Here, "$V_{temp}$" is a temporary vehicle speed value selected by the switch 113C and "$V_c$" is a corrected vehicle speed calculated by the guard processing unit 113H. "$V_{th}$" is a vehicle speed threshold value and is a value serving as a reference for determining whether a difference between the vehicle speed V detected by the vehicle speed sensor and the corrected vehicle speed $V_c$ is a sufficiently small value. The vehicle speed threshold value $V_{th}$ is set based on a point of view for curbing sudden change of the target pinion angle $\theta_p^*$ based on a difference between a fixed vehicle speed and an actual vehicle speed when the steering state of the steering wheel 11 transitions from a held steering state to a non-held steering state.

In addition, when the value of the flag F3 has not changed from "1" to "0," that is, when the value of the flag F3 is "0," and when the value of the flag F3 has changed from "0" to "1," the determination unit 113G sets the value of the flag F4 to "0."

The guard processing unit 113H switches a limiting processing function for the temporary vehicle speed value $V_{temp}$ selected by the switch 113C between validation and invalidation based on the value of the flag F4 set by the determination unit 113G. When the value of the flag F4 is set to "1," that is, when the held steering state of the steering wheel 11 is released, the guard processing unit 113H validates the limiting processing function for the temporary vehicle speed value $V_{temp}$. The guard processing unit 113H limits a change per operation cycle of the temporary vehicle speed value $V_{temp}$ using the upper limit value $V_{UL}$ and the lower limit value $V_{LL}$. This operation is specifically performed as follows.

That is, when the change per operation cycle of the temporary vehicle speed value $V_{temp}$ is greater than the upper limit value $V_{UL}$, the change per operation cycle of the temporary vehicle speed value $V_{temp}$ is limited to the upper limit value $V_{UL}$. The temporary vehicle speed value $V_{temp}$ which has changed to correspond to the change limited to the upper limit value $V_{UL}$ is calculated as the corrected vehicle speed $V_c$. When the change per operation cycle of the temporary vehicle speed value $V_{temp}$ is less than the lower limit value $V_{LL}$, the change per operation cycle of the temporary vehicle speed value $V_{temp}$ is limited to the lower limit value $V_{LL}$. The temporary vehicle speed value $V_{temp}$ which has changed to correspond to the change limited to the lower limit value $V_{LL}$ is calculated as the corrected vehicle speed $V_c$. In this way, a maximum change and a minimum change of the temporary vehicle speed value $V_{temp}$ are determined by the upper limit value $V_{UL}$ and the lower limit value $V_{LL}$.

When the value of the flag F4 is set to "0," the guard processing unit 113H invalidates the limiting processing function for the temporary vehicle speed value $V_{temp}$. That is, the temporary vehicle speed value $V_{temp}$ selected by the switch 113C is calculated as the corrected vehicle speed $V_c$ without any change.

Figure 9:
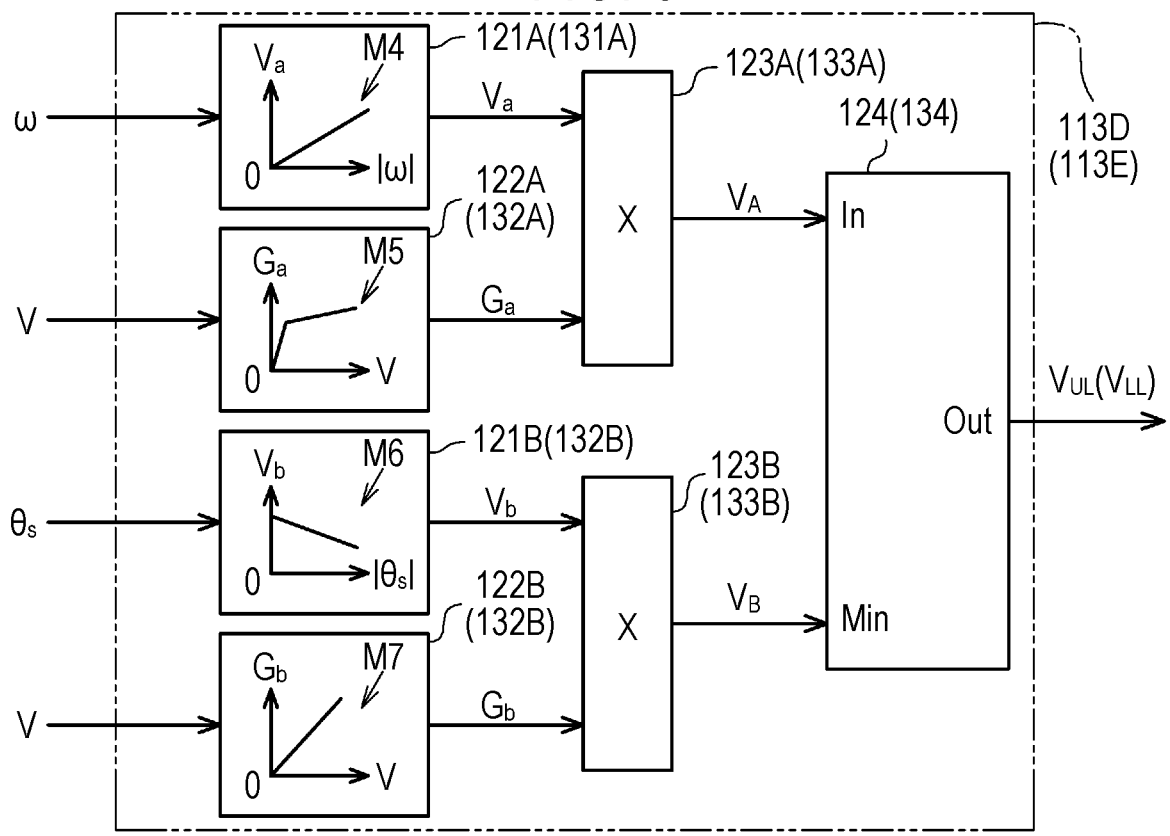
FIG. 9 is a block diagram illustrating an upper limit value calculating unit and a lower limit value calculating unit according to the first embodiment.

The upper limit value calculating unit 113D will be described below in detail. As illustrated in FIG. 9, the upper limit value calculating unit 113D includes two limit value calculating units 121A and 121B, two gain calculating units 122A and 122B, two multipliers 123A and 123B, and a selection processing unit 124.

The limit value calculating unit 121A calculates a limit value $V_a$ based on the steering angular velocity $\omega$ calculated by the differentiator 111. The limit value calculating unit 121A calculates the limit value $V_a$ using a map M4 which is stored in the storage device of the control device 50. The map M4 is a two-dimensional map in which a relationship between the absolute value of the steering angular velocity $\omega$ and the limit value $V_a$ is defined and has the following characteristics. That is, as the absolute value of the steering angular velocity $\omega$ becomes larger, the value of the limit value $V_a$ becomes larger. In addition, the map M4 is set based on a point of view for more quickly returning the vehicle speed used to calculate the target pinion angle $\theta_p^*$ or the value of the steering angle ratio to a true value not subjected to the process of correcting the vehicle speed as the absolute value of the steering angular velocity $\omega$ becomes larger.

The gain calculating unit 122A calculates a gain $G_a$ based on the vehicle speed V detected by the vehicle speed sensor 501. The gain calculating unit 122A calculates the gain $G_a$ using a map M5 which is stored in the storage device of the control device 50. The map M5 is a two-dimensional map in which a relationship between the vehicle speed V and the gain $G_a$ is defined and has the following characteristics. That is, when the vehicle speed V has a value in a very low speed area near "0," the value of the gain $G_a$ increases quickly with an increase of the vehicle speed V. When the vehicle speed V has a value exceeding the very low speed area, the value of the gain $G_a$ increases slowly with an increase of the vehicle speed V.

The multiplier 123A calculates a pre-limit value $V_A$ by multiplying the limit value $V_a$ calculated by the limit value calculating unit 121A by the gain $G_a$ calculated by the gain calculating unit 122A.

The limit value calculating unit 121B calculates a limit value $V_b$ based on the steering angle $\theta_s$ calculated by the steering angle calculating unit 51. The limit value calculating unit 121B calculates the limit value $V_b$ using a map M6 which is stored in the storage device of the control device 50. The map M6 is a two-dimensional map in which a relationship between the absolute value of the steering angle $\theta_s$ and the limit value $V_b$ is defined and has the following characteristics. That is, as the absolute value of the steering angle $\theta_s$ increases, the value of the limit value $V_b$ decreases slowly.

The gain calculating unit 122B calculates a gain $G_b$ based on the vehicle speed V detected by the vehicle speed sensor 501. The gain calculating unit 122B calculates the gain $G_b$ using a map M7 which is stored in the storage device of the control device 50. The map M7 is a two-dimensional map in which a relationship between the vehicle speed V and the gain $G_b$ is defined and has the following characteristics. That is, as the vehicle speed V increases with respect to "0," the value of the gain $G_b$ increases slowly. The map M7 is set based on a point of view for more quickly returning the vehicle speed used to calculate the target pinion angle $\theta_p^*$ or the value of the steering angle ratio to a true value not subjected to the process of correcting the vehicle speed as the value of the vehicle speed V becomes higher.

The multiplier 123B calculates a pre-limit value $V_B$ by multiplying the limit value $V_b$ calculated by the limit value calculating unit 121B by the gain $G_b$ calculated by the gain calculating unit 122B.

The selection processing unit 124 calculates the upper limit value $V_{UL}$ through comparison between the pre-limit value $V_A$ calculated by the multiplier 123A and the pre-limit value $V_B$ calculated by the multiplier 123B. The selection processing unit 124 selects the pre-limit value $V_B$ as the upper limit value $V_{UL}$ when the pre-limit value $V_A$ is equal to or less than the pre-limit value $V_B$ as expressed by the following Expression (A2). In this case, the vehicle speed used to calculate the target pinion angle $\theta_p^*$ or the steering angle ratio is slowly returned to a true value not subjected to the process of correcting the vehicle speed with the elapse of time except when the value of the vehicle speed V is "0."

$$V_A \leq V_B \rightarrow V_{UL} = V_B \quad (A2)$$

The selection processing unit 124 selects the pre-limit value $V_A$ as the upper limit value $V_{UL}$ when the pre-limit value $V_A$ is greater than the pre-limit value $V_B$ as expressed by the following Expression (A3). In this case, the vehicle speed used to calculate the target pinion angle $\theta_p^*$ or the steering angle ratio is slowly returned to a true value not subjected to the process of correcting the vehicle speed with the elapse of time according to the steering angular velocity ω except when the value of the vehicle speed V is "0."

$$V_A > V_B \rightarrow V_{UL} = V_A \quad (A3)$$

The lower limit value calculating unit 113E will be described below in detail. The lower limit value calculating unit 113E has the same configuration as the upper limit value calculating unit 113D. That is, as described in parentheses in FIG. 9, the lower limit value calculating unit 113E includes two limit value calculating units 131A and 131B, two gain calculating units 132A and 132B, two multipliers 133A and 133B, and a selection processing unit 134.

The limit value calculating unit 131A calculates a limit value $V_a$ based on the steering angular velocity ω calculated by the differentiator 111. The gain calculating unit 132A calculates a gain $G_a$ based on the vehicle speed V detected by the vehicle speed sensor 501. The multiplier 133A calculates a pre-limit value $V_A$ by multiplying the limit value $V_a$ calculated by the limit value calculating unit 131A by the gain $G_a$ calculated by the gain calculating unit 132A.

The limit value calculating unit 131B calculates a limit value $V_b$ based on the steering angle $\theta_s$ calculated by the steering angle calculating unit 51. The gain calculating unit 132B calculates a gain $G_b$ based on the vehicle speed V detected by the vehicle speed sensor 501. The multiplier 133B calculates a pre-limit value $V_B$ by multiplying the limit value $V_b$ calculated by the limit value calculating unit 131B by the gain $G_b$ calculated by the gain calculating unit 132B.

The selection processing unit 134 selects the pre-limit value $V_B$ as the lower limit value $V_{LL}$ when the pre-limit value $V_A$ is equal to or less than the pre-limit value $V_B$ as expressed by the following Expression (A4). The selection processing unit 134 selects the pre-limit value $V_A$ as the lower limit value $V_{LL}$ when the pre-limit value $V_A$ is greater than the pre-limit value $V_B$ as expressed by the following Expression (A5).

$$V_A \leq V_B \rightarrow V_{LL} = V_B \quad (A4)$$

$$V_A > V_B \rightarrow V_{UL} = V_A \quad (A5)$$

Operations in the first embodiment will be described below.

When the operation position of the steering wheel 11 has reached a position in the vicinity of the limit position of the operation range thereof, the value of the flag F0 is set to "1" by the end determining unit 112 and the value of the flag F3 is set to "1" by the determination unit 113A. Accordingly, in the period in which the operation position of the steering wheel 11 is held at the limit position of the operation range thereof or a position in the vicinity thereof, the previous value $V_{cn-1}$ of the corrected vehicle speed $V_c$ stored in the previous value storage unit 113B is normally selected as the temporary vehicle speed value $V_{temp}$. When the operation position of the steering wheel 11 has reached a position in the vicinity of the limit position of the operation range thereof, the value of the flag F4 is set to "1" by the determination unit 113G. Here, the limiting processing function of the guard processing unit 113H is kept invalidated.

Accordingly, the previous value $V_{cn-1}$ of the corrected vehicle speed $V_c$ stored in the previous value storage unit 113B is normally calculated as the corrected vehicle speed $V_c$. That is, regardless of the actual value of the vehicle speed V detected by the vehicle speed sensor 501, the value of the corrected vehicle speed $V_c$ which is the final vehicle speed used to calculate the steering end angle $\theta_{end}$ does not change. Accordingly, when the operation position of the steering wheel 11 has reached a position in the vicinity of the limit position of the operation range thereof, the value of the steering end angle $\theta_{end}$ does not change even if the vehicle starts its deceleration or acceleration.

That is, even when the vehicle is decelerated in a state in which the operation position of the steering wheel 11 has reached the limit position of the virtual operation range thereof, the operation range of the steering wheel 11 does not narrow with the decrease of the vehicle speed V. Accordingly, the steering wheel 11 does not rotate such that it is pushed back in the direction opposite to the current steering direction. As a result, a driver does not feel discomfort (a feeling of being repelled). Even when the vehicle is accelerated in a state in which the operation position of the steering wheel 11 has reached the limit position of the virtual operation range thereof, the operation range of the steering wheel 11 does not broaden with the increase of the vehicle speed V. That is, since the current limit position of the operation range is maintained, a driver does not feel a so-called feeling of steering error.

Then, when the value of the flag F0 which is the end determination result is set to "0" because the operation position of the steering wheel 11 has become distant from a position in the vicinity of the limit position of the operation range thereof according to steering of the steering wheel 11, the value of the flag F3 is set to "0" by the determination unit 113A. Accordingly, after the operation position of the steering wheel 11 has become distant from a position in the vicinity of the limit position of the operation range thereof, the vehicle speed V detected by the vehicle speed sensor 501 is selected as the temporary vehicle speed value $V_{temp}$ by the switch 113C. When the value of the flag F3 changes from "1" to "0," the value of the flag F4 is set to "1" by the determination unit 113G. Accordingly, the limiting processing function for the temporary vehicle speed value $V_{temp}$ in the guard processing unit 113H is validated. As a result, the change per operation cycle of the temporary vehicle speed value $V_{temp}$ or the corrected vehicle speed $V_c$ used to calculate the steering end angle $\theta_{end}$ is limited to the upper limit value $V_{UL}$ or the lower limit value $V_{LL}$.

It is conceivable that the vehicle speed which is used as the temporary vehicle speed value $V_{temp}$ immediately before the operation position of the steering wheel 11 has become distant from a position in the vicinity of the limit position of the operation range thereof becomes different from the vehicle speed V immediately after the operation position of the steering wheel 11 has become distant from a position in the vicinity of the limit position of the operation range thereof. In this case, the steering end angle $\theta_{end}$ based on the vehicle speed immediately before the operation position of the steering wheel 11 has become distant from a position in the vicinity of the limit position of the operation range thereof becomes different from the steering end angle $\theta_{end}$ based on the vehicle speed immediately after the operation position of the steering wheel 11 has become distant from a position in the vicinity of the limit position of the operation range thereof. Accordingly, when the vehicle speed V immediately after the operation position of the steering wheel 11 has become distant from a position in the vicinity of the limit position of the operation range thereof is used, there is concern about the steering end angle $\theta_{end}$ changing quickly.

In this regard, in this embodiment, when the operation position of the steering wheel 11 has become distant from a position in the vicinity of the limit position of the operation range thereof, the change (the maximum change and the minimum change) per operation cycle of the temporary vehicle speed value $V_{temp}$ is limited to the upper limit value $V_{UL}$ or the lower limit value $V_{LL}$. Accordingly, it is possible to curb quick change of the value of the corrected vehicle speed $V_c$ which is the final vehicle speed used to calculate the steering end angle $\theta_{end}$. The value of the corrected vehicle speed $V_c$ changes slowly to the value of the vehicle speed V detected by the vehicle speed sensor 501 with the elapse of time according to the steering state (the steering angular velocity ω and the steering angle $\theta_s$ herein) or the traveling state of the vehicle (the vehicle speed V herein). Accordingly, it is possible to curb quick change of the steering end angle $\theta_{end}$.

When the absolute value of a difference between the temporary vehicle speed value $V_{temp}$ (the vehicle speed V detected by the vehicle speed sensor 501 herein) and the corrected vehicle speed $V_c$ which is the final vehicle speed used to calculate the steering end angle $\theta_{end}$ becomes equal to or less than the vehicle speed threshold value $V_{th}$, the value of the flag F4 is set to "0" by the determination unit 113G. Accordingly, the limiting processing function for the temporary vehicle speed value $V_{temp}$ in the guard processing unit 113H is invalidated. As a result, the vehicle speed V detected by the vehicle speed sensor 501 is used as the corrected vehicle speed $V_c$ to calculate the steering end angle $\theta_{end}$ without any change. That is, a more appropriate steering end angle $\theta_{end}$ than that corresponding to the actual vehicle speed V is calculated.

Accordingly, according to the first embodiment, the following advantages can be obtained. When the operation position of the steering wheel 11 has reached a position in the vicinity of the limit position of the virtual operation range thereof, the corrected vehicle speed $V_c$ which is the final vehicle speed used to calculate the steering end angle $\theta_{end}$ is fixed to the vehicle speed immediately before it is determined that the operation position of the steering wheel 11 has reached a position in the vicinity of the limit position of the operation range thereof. That is, regardless of the actual value of the vehicle speed V, the steering end angle $\theta_{end}$ is maintained at a value corresponding to the vehicle speed V when it is determined that the operation position of the steering wheel 11 has reached a position in the vicinity of the limit position of the operation range thereof. Accordingly, even when the vehicle speed V changes in the state in which the operation position of the steering wheel 11 has reached a position in the vicinity of the limit position of the operation range thereof, the steering end angle $\theta_{end}$ does not change with the change of the vehicle speed V.

That is, when the vehicle is decelerated in the state in which the operation position of the steering wheel 11 has reached a position in the vicinity of the limit position of the virtual operation range thereof, the operation range of the steering wheel 11 does not narrows with the decrease of the vehicle speed V. Accordingly, the steering wheel 11 does not rotate such that it is pushed back in the direction opposite to the current steering direction. As a result, a driver does not feel discomfort such as a feeling of being repelled. When the vehicle is accelerated in the state in which the operation position of the steering wheel 11 has reached a position in the vicinity of the limit position of the operation range thereof, the operation range of the steering wheel 11 does not broaden with the increase of the vehicle speed V. That is, since the current limit position of the operation range is maintained, a driver does not feel a so-called feeling of steering error. In this way, even when the vehicle speed V changes in the state in which the operation position of the steering wheel 11 has reached a position in the vicinity of the limit position of the virtual operation range thereof, it is possible to curb change of a feeling of steering which is not intended by a driver.

When the operation position of the steering wheel 11 has become distant from a position in the vicinity of the limit position of the virtual operation range thereof, the state in which the value of the vehicle speed is fixed is released and the actual vehicle speed V detected by the vehicle speed sensor 501 is used to calculate the steering end angle $\theta_{end}$. At this time, the change per operation cycle of the corrected vehicle speed $V_c$ which is the final vehicle speed to calculate the steering end angle $\theta_{end}$ is limited to the upper limit value $V_{UL}$ and the lower limit value $V_{LL}$ by the guard processing unit 113H.

Accordingly, even when the value of the vehicle speed which is fixed immediately before the operation position of the steering wheel 11 has become distant from a position in the vicinity of the limit position of the virtual operation range thereof becomes different from the value of the vehicle speed V immediately after the operation position of the steering wheel 11 has become distant from a position in the vicinity of the limit position of the virtual operation range thereof, the value of the corrected vehicle speed $V_c$ changes slowly to the value of the vehicle speed V detected by the vehicle speed sensor 501. That is, since quick change of the value of the corrected vehicle speed $V_c$ is curbed, quick change of the steering end angle $\theta_{end}$ is also curbed.

In this embodiment, when the operation position of the steering wheel 11 has become distant from a position in the vicinity of the limit position of the virtual operation range thereof, a so-called temporal change guarding process of limiting the change per operation cycle of the corrected vehicle speed $V_c$ to a value between the upper limit value $V_{UL}$ and the lower limit value $V_{LL}$ is performed, but an offset process may be employed instead of the change guarding process. For example, when the operation position of the steering wheel 11 has become distant from a position in the vicinity of the limit position of the virtual operation range thereof according to steering of the steering wheel 11, a difference between the current value and the previous value of the corrected vehicle speed $V_c$ is set as an offset value for the corrected vehicle speed $V_c$ and the offset value is slowly changed with time to "0."

Second Embodiment

A steering control device according to a second embodiment will be described below. This embodiment basically employs the same configuration as in the first embodiment illustrated in FIGS. 1 to 9. This embodiment is different from the first embodiment in the method of calculating a steering angle in the control device 50.

Figure 11:
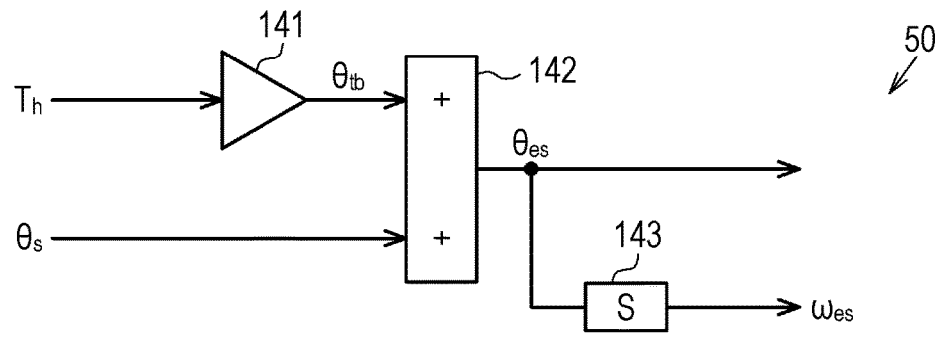
FIG. 11 is a block diagram illustrating a principal part of a control device according to a second embodiment.

As illustrated in FIG. 11, the control device 50 includes a divider 141, an adder 142, and a differentiator 143. The divider 141 receives a steering torque $T_h$ detected by the torque sensor 34. The divider 141 calculates a torsion angle $\theta_{tb}$ of a torsion bar which is a constituent of the torque sensor 34 by dividing the steering torque $T_h$ by a coefficient of torsion rigidity of the torsion bar.

The adder 142 calculates an estimated steering angle $\theta_{es}$ by adding the torsion angle $\theta_{tb}$ of the torsion bar calculated by the divider 141 to the steering angle $\theta_s$ calculated by the steering angle calculating unit 51.

The differentiator 143 calculates an estimated steering angular velocity $\omega_{es}$ by differentiating the estimated steering angle $\theta_{es}$ calculated by the adder 142. For example, the limiting axial force calculating unit 82 performs a process of correcting the vehicle speed V and a process of calculating the steering end angle $\theta_{end}$ using the estimated steering angle $\theta_{es}$ instead of the steering angle $\theta_s$ calculated by the steering angle calculating unit 51 and using the estimated steering angular velocity $\omega_{es}$ instead of the steering angular velocity $\omega$ calculated by the differentiator 111.

Accordingly, according to the second embodiment, the following advantages can be obtained in addition to the same advantages as in the first embodiment. As described above, when the operation position of the steering wheel 11 has become distant from a position in the vicinity of the limit position of the virtual operation range thereof, the state in which the value of the vehicle speed is fixed is released. At this time, the value of the corrected vehicle speed $V_c$ which is the final vehicle speed used to calculate the steering end angle $\theta_{end}$ changes slowly to the value of the vehicle speed V detected by the vehicle speed sensor 501 with the elapse of time according to the steering state. Here, the steering angle $\theta_s$ and the steering angular velocity $\omega$ are used as state variables indicating the steering state in the first embodiment, but the estimated steering angle $\theta_{es}$ and the estimated steering angular velocity $\omega_{es}$ calculated based on the steering torque $T_h$ are used in this embodiment. Accordingly, it is possible to improve responsiveness when the value of the corrected vehicle speed $V_c$ which is the final vehicle speed used to calculate the steering end angle $\theta_{end}$ is returned to the value of the vehicle speed V detected by the vehicle speed sensor 501. The reason thereof is as follows. That is, although an amount of steering of the steering wheel 11 is small, the amount of steering is immediately detected as a change of the steering torque $T_h$ by which the steering wheel 11 is steered. On the other hand, the steering angle $\theta_s$ is calculated based on the rotation angle $\theta_a$ of the reaction motor 31, and a time point at which the steering wheel 11 has been steered and a time point at which the amount of steering of the steering wheel 11 is reflected in the rotation angle $\theta_a$ of the reaction motor 31 and is calculated as the steering angle $\theta_s$ have a slight time lag therebetween. Accordingly, responsiveness of the steering torque $T_h$ with respect to the steering of the steering wheel 11 is thought to be higher than the responsiveness of the steering angle $\theta_s$ with respect to the steering of the steering wheel 11.

Third Embodiment

A steering control device according to a third embodiment will be described below. This embodiment is different from the first embodiment in the method of calculating the steering end angle $\theta_{end}$. This embodiment may be applied to the second embodiment.

Figure 12:
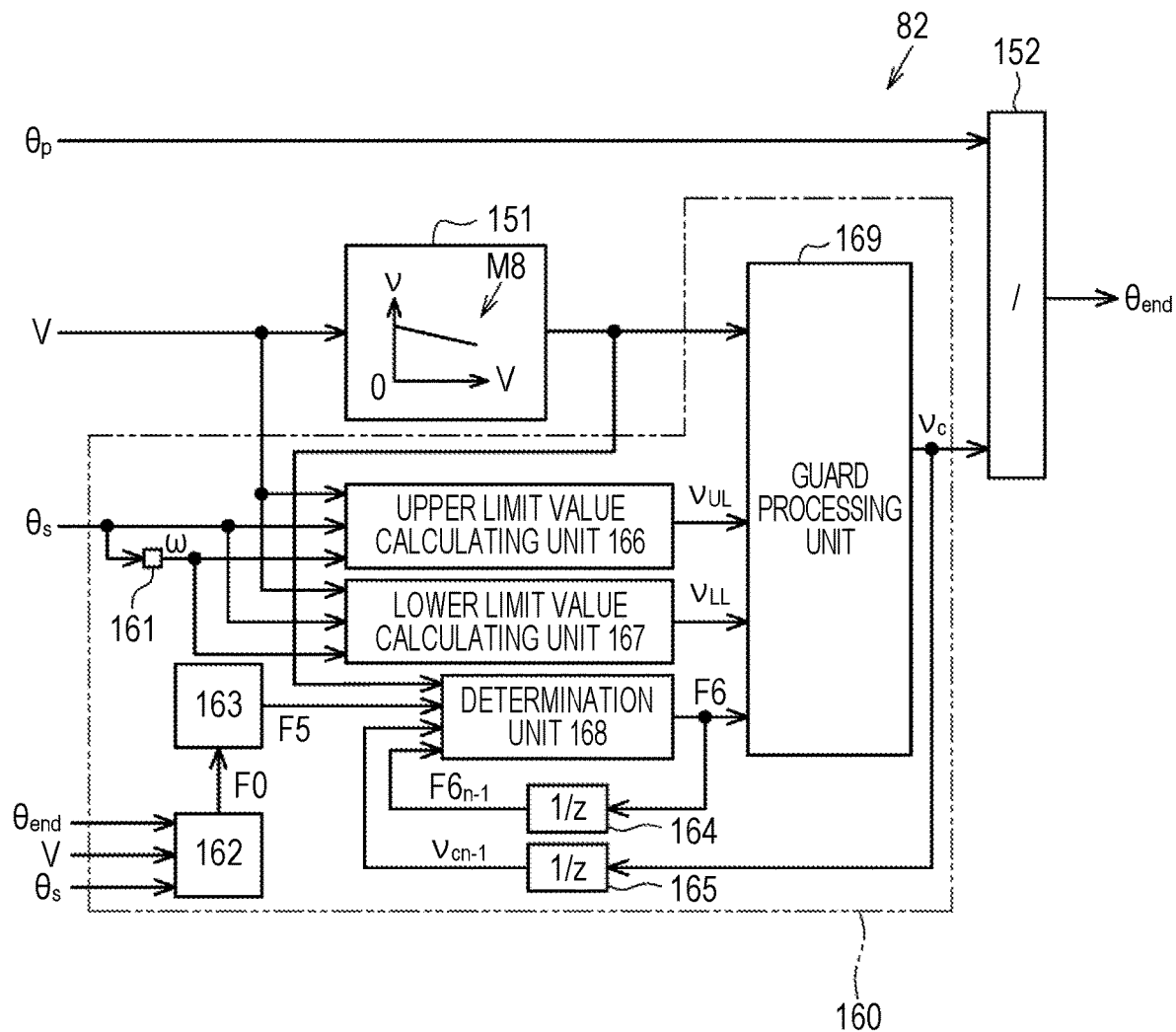
FIG. 12 is a block diagram illustrating a principal part of a limiting axial force calculating unit according to a third embodiment.

As illustrated in FIG. 12, the limiting axial force calculating unit 82 includes a speed increasing ratio calculating unit 151 and a divider 152. The speed increasing ratio calculating unit 151 calculates a speed increasing ratio $\nu$ based on the vehicle speed V detected by the vehicle speed sensor 501. The speed increasing ratio calculating unit 151 calculates the speed increasing ratio $\nu$ using a map M8 which is stored in the storage device of the control device 50. The map M8 is a two-dimensional map in which a relationship between the vehicle speed V and the speed increasing ratio $\nu$ is defined and has the following characteristics. That is, the value of the speed increasing ratio $\nu$ decreases slowly as the value of the vehicle speed V increases.

The divider 152 calculates the steering end angle $\theta_{end}$ by dividing the pinion angle $\theta_y$ calculated by the pinion angle calculating unit 61 by the speed increasing ratio $\nu$ calculated by the speed increasing ratio calculating unit 151.

Here, when the speed increasing ratio $\nu$ changes according to the vehicle speed V, there is the following concern similarly to the first embodiment. That is, for example, it is conceivable that the vehicle is decelerated or accelerated in a state in which the operation position of the steering wheel 11 has become distant from a position in the vicinity of the limit position of the operation range thereof. In this case, since the speed increasing ratio $\nu$ changes with change of the vehicle speed V, the steering end angle $\theta_{end}$ changes according to the vehicle speed V. Accordingly, similarly to the first embodiment, there is concern about change of steering behavior which is not intended by a driver.

Therefore, in this embodiment, the following configuration is employed as the limiting axial force calculating unit 82. As illustrated in FIG. 12, the limiting axial force calculating unit 82 includes a correction processing unit 160. The correction processing unit 160 corrects the speed increasing ratio $\nu$ detected by the speed increasing ratio calculating unit 151 according to the steering state of the steering wheel 11.

The correction processing unit 160 includes a differentiator 161, an end determining unit 162, a determination unit 163, two previous value storage units 164 and 165, an upper limit value calculating unit 166, a lower limit value calculating unit 167, a determination unit 168, and a guard processing unit 169.

The differentiator 161 calculates the steering angular velocity $\omega$ by differentiating the steering angle $\theta_s$ calculated by the steering angle calculating unit 51. The end determining unit 162 has the same function as the end determining unit 112 according to the first embodiment illustrated in FIGS. 6 and 7. The end determining unit 162 determines whether the operation position of the steering wheel 11 has reached a position in the vicinity of the limit position of the virtual operation range thereof based on the vehicle speed V detected by the vehicle speed sensor 501, the steering angle $\theta_s$ calculated by the steering angle calculating unit 51, and the steering end angle $\theta_{end}$ calculated by the steering end angle calculating unit 101. When it is determined that the operation position of the steering wheel 11 has reached a position in the vicinity of the limit position of the virtual operation range thereof, the end determining unit 162 sets the value of the flag F0 to "1." When it is determined that the operation position of the steering wheel 11 has not reached a position in the vicinity of the limit position of the virtual operation range thereof, the end determining unit 162 sets the value of the flag F0 to "10."

The determination unit 163 has the same function as the determination unit 113A according to the first embodiment illustrated in FIG. 8. Here, the determination unit 163 receives the value of the flag F0 set by the end determining unit 162, and sets a value of a flag F5 indicating whether change of the speed increasing ratio ν with change of the vehicle speed V is to be limited according to the value of the received flag F0. When the value of the flag F0 is "1," that is, when the steering wheel 11 is in a held steering state, the determination unit 163 determines that the change of the speed increasing ratio ν with the change of the vehicle speed V is to be limited and sets the value of the flag F5 to "1." When the value of the flag F0 is "0," that is, when the steering wheel 11 is not in the held steering state, the determination unit 163 determines that the change of the speed increasing ratio ν with the change of the vehicle speed V is not to be limited and sets the value of the flag F5 to "0."

The previous value storage unit 164 receives a value of a flag F6 which is set by the determination unit 168 and stores the received value of flag F6. The value of the flag F6 stored in the previous value storage unit 164 is a previous value of the current value of the flag F6 set by the determination unit 168.

The previous value storage unit 165 receives a corrected speed increasing ratio $ν_c$ calculated by the guard processing unit 169 which will be described later, and stores the received corrected speed increasing ratio $ν_c$. The corrected speed increasing ratio $ν_c$ stored in the previous value storage unit 165 is a previous value of a current value of the corrected speed increasing ratio $ν_c$ calculated by the guard processing unit 169.

The upper limit value calculating unit 166 has the same function as the upper limit value calculating unit 113D according to the first embodiment illustrated in FIG. 8. Here, the upper limit value calculating unit 166 receives the vehicle speed V detected by the vehicle speed sensor 501, the steering angle $θ_s$ calculated by the steering angle calculating unit 51, and the steering angular velocity ω calculated by the differentiator 111, and calculates an upper limit value $ν_{UL}$ for a change per operation cycle of the speed increasing ratio ν based on the vehicle speed V, the steering angle $θ_s$, and the steering angular velocity ω which are received.

The lower limit value calculating unit 167 has the same function as the lower limit value calculating unit 113E according to the first embodiment illustrated in FIG. 8. Here, the lower limit value calculating unit 167 receives the vehicle speed V detected by the vehicle speed sensor 501, the steering angle $θ_s$ calculated by the steering angle calculating unit 51, and the steering angular velocity ω calculated by the differentiator 111, and calculates a lower limit value $ν_{LL}$ for the change per operation cycle of the speed increasing ratio ν based on the vehicle speed V, the steering angle $θ_s$, and the steering angular velocity ω which are received.

The determination unit 168 has the same function as the determination unit 113G according to the first embodiment illustrated in FIG. 8. Here, the determination unit 168 determines whether the change per operation cycle of the speed increasing ratio ν is to be limited, and sets the value of the flag F6 indicating a determination result thereof. The determination unit 168 receives the value of the flag F5 set by the determination unit 163, the previous value $ν_{cn-1}$ of the corrected speed increasing ratio $ν_c$ stored in the previous value storage unit 165, the speed increasing ratio ν calculated by the speed increasing ratio calculating unit 151, and a previous value $F6_{n-1}$ of the flag F6 stored in the previous value storage unit 164. The determination unit 168 sets the value of the flag F6 based on the value of the flag F5, the previous value $ν_{cn-1}$ of the corrected speed increasing ratio $ν_c$, the speed increasing ratio ν, and the previous value $F6_{n-1}$ of the flag F6. This operation is specifically performed as follows.

When a state in which the value of the flag F5 is set to "0" is maintained and the operation position of the steering wheel 11 has not reached a position in the vicinity of the limit position of the operation range thereof, the determination unit 168 sets the value of the flag F6 to "0." When the value of the flag F5 changes from "0" to "1," that is, when the operation position of the steering wheel 11 has reached a position in the vicinity of the limit position of the operation range thereof, the determination unit 168 sets the value of the flag F6 to "1." When the value of the flag F5 changes from "1" to "0," that is, when the state in which the operation position of the steering wheel 11 has reached a position in the vicinity of the limit position of the virtual operation range thereof changes to a state in which the operation position of the steering wheel 11 has become distant from a position in the vicinity of the limit position of the virtual operation range thereof, the determination unit 168 sets the value of the flag F6 to "1."

When the following Expression (A5) is satisfied after the value of the flag F5 has changed from "1" to "0," the determination unit 168 sets the value of the flag F6 to "0." When the following Expression (A5) is not satisfied, the determination unit 168 maintains the state in which the value of the flag F6 is set to "1."

$$|ν-ν_c| \le ν_{th} \qquad (A5)$$

Here, "ν" is an speed increasing ratio calculated by the speed increasing ratio calculating unit 151 and "$ν_c$" is a corrected speed increasing ratio calculated by the guard processing unit 169. "$V_{th}$" is a speed increasing ratio threshold value and is a value serving as a reference for determining whether a difference between the speed increasing ratio ν calculated by the speed increasing ratio calculating unit 151 and the corrected speed increasing ratio $ν_c$ is sufficiently small. The speed increasing ratio threshold value $ν_{th}$ is set based on a point of view for curbing quick change of the steering end angle $θ_{end}$ based on the difference between the corrected speed increasing ratio $ν_c$ calculated by the guard processing unit 169 and the actual speed increasing ratio ν calculated by the speed increasing ratio calculating unit 151 when the operation position of the steering wheel 11 has become distant from a position in the vicinity of the limit position of the virtual operation range thereof.

The guard processing unit 169 has the same function as the guard processing unit 113H according to the first embodiment illustrated in FIG. 8. Here, the guard processing unit 169 switches the limiting processing function for the speed increasing ratio ν calculated by the speed increasing ratio calculating unit 151 between validation and invalidation according to the value of the flag F6 set by the determination unit 168. When the value of the flag F6 is set to "1," the guard processing unit 169 validates the limiting processing function for the speed increasing ratio ν. The guard processing unit 169 limits the change per operation cycle of the speed increasing ratio ν using the upper limit value $ν_{UL}$ calculated by the upper limit value calculating unit 166 and the lower limit value $v_{LL}$ calculated by the lower limit value calculating unit 167. This operation is specifically performed as follows.

That is, when the change per operation cycle of the speed increasing ratio v is greater than the upper limit value $v_{UL}$, the change per operation cycle of the speed increasing ratio v is limited to the upper limit value $v_{UL}$. The speed increasing ratio v changing by the change limited to the upper limit value $v_{UL}$ is calculated as the corrected speed increasing ratio $v_c$. When the change per operation cycle of the speed increasing ratio v is less than the lower limit value $v_{LL}$, the change per operation cycle of the speed increasing ratio v is limited to the lower limit value $v_{LL}$. The speed increasing ratio v changing by the change limited to the lower limit value $v_{LL}$ is calculated as the corrected speed increasing ratio $v_c$. In this way, a maximum change and a minimum change of the speed increasing ratio v are determined by the upper limit value $v_{UL}$ and the lower limit value $v_{LL}$.

When the value of the flag F6 is set to "0," the guard processing unit 169 invalidates the limiting processing function for the speed increasing ratio v. That is, the speed increasing ratio v calculated by the speed increasing ratio calculating unit 151 is calculated as the corrected speed increasing ratio $v_c$ without any change.

Operations of the third embodiment will be described below. When the operation position of the steering wheel 11 has reached a position in the vicinity of the limit position of the virtual operation range thereof, the value of the flag F5 is set to "1" by the determination unit 163. When the value of the flag F5 changes from "0" to "1," the value of the flag F6 is set to "1" by the determination unit 168. Accordingly, the limiting processing function for the speed increasing ratio v in the guard processing unit 169 is validated. As a result, the change per operation cycle of the speed increasing ratio v is limited to the upper limit value $v_{UL}$ calculated by the upper limit value calculating unit 166 or the lower limit value $v_{LL}$ calculated by the lower limit value calculating unit 167. Here, for example, the value of the speed increasing ratio v calculated by the speed increasing ratio calculating unit 151 may be considered to change quickly with the change of the vehicle speed V due to deceleration or acceleration of the vehicle, and the change per operation cycle of the speed increasing ratio v is limited to the upper limit value $v_{UL}$ or the lower limit value $v_{LL}$ when the change per operation cycle of the speed increasing ratio v exceeds the upper limit value $v_{UL}$. That is, the change per operation cycle of the corrected speed increasing ratio $v_c$ which is the final speed increasing ratio used to calculate the steering end angle $\theta_{end}$ does not exceed the upper limit value $v_{UL}$. Accordingly, it is possible to curb quick change of the value of the corrected speed increasing ratio $v_c$ or the value of the steering end angle $\theta_{end}$ due to the change of the vehicle speed V.

Accordingly, as illustrated in the left part of FIG. 10, when the vehicle starts its deceleration in the state in which the operation position of the steering wheel 11 has reached a position in the vicinity of the limit position of the virtual operation range thereof, the operation range of the steering wheel 11 narrows slowly with the elapse of time without narrowing quickly due to the decrease of the vehicle speed V. Accordingly, rotation of the steering wheel 11 such that it is pushed back in the direction opposite to the current steering direction is curbed. As a result, it is possible to curb a driver's feeling discomfort such as a feeling of being repelled. As illustrated in the right part of FIG. 10, when the vehicle starts its acceleration in the state in which the operation position of the steering wheel 11 has reached a position in the vicinity of the limit position of the virtual operation range thereof, the operation range of the steering wheel 11 broadens slowly with time without broadening quickly due to the increase of the vehicle speed V. Accordingly, it is possible to curb a driver's feeling a so-called feeling of steering error. In this way, even when the vehicle speed V changes in the state in which the operation position of the steering wheel 11 has reached a position in the vicinity of the limit position of the virtual operation range thereof, it is possible to curb change of a feeling of steering which is not intended by a driver.

Then, when the operation position of the steering wheel 11 has become distant from a position in the vicinity of the limit position of the virtual operation range thereof, the value of the flag F5 is set to "0" by the determination unit 163. When the value of the flag F5 changes from "1" to "0," the determination unit 168 maintains the state in which the value of the flag F6 is set to "1." Accordingly, the limiting processing function for the speed increasing ratio v in the guard processing unit 169 is kept validated. Accordingly, the change per operation cycle of the corrected speed increasing ratio $v_c$ which is a final speed increasing ratio used to calculate the target pinion angle $\theta_p^*$ is limited to the upper limit value $v_{UL}$ or the lower limit value $v_{LL}$.

Here, it is conceivable that the speed increasing ratio v based on the vehicle speed V immediately before the operation position of the steering wheel 11 has become distant from a position in the vicinity of the limit position of the virtual operation range thereof becomes different from the speed increasing ratio v based on the vehicle speed V immediately after the operation position of the steering wheel 11 has become distant from a position in the vicinity of the limit position of the virtual operation range thereof. In this case, the steering end angle $\theta_{end}$ based on the speed increasing ratio v immediately before the operation position of the steering wheel 11 has become distant from a position in the vicinity of the limit position of the virtual operation range thereof also becomes different from the steering end angle $\theta_{end}$ based on the speed increasing ratio v immediately after the operation position of the steering wheel 11 has become distant from a position in the vicinity of the limit position of the virtual operation range thereof. Accordingly, when the steering end angle $\theta_{end}$ is calculated immediately using the speed increasing ratio v based on the vehicle speed V immediately after the operation position of the steering wheel 11 has become distant from a position in the vicinity of the limit position of the virtual operation range thereof, there is concern about quick change of the value of the steering end angle $\theta_{end}$.

In this regard, in this embodiment, when the operation position of the steering wheel 11 has become distant from a position in the vicinity of the limit position of the virtual operation range thereof, the change per operation cycle of the speed increasing ratio v is limited to the upper limit value $v_{UL}$ or the lower limit value $v_{LL}$. Accordingly, it is possible to curb quick change of the value of the final corrected speed increasing ratio $v_c$ used to calculate the steering end angle $\theta_{end}$. The value of the corrected speed increasing ratio $v_c$ changes slowly with time to the speed increasing ratio v calculated by the speed increasing ratio calculating unit 151 according to the steering state (the steering angular velocity $\omega$ and the steering angle $\theta_s$ herein) or the traveling state of the vehicle (the vehicle speed V herein). Accordingly, it is possible to curb quick change of the steering end angle $\theta_{end}$ and the virtual operation range of the steering wheel 11.

When the absolute value of the difference between the speed increasing ratio v calculated by the speed increasing ratio calculating unit 151 and the corrected speed increasing ratio $v_c$ limited by the guard processing unit 169 is equal to or less than the speed increasing ratio threshold value $v_{th}$, the value of the flag F6 is set to "0" by the determination unit 168. Accordingly, the limiting processing function for the speed increasing ratio $v$ in the guard processing unit 169 is invalidated. As a result, the speed increasing ratio $v$ calculated by the speed increasing ratio calculating unit 151 is used as the corrected speed increasing ratio $v_c$ which is the final speed increasing ratio to calculate the steering end angle $\theta_{end}$ without any change. That is, it is possible to calculate a more appropriate steering end angle $\theta_{end}$ corresponding to the speed increasing ratio $v$ based on the vehicle speed V.

Accordingly, according to the third embodiment, the following advantages can be obtained in addition to the same advantages as in the first embodiment. The steering end angle $\theta_{end}$ can be calculated using the pinion angle $\theta_y$ calculated by the pinion angle calculating unit 61 and the speed increasing ratio $v$ calculated according to the vehicle speed V. Depending on product specifications or the like, it is conceivable that the steering end angle $\theta_{end}$ is requested to be calculated without using the map M2 in which the relationship between the vehicle speed V and the steering end angle $\theta_{end}$ is defined, and this request can be satisfied.

Fourth Embodiment

A steering control device according to a fourth embodiment will be described below. This embodiment is different from the first embodiment in the configuration of the correction processing unit that corrects the vehicle speed V. This embodiment may be applied to the second or third embodiment described above.

Figure 13:
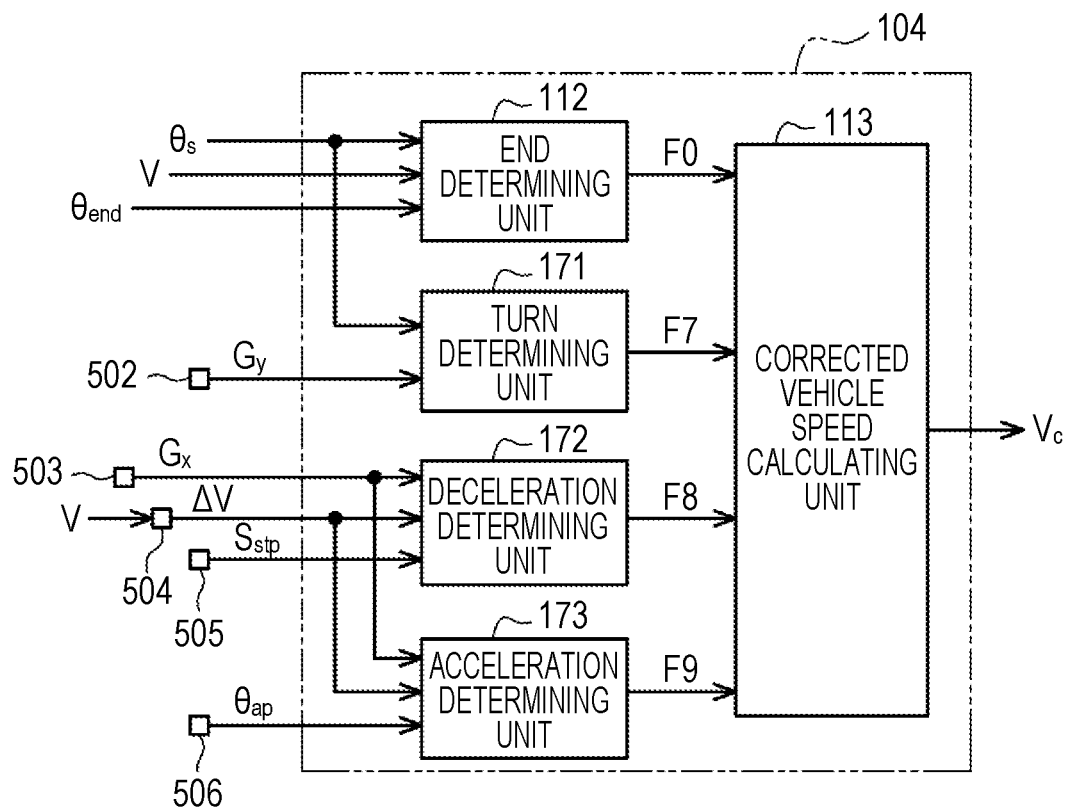
FIG. 13 is a block diagram illustrating a correction processing unit according to a fourth embodiment.

As illustrated in FIG. 13, the correction processing unit 104 of the limiting axial force calculating unit 82 includes a turn determining unit 171, a deceleration determining unit 172, and an acceleration determining unit 173 in addition to the end determining unit 112.

The turn determining unit 171 receives a lateral acceleration $G_y$ detected by a lateral acceleration sensor 502 which is mounted in the vehicle and the steering angle $\theta_s$ calculated by the steering angle calculating unit 51, and determines whether the vehicle is turning based on the received lateral acceleration $G_y$ and the received steering angle $\theta_s$. The lateral acceleration $G_y$ is an acceleration in a lateral direction with respect to the traveling direction of the vehicle when the vehicle is turning. The turn determining unit 171 sets a value of a flag F7 as a turning determination result indicating whether the vehicle is turning. When it is determined that the vehicle is turning, the turn determining unit 171 sets the value of the flag F7 to "1." When it is determined that the vehicle is not turning, the turn determining unit 171 sets the value of the flag F7 to "0." Details of the turn determining unit 171 will be described later.

The deceleration determining unit 172 receives a longitudinal acceleration $G_x$ detected by a longitudinal acceleration sensor 503 which is mounted in the vehicle, a vehicle speed change per unit time $\Delta V$ which is calculated by a vehicle speed change calculating unit 504 which is provided in the control device 50, and a stop lamp signal $S_{stp}$ which is generated by a stop lamp switch 505 which is mounted in the vehicle. The longitudinal acceleration $G_x$ is an acceleration in a longitudinal direction with respect to the traveling direction of the vehicle. The stop lamp signal $S_{stp}$ is an electrical signal indicating whether a stop lamp provided in the rear part of the vehicle is turned on, that is, a driver's intention of deceleration. The deceleration determining unit 172 determines whether the vehicle is decelerating based on the longitudinal acceleration $G_x$, the vehicle speed change $\Delta V$, and the stop lamp signal $S_{stp}$. The deceleration determining unit 172 sets a value of a flag F8 as a deceleration determination result indicating whether the vehicle is decelerating. When it is determined that the vehicle is decelerating, the deceleration determining unit 172 sets the value of the flag F8 to "1." When it is determined that the vehicle is not decelerating, the deceleration determining unit 172 sets the value of the flag F8 to "0." Details of the deceleration determining unit 172 will be described later.

The acceleration determining unit 173 receives the longitudinal acceleration $G_x$ detected by the longitudinal acceleration sensor 503, the vehicle speed change per unit time $\Delta V$ calculated by the vehicle speed change calculating unit 504, and an acceleration operation amount $\theta_{ap}$ which is detected by an accelerator position sensor 506 which is mounted in the vehicle. The acceleration determining unit 173 determines whether the vehicle is accelerating based on the longitudinal acceleration $G_x$, the vehicle speed change $\Delta V$, and the acceleration operation amount $\theta_{ap}$. The acceleration operation amount $\theta_{ap}$ is an amount of operation of an accelerator pedal and indicates a driver's intention of acceleration. The acceleration determining unit 173 sets a value of a flag F9 as an acceleration determination result indicating whether the vehicle is accelerating. When it is determined that the vehicle is accelerating, the acceleration determining unit 173 sets the value of the flag F9 to "1." When it is determined that the vehicle is not accelerating, the acceleration determining unit 173 sets the value of the flag F9 to "0." Details of the acceleration determining unit 173 will be described later.

The corrected vehicle speed calculating unit 113 receives the value of the flag F0 which is the end determination result, the value of the flag F7 which is the turn determination result, the value of the flag F8 which is the deceleration determination result, and the value of the flag F9 which is the acceleration determination result. As described in parentheses in FIG. 8, the determination unit 113A of the corrected vehicle speed calculating unit 113 sets the value of the flag F3 indicating whether the value of the vehicle speed V used to calculate the steering end angle $\theta_{end}$ is to be fixed based on the value of the flag F0, the value of the flag F7, the value of the flag F8, and the value of the flag F9.

Similarly to the first embodiment, the determination unit 113A sets the value of the flag F3 based on the value of the flag F0. The determination unit 113A sets the value of the flag F3 based on the values of the flags F7, F8, and F9 independently from the value of the flag F0.

When the value of the flag F7 is "0," that is, when the vehicle is not turning, the determination unit 113A determines that the value of the vehicle speed V is not to be fixed, and sets the value of the flag F3 to "0" regardless of the values of the flags F8 and F9. Accordingly, the vehicle speed V detected by the vehicle speed sensor 501 is used as the final vehicle speed used to calculate the steering end angle $\theta_{end}$.

When the value of the flag F7 is 1" and the value of the flag F8 is "1," that is, when the vehicle is decelerating while turning, the determination unit 113A determines that the value of the vehicle speed V is to be fixed, and sets the value of the flag F3 to "1." Accordingly, the value of the corrected vehicle speed $V_c$ which is the final vehicle speed used to calculate the steering end angle $\theta_{end}$ is fixed to the previous value $V_{cn-1}$ of the corrected vehicle speed $V_c$ stored in the previous value storage unit 113B.

When the value of the flag F7 is "1" and the value of the flag F9 is "1," that is, when the vehicle is accelerating while turning, the determination unit 113A determines that the value of the vehicle speed V is to be fixed, and sets the value of the flag F3 to "1." Accordingly, the value of the corrected vehicle speed $V_c$ which is the final vehicle speed used to calculate the steering end angle $\theta_{end}$ is fixed to the previous value $V_{cn-1}$ of the corrected vehicle speed $V_c$ stored in the previous value storage unit 113B.

Figure 14:
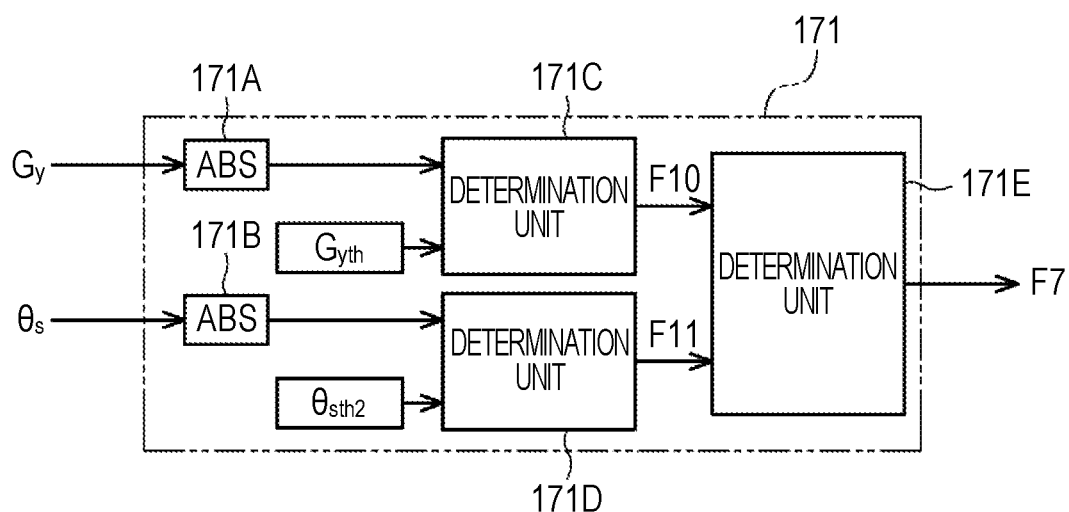
FIG. 14 is a block diagram illustrating a turn determining unit according to the fourth embodiment.

The turn determining unit 171 will be described below in detail. As illustrated in FIG. 14, the turn determining unit 171 includes two absolute value calculating units 171A and 171B and three determination units 171C, 171D, and 171E.

The absolute value calculating unit 171A calculates the absolute value of the lateral acceleration $G_y$ calculated by the lateral acceleration sensor 502. The absolute value calculating unit 171B calculates the absolute value of the steering angle $\theta_s$ calculated by the steering angle calculating unit 51.

The determination unit 171C receives the absolute value of the lateral acceleration $G_y$ calculated by the absolute value calculating unit 171A and a lateral acceleration threshold value $G_{yth}$ stored in the storage device of the control device 50. The lateral acceleration threshold value $G_{yth}$ is set based on a point of view for determining whether the vehicle is turning. The determination unit 171C compares the absolute value of the lateral acceleration $G_y$ with the lateral acceleration threshold value $G_{yth}$ and sets a value of a flag F10 based on the comparison result. When the absolute value of the lateral acceleration $G_y$ is less than the lateral acceleration threshold value $G_{yth}$, the determination unit 171C sets the value of the flag F10 to "0." When the absolute value of the lateral acceleration $G_y$ is greater than the lateral acceleration threshold value $G_{yth}$, the determination unit 171C sets the value of the flag F10 to "1."

The determination unit 171D receives the absolute value of the steering angle $\theta_s$ calculated by the absolute value calculating unit 171B and a steering angle threshold value $\theta_{sth2}$ stored in the storage device of the control device 50. The steering angle threshold value $\theta_{sth2}$ is set based on a point of view for determining whether the vehicle is turning. The determination unit 171D compares the absolute value of the steering angle $\theta_s$ with the steering angle threshold value $\theta_{sth2}$ and sets a value of a flag F11 based on the comparison result. When the absolute value of the steering angle $\theta_s$ is less than the steering angle threshold value $\theta_{sth2}$, the determination unit 171D sets the value of the flag F11 to "0." When the absolute value of the steering angle $\theta_s$ is greater than the steering angle threshold value $\theta_{sth2}$, the determination unit 171D sets the value of the flag F11 to "1."

The determination unit 171E receives the value of the flag F10 set by the determination unit 171C and the value of the flag F11 set by the determination unit 171D. The determination unit 171E sets the value of the flag F7 based on the values of the flag F10 and the flag F11 as a determination result indicating whether the vehicle is turning. When the value of at least one of the flag F10 and the flag F11 is "0," the determination unit 171E determines that the vehicle is not turning and sets the value of the flag F7 to "0." When the values of both the flag F10 and the flag F11 are "1," the determination unit 171E determines that the vehicle is turning and sets the vehicle of the flag F7 to "1."

The lateral acceleration threshold value $G_{yth}$ and the steering angle threshold value $\theta_{sth2}$ may be changed according to the vehicle speed V. The deceleration determining unit 172 will be described below in detail.

Figure 15:
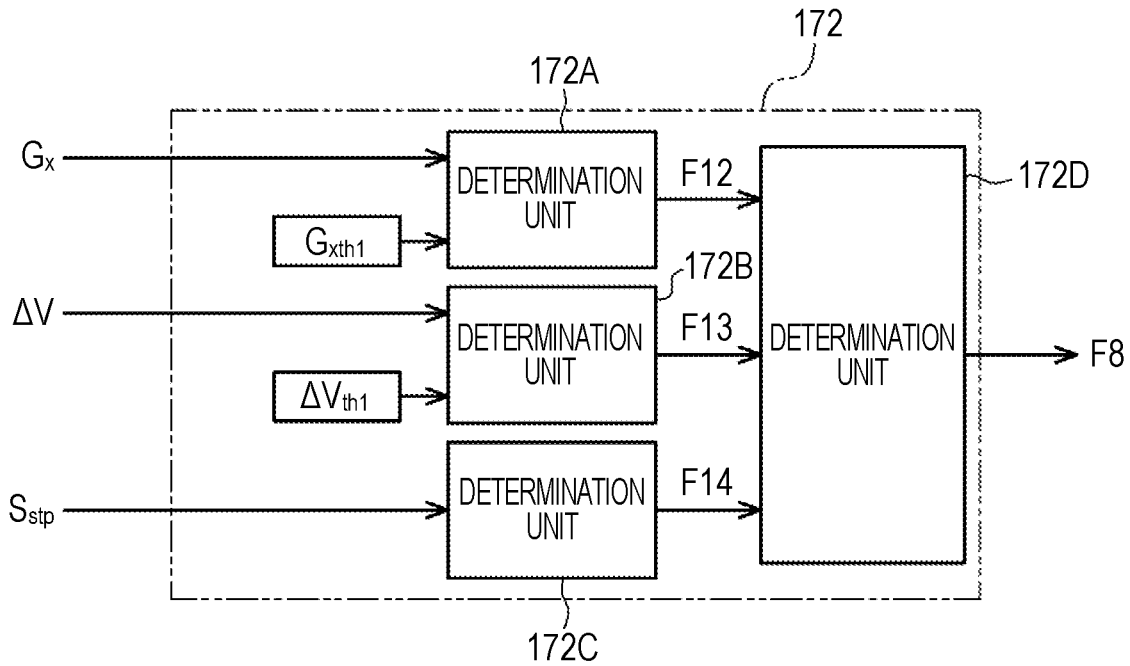
FIG. 15 is a block diagram illustrating a deceleration determining unit according to the fourth embodiment.

As illustrated in FIG. 15, the deceleration determining unit 172 includes four determination units 172A, 172B, 172C, and 172D. The determination unit 172A receives the longitudinal acceleration $G_x$ detected by the longitudinal acceleration sensor 503 and a longitudinal acceleration threshold value $G_{xth1}$ stored in the storage device of the control device 50. The longitudinal acceleration threshold value $G_{xth1}$ is set based on a point of view for determining whether the vehicle is decelerating. The determination unit 172A compares the longitudinal acceleration $G_x$ with the longitudinal acceleration threshold value $G_{xth1}$ and sets a value of a flag F12 based on a comparison result thereof. When the value of the longitudinal acceleration $G_x$ is less than the longitudinal acceleration threshold value $G_{xth1}$, the determination unit 172A sets the value of the flag F12 to "0." When the value of the longitudinal acceleration $G_x$ is greater than the longitudinal acceleration threshold value $G_{xth1}$, the determination unit 172A sets the value of the flag F12 to "1."

The determination unit 172B receives the vehicle speed change per unit time $\Delta V$ calculated by the vehicle speed change calculating unit 504 and a vehicle speed change threshold value $\Delta V_{th1}$ stored in the storage device of the control device 50. The vehicle speed change threshold value $\Delta V_{th1}$ is set based on a point of view for determining whether the vehicle is decelerating. The determination unit 172B compares the vehicle speed change per unit time $\Delta V$ with the vehicle speed change threshold value $\Delta V_{th1}$ and sets a value of a flag F13 based on a comparison result thereof. When the value of the vehicle speed change per unit time $\Delta V$ is less than the vehicle speed change threshold value $\Delta V_{th1}$, the determination unit 172B sets the value of the flag F13 to "0." When the value of the vehicle speed change per unit time $\Delta V$ is greater than the vehicle speed change threshold value $\Delta V_{th1}$, the determination unit 172B sets the value of the flag F13 to "1."

The determination unit 172C receives the stop lamp signal $S_{stp}$ generated by the stop lamp switch 505. When the stop lamp signal $S_{stp}$ indicates that the stop lamp is turned off, the determination unit 172C sets a value of a flag F14 to "0." When the stop lamp signal $S_{stp}$ indicates that the stop lamp is turned on, the determination unit 172C sets the value of the flag F14 to "1."

The determination unit 172D receives the value of the flag F12 set by the determination unit 172A, the value of the flag F13 set by the determination unit 172B, and the value of the flag F14 set by the determination unit 172C. The determination unit 172D sets the value of the flag F8 based on the values of the flag F12, the flag F13, and the flag F14 as a determination result indicating whether the vehicle is decelerating. When the value of at least one of the flag F12, the flag F13, and the flag F14 is "0," the determination unit 172D determines that the vehicle is not decelerating, and sets the value of the flag F8 to "0." When the values of all the flag F12, the flag F13, and the flag F14 are "1," the determination unit 172D determines that the vehicle is decelerating, and sets the value of the flag F8 to "1."

The longitudinal acceleration threshold value $G_{xth1}$ and the vehicle speed change threshold value $\Delta V_{th1}$ may be changed according to the vehicle speed V. A configuration in which the determination unit 172C is omitted may be employed as the deceleration determining unit 172. In this case, the determination unit 172D sets the value of the flag F8 to "0" when the value of at least one of the flag F12 and the flag F13 is "0." The determination unit 172D sets the value of the flag F8 to "1" when the values of both the flag F12 and the flag F13 are "1."

Figure 16:
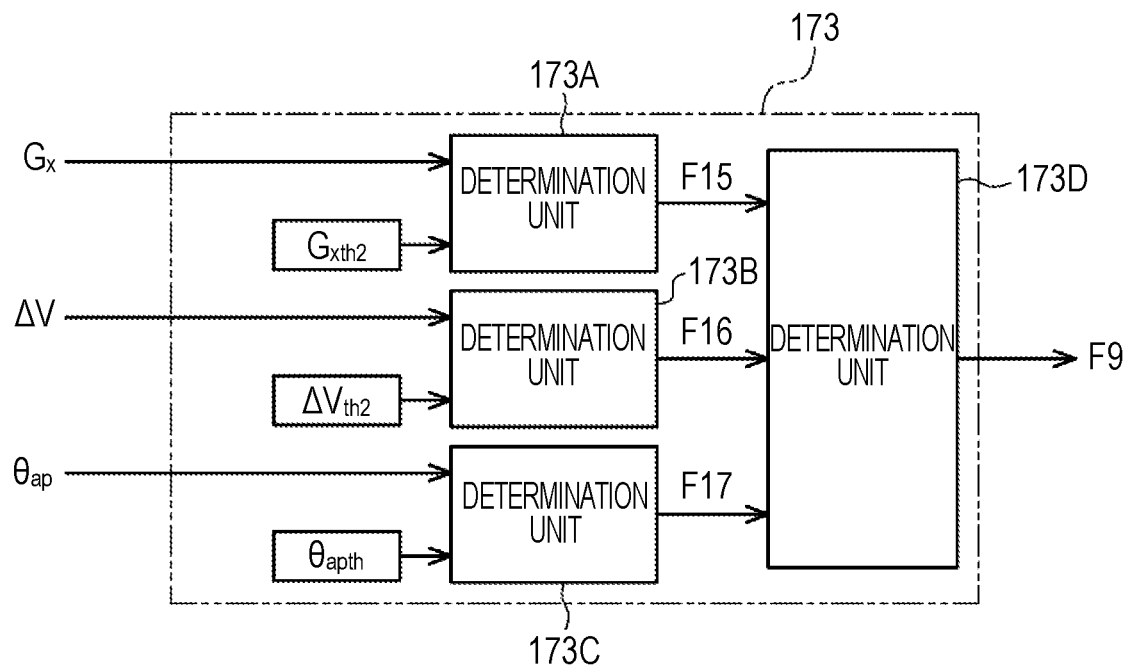
FIG. 16 is a block diagram illustrating an acceleration determining unit according to the fourth embodiment.

The acceleration determining unit 173 will be described below in detail. As illustrated in FIG. 16, the acceleration determining unit 173 includes four determination units 173A, 173B, 173C, and 173D.

The determination unit 173A receives the longitudinal acceleration G, detected by the longitudinal acceleration sensor 503 and a longitudinal acceleration threshold value $G_{xth2}$ stored in the storage device of the control device 50. The longitudinal acceleration threshold value $G_{xth2}$ is set based on a point of view for determining whether the vehicle is accelerating. The determination unit 173A compares the longitudinal acceleration G, with the longitudinal acceleration threshold value $G_{xth2}$ and sets a value of a flag F15 based on a comparison result thereof. When the value of the longitudinal acceleration $G_x$ is less than the longitudinal acceleration threshold value $G_{xth2}$, the determination unit 173A sets the value of the flag F15 to "0." When the value of the longitudinal acceleration $G_x$ is greater than the longitudinal acceleration threshold value $G_{xth2}$, the determination unit 173A sets the value of the flag F15 to "1."

The determination unit 173B receives the vehicle speed change per unit time ΔV calculated by the vehicle speed change calculating unit 504 and a vehicle speed change threshold value $\Delta V_{th2}$ stored in the storage device of the control device 50. The vehicle speed change threshold value $\Delta V_{th2}$ is set based on a point of view for determining whether the vehicle is accelerating. The determination unit 173B compares the vehicle speed change per unit time ΔV with the vehicle speed change threshold value $\Delta V_{th2}$ and sets a value of a flag F16 based on a comparison result thereof. When the value of the vehicle speed change per unit time ΔV is less than the vehicle speed change threshold value $\Delta V_{th2}$, the determination unit 173B sets the value of the flag F16 to "0." When the value of the vehicle speed change per unit time ΔV is greater than the vehicle speed change threshold value $\Delta V_{th2}$, the determination unit 173B sets the value of the flag F16 to "1."

The determination unit 173C receives the acceleration operation amount $\theta_{ap}$ detected by the accelerator position sensor 506 and an acceleration operation amount threshold value $\theta_{apth}$ stored in the storage device of the control device 50. The acceleration operation amount threshold value $\theta_{apth}$ is set based on a point of view for determining whether the vehicle is accelerating. The determination unit 173C compares the acceleration operation amount $\theta_{ap}$ with the acceleration operation amount threshold value $\theta_{apth}$, and sets a value of a flag F17 based on a comparison result thereof. When the value of the acceleration operation amount $\theta_{ap}$ is less than the acceleration operation amount threshold value $\theta_{apth}$, the determination unit 173C sets the value of the flag F17 to "0." When the acceleration operation amount $\theta_{ap}$ is greater than the acceleration operation amount threshold value $\theta_{apth}$, the determination unit 173C sets the value of the flag F17 to "1."

The determination unit 173D receives the value of the flag F15 set by the determination unit 173A, the value of the flag F16 set by the determination unit 173B, and the value of the flag F17 set by the determination unit 173C. The determination unit 173D sets the value of the flag F9 based on the values of the flag F15, the flag F16, and the flag F17 as a determination result indicating whether the vehicle is accelerating. When the value of at least one of the flag F15, the flag F16, and the flag F17 is "0," the determination unit 173D determines that the vehicle is not accelerating, and sets the value of the flag F9 to "0." When the values of all the flag F15, the flag F16, and the flag F17 are "1," the determination unit 173D determines that the vehicle is accelerating, and sets the value of the flag F9 to "1."

The longitudinal acceleration threshold value $G_{xth2}$ and the vehicle speed change threshold value $\Delta V_{th2}$ may be changed according to the vehicle speed V. A configuration in which the determination unit 173C is omitted may be employed as the acceleration determining unit 173. In this case, the determination unit 173D sets the value of the flag F9 to "0" when the value of at least one of the flag F15 and the flag F16 is "0." The determination unit 173D sets the value of the flag F9 to "1" when the values of both the flag F15 and the flag F16 are "1."

Accordingly, according to the fourth embodiment, the following advantages can be obtained in addition to the same advantages as in the first embodiment. Regardless of whether the operation position of the steering wheel 11 has reached a position in the vicinity of the limit position of the virtual operation range thereof, when the vehicle is decelerating or accelerating while turning, the corrected vehicle speed $V_c$ which is the final vehicle speed used to calculate the steering end angle $\theta_{end}$ is fixed to the vehicle speed immediately before it is determined that the vehicle is decelerating while turning or immediately before it is determined that the vehicle is accelerating while turning. Accordingly, regardless of whether the operation position of the steering wheel 11 has reached a position in the vicinity of the limit position of the virtual operation range thereof, the operation range of the steering wheel 11 does not narrow with the decrease of the vehicle speed V when the vehicle is decelerating while turning. As a result, the steering wheel 11 is not rotated such that it is pushed back in the direction opposite to the current steering direction. Accordingly, a driver does not feel discomfort such as a feeling of being repelled. Regardless of whether the operation position of the steering wheel 11 has reached a position in the vicinity of the limit position of the virtual operation range thereof, the operation range of the steering wheel 11 does not broaden with the increase of the vehicle speed V when the vehicle is accelerating while turning. That is, since the current limit position of the operation range is maintained, a driver does not feel a so-called feeling of steering error. Accordingly, regardless of whether the operation position of the steering wheel 11 has reached a position in the vicinity of the limit position of the virtual operation range thereof, it is possible to curb change of a feeling of steering which is not intended by a driver when the vehicle is decelerating or accelerating while turning.

When a configuration in which deceleration of the vehicle is determined based on the stop lamp signal $S_{stp}$ in addition to the longitudinal acceleration $G_x$ and the vehicle speed change per unit time ΔV is employed as the deceleration determining unit 172, it is possible to more appropriately determine deceleration of the vehicle. For example, when the vehicle is traveling on an uphill road, it is conceivable that the vehicle speed V decreases even if a driver does not have an intention of deceleration. In this regard, it is possible to more appropriately determine deceleration of the vehicle on an uphill road based on a driver's intention by considering the stop lamp signal $S_{stp}$.

When a configuration in which acceleration of the vehicle is determined based on the acceleration operation amount $\theta_{ap}$ in addition to the longitudinal acceleration $G_x$ and the vehicle speed change per unit time ΔV is employed as the acceleration determining unit 173, it is possible to more appropriately determine acceleration of the vehicle. For example, when the vehicle is traveling on a downhill road, it is conceivable that the vehicle speed V increases even if a driver does not have an intention of acceleration. In this regard, it is possible to more appropriately determine acceleration of the vehicle on a downhill road based on a driver's intention by considering the acceleration operation amount $\theta_{ap}$.

Fifth Embodiment

A steering control device according to a fifth embodiment will be described below. Basically, the steering control device according to this embodiment has the same configuration as in the first embodiment illustrated in FIGS. 1 to 9. This embodiment is different from the first embodiment in the configuration of the end determining unit. This embodiment may be applied to the second to fourth embodiments.

Figure 17:
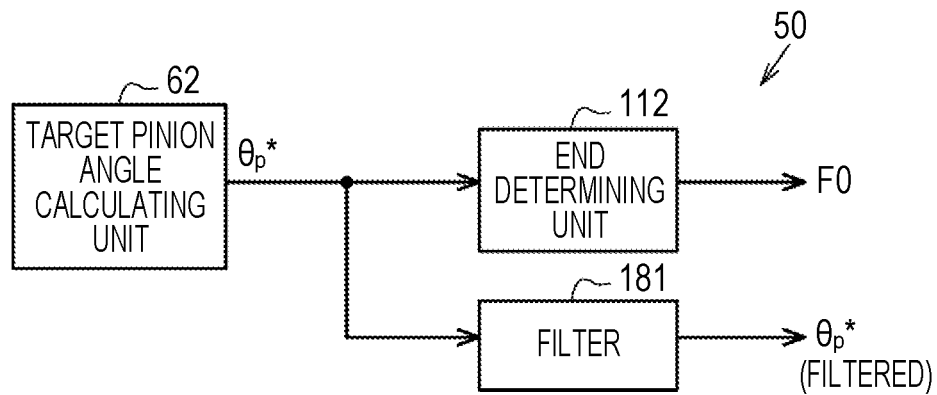
FIG. 17 is a block diagram illustrating a principal part of a control device according to a fifth embodiment.

As illustrated in FIG. 17, the end determining unit 112 determines whether the operation position of the steering wheel 11 has reached a position in the vicinity of the limit position of the virtual operation range thereof based on the target pinion angle $\theta_p^*$ calculated by the target pinion angle calculating unit 62, and sets the value of the flag F0 based on a determination result thereof.

Figure 18:
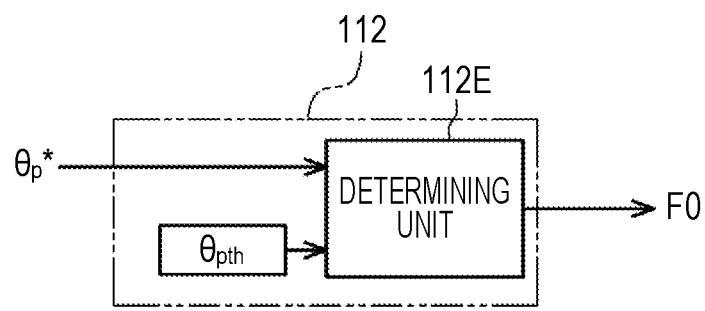
FIG. 18 is a block diagram illustrating an end determining unit according to the fifth embodiment.

As illustrated in FIG. 18, the end determining unit 112 includes a determination unit 112E. The determination unit 112E receives the target pinion angle $\theta_p^*$ calculated by the target pinion angle calculating unit 62 and a threshold value $\theta_{pth}$ stored in the storage device of the control device 50. The threshold value $\theta_{pth}$ is a value serving as a reference for determining whether the operation position of the steering wheel 11 has reached a position in the vicinity of the limit position of the virtual operation range thereof. The threshold value $\theta_{pth}$ is set based on the pinion angle $\theta_p$ when the turning shaft 14 has approached a limit position of a physical operation range thereof. The determination unit 112E compares the target pinion angle $\theta_p^*$ with the threshold value $\theta_{pth}$ and sets the value of the flag F0 based on a comparison result thereof. When the value of the target pinion angle $\theta_p^*$ is greater than the threshold value $\theta_{pth}$, the determination unit 112E sets the value of the flag F0 to "1." When the value of the target pinion angle $\theta_p^*$ is less than the threshold value $\theta_{pth}$, the determination unit 112E sets the value of the flag F0 to "0."

As illustrated in FIG. 17, a filter 181 may be provided in the control device 50. The filter 181 performs a filtering process on the target pinion angle $\theta_p^*$ calculated by the target pinion angle calculating unit 62. Accordingly, noise of the target pinion angle $\theta_p^*$ calculated by the target pinion angle calculating unit 62 is removed.

Accordingly, according to the fifth embodiment, the following advantages can be obtained in addition to the same advantages as in the first embodiment. Whether the operation position of the steering wheel 11 has reached a position in the vicinity of the limit position of the virtual operation range thereof can be determined using the target pinion angle $\theta_p^*$ calculated by the target pinion angle calculating unit 62. Depending on product specifications or the like, it may be requested to determine whether the operation position of the steering wheel 11 has reached a position in the vicinity of the limit position of the virtual operation range thereof without using the steering end angle $\theta_{end}$, the steering angle $\theta_s$, and the vehicle speed V, and this request can be satisfied.

Sixth Embodiment

A steering control device according to a sixth embodiment will be described below. This embodiment is different from the fourth embodiment in the configuration of the turn determining unit.

Figure 19:
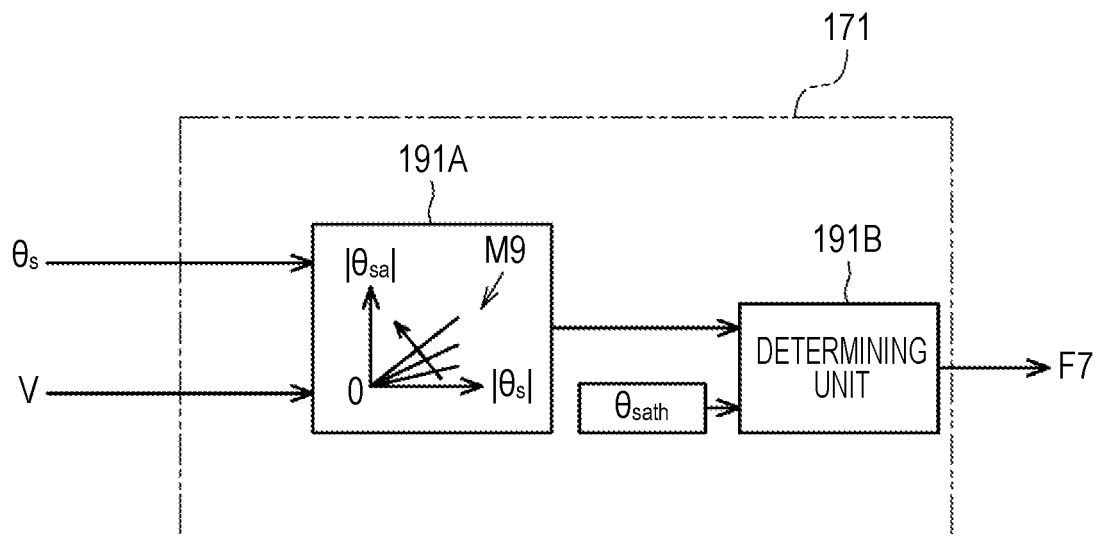
FIG. 19 is a block diagram illustrating a turn determining unit according to a sixth embodiment.

As illustrated in FIG. 19, the turn determining unit 171 includes a slip angle calculating unit 191A and a determination unit 191B. The slip angle calculating unit 191A receives the steering angle $\theta_s$ calculated by the steering angle calculating unit 51 and the vehicle speed V detected by the vehicle speed sensor 501, and calculates a slip angle $\theta_{sa}$ based on the steering angle $\theta_s$ and the vehicle speed V which are received. The slip angle $\theta_{sa}$ is an angle which is formed by the direction of the turning wheels 16 and the traveling direction of the vehicle. The slip angle calculating unit 191A calculates the slip angle $\theta_{sa}$ using a map M9 which is stored in the storage device of the control device 50. The map M9 is a three-dimensional map in which a relationship between the steering angle $\theta_s$ and the slip angle $\theta_{sa}$ is defined according to the vehicle speed V, and has the following characteristics. That is, as the absolute value of the steering angle $\theta_s$ becomes larger and as the vehicle speed V becomes higher, the absolute value of the slip angle $\theta_{sa}$ becomes larger.

The determination unit 191B receives the absolute value of the slip angle $\theta_{sa}$ calculated by the slip angle calculating unit 191A and a slip angle threshold value $\theta_{sath}$ stored in the storage device of the control device 50. The slip angle threshold value $\theta_{sath}$ is set based on a point of view for determining whether the vehicle is turning. The determination unit 191B compares the absolute value of the slip angle $\theta_{sa}$ with the slip angle threshold value $\theta_{sath}$ and sets the value of the flag F7 based on a comparison result thereof. When the absolute value of the slip angle $\theta_{sa}$ is less than the slip angle threshold value $\theta_{sath}$, the determination unit 191B determines that the vehicle is not turning, and sets the value of the flag F7 to "0." When the absolute value of the slip angle $\theta_{sa}$ is greater than the slip angle threshold value $\theta_{sath}$, the determination unit 191B determines that the vehicle is turning, and sets the value of the flag F7 to "1."

Accordingly, according to the sixth embodiment, the following advantages can be obtained. It is possible to determine whether the vehicle is turning based on the steering angle $\theta_s$ and the vehicle speed V.

Seventh Embodiment

A steering control device according to a seventh embodiment will be described below. This embodiment is different from the fourth embodiment in the configurations of the turn determining unit, the deceleration determining unit, and the acceleration determining unit.

Wheels of the vehicle are rotatably supported on a vehicle body via hub unit bearings, and a tire force sensor that detects a tire force may be provided in each hub unit bearing. The tire force is a load acting between a road surface and each wheel.

Figure 20:
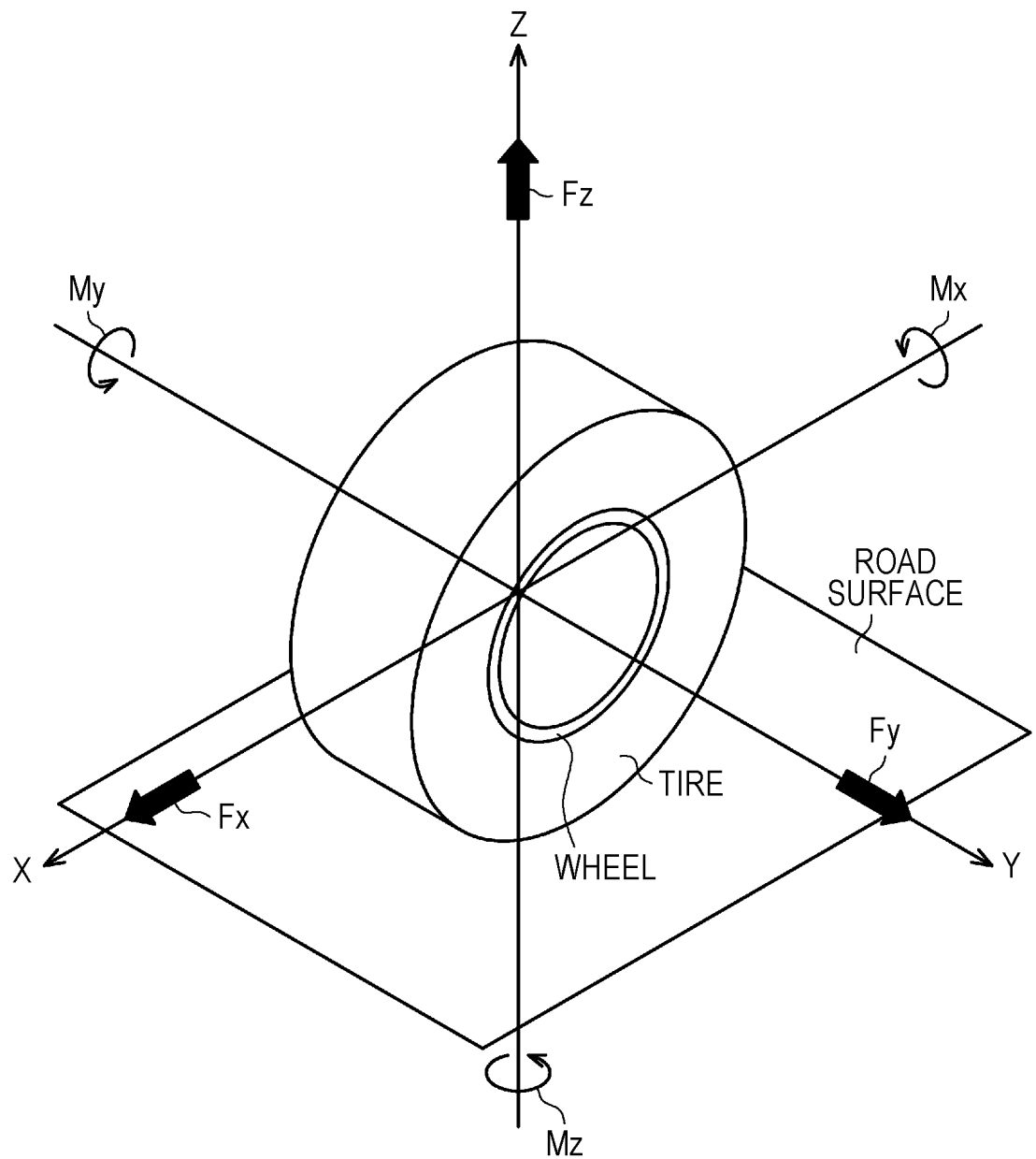
FIG. 20 is a perspective view of a vehicle wheel indicating axial components of a tire force according to a seventh embodiment.

As illustrated in FIG. 20, a load acting between a road surface and each wheel can be expressed by a total of six forces including three forces acting in three directions of an X-axis direction, a Y-axis direction, and a Z-axis direction and three moments acting around three axes of the X axis, the Y axis, and the Z axis. Here, the X-axis direction is a longitudinal horizontal direction of the wheels. The Y-axis direction is a lateral horizontal direction of the wheels. The Z-axis direction is a vertical direction of the wheels. A force acting in the X-axis direction of each wheel is referred to as a longitudinal load (longitudinal force) $F_x$, a force acting in the Y-axis direction of each wheel is referred to as a lateral load (lateral force) $F_y$, and a force acting in the Z-axis direction of each wheel is referred to as a vertical load (vertical force) $F_z$. A moment acting around the X axis of each wheel is referred to as a rolling moment $M_x$, a moment acting around the Y axis of each wheel is referred to as a pitching moment $M_y$, and a moment acting around the Z axis of each vehicle is referred to as a yawing moment $M_z$.

Figure 21:
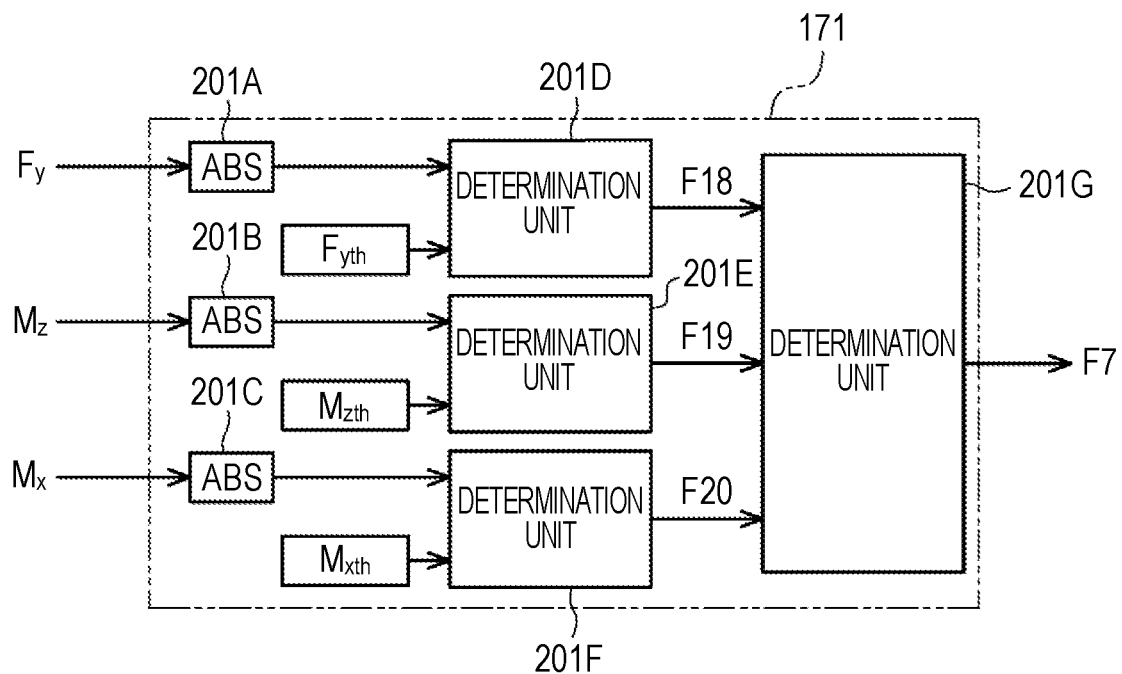
FIG. 21 is a block diagram illustrating a turn determining unit according to the seventh embodiment.

When such a tire force sensor is provided, the following configurations may be employed as the turn determining unit 171, the deceleration determining unit 172, and the acceleration determining unit 173. As illustrated in FIG. 21, the turn determining unit 171 includes three absolute value calculating units 201A, 201B, and 201C and four determination units 201D, 201E, 201F, and 201G.

The absolute value calculating unit 201A calculates an absolute value of the lateral load $F_y$ detected by the tire force sensor. The absolute value calculating unit 201B calculates an absolute value of the yawing moment $M_z$ detected by the tire force sensor.

The absolute value calculating unit 201C calculates an absolute value of the rolling moment $M_x$ detected by the tire force sensor. The determination unit 201D receives the absolute value of the lateral load $F_y$ calculated by the absolute value calculating unit 201A and a lateral load threshold value $F_{yth}$ stored in the storage device of the control device 50. The lateral load threshold value $F_{yth}$ is set based on a point of view for determining whether the vehicle is turning. The determination unit 201D compares the absolute value of the lateral load $F_y$ with the lateral load threshold value $F_{yth}$ and sets a value of a flag F18 based on a comparison result thereof. When the absolute value of the lateral load $F_y$ is less than the lateral load threshold value $F_{yth}$, the determination unit 201D sets the value of the flag F18 to "0." When the absolute value of the lateral load $F_y$ is greater than the lateral load threshold value $F_{yth}$, the determination unit 201D sets the value of the flag F18 to "1."

The determination unit 201E receives the absolute value of the yawing moment $M_z$ calculated by the absolute value calculating unit 201B and a yawing moment threshold value $M_{zth}$ stored in the storage device of the control device 50. The yawing moment threshold value $M_{zth}$ is set based on a point of view for determining whether the vehicle is turning. The determination unit 201E compares the absolute value of the yawing moment $M_z$ with the yawing moment threshold value $M_{zth}$ and sets a value of a flag F19 based on a comparison result thereof. When the absolute value of the yawing moment $M_z$ is less than the yawing moment threshold value $M_{zth}$, the determination unit 201E sets the value of the flag F19 to "0." When the absolute value of the yawing moment $M_z$ is greater than the yawing moment threshold value $M_{zth}$, the determination unit 201E sets the value of the flag F19 to "1."

The determination unit 201F receives the absolute value of the rolling moment $M_x$ calculated by the absolute value calculating unit 201C and a rolling moment threshold value $M_{xth}$ stored in the storage device of the control device 50. The rolling moment threshold value $M_{xth}$ is set based on a point of view for determining whether the vehicle is turning. The determination unit 201F compares the absolute value of the rolling moment $M_x$ with the rolling moment threshold value $M_{xth}$ and sets a value of a flag F20 based on a comparison result thereof. When the absolute value of the rolling moment $M_x$ is less than the rolling moment threshold value $M_{xth}$, the determination unit 201F sets the value of the flag F20 to "0." When the absolute value of the rolling moment $M_x$ is greater than the rolling moment threshold value $M_{xth}$, the determination unit 201F sets the value of the flag F20 to "1."

The determination unit 201G receives the value of the flag F18 set by the determination unit 201D, the value of the flag F19 set by the determination unit 201E, and the value of the flag F20 set by the determination unit 201F The determination unit 201G sets the value of the flag F7 as a determination result indicating whether the vehicle is turning based on the values of the flag F18, the flag F19, and the flag F20. When the value of at least one of the flag F18, the flag F19, and the flag F20 is "0," the determination unit 201G determines that the vehicle is not turning, and sets the value of the flag F7 to "0." When the values of all the flag F18, the flag F19, and the flag F20 are "1," the determination unit 201G determines that the vehicle is turning, and sets the value of the flag F7 to "1."

Figure 22:
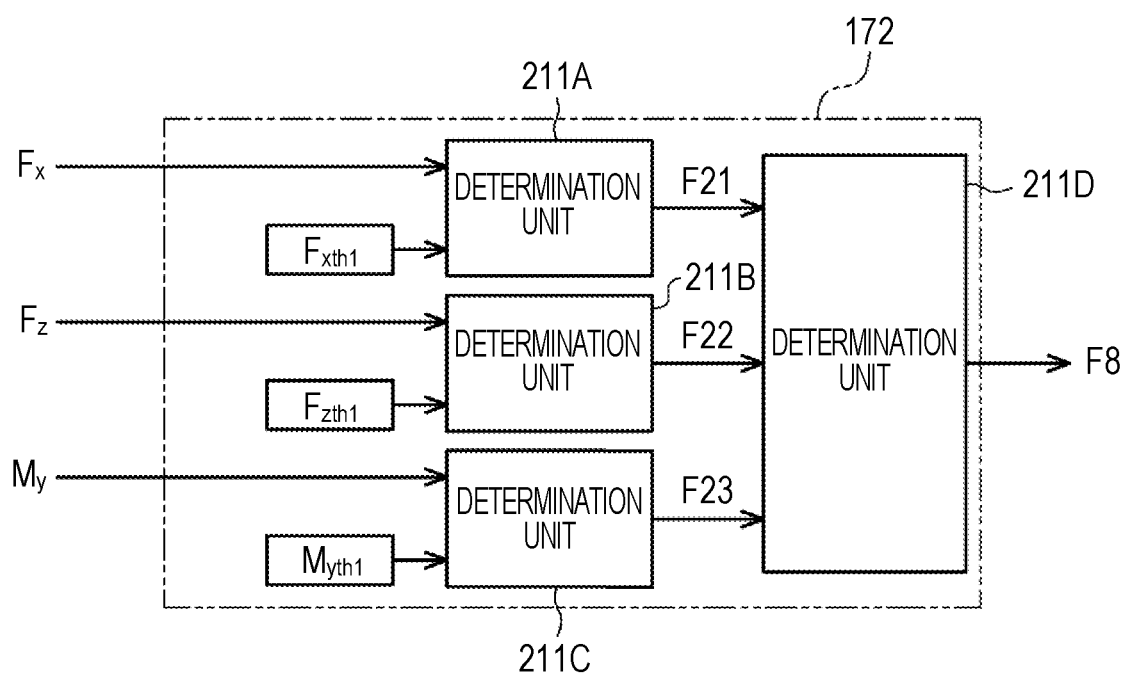
FIG. 22 is a block diagram illustrating a deceleration determining unit according to the seventh embodiment.

As illustrated in FIG. 22, the deceleration determining unit 172 includes four determination units 211A, 211B, 211C, and 211D. The determination unit 211A receives the longitudinal load $F_x$ calculated by the tire force sensor and a longitudinal load threshold value $F_{xth1}$ stored in the storage device of the control device 50. The longitudinal load threshold value $F_{xth1}$ is set based on a point of view for determining whether the vehicle is decelerating. The determination unit 211A compares the longitudinal load $F_x$ with the longitudinal load threshold value $F_{xth1}$ and sets a value of a flag F21 based on a comparison result thereof. When the value of the longitudinal load $F_x$ is less than the longitudinal load threshold value $F_{xth1}$, the determination unit 211A sets the value of the flag F21 to "0." When the value of the longitudinal load $F_x$ is greater than the longitudinal load threshold value $F_{xth1}$, the determination unit 211A sets the value of the flag F21 to "1."

The determination unit 211B receives the vertical load $F_z$ calculated by the tire force sensor and a vertical load threshold value $F_{zth1}$ stored in the storage device of the control device 50. The vertical load threshold value $F_{zth1}$ is set based on a point of view for determining whether the vehicle is decelerating. The determination unit 211B compares the vertical load $F_z$ with the vertical load threshold value $F_{zth1}$ and sets a value of a flag F22 based on a comparison result thereof. When the value of the vertical load $F_z$ is less than the vertical load threshold value $F_{zth1}$, the determination unit 211B sets the value of the flag F22 to "0." When the value of the vertical load $F_z$ is greater than the vertical load threshold value $F_{zth1}$, the determination unit 211B sets the value of the flag F22 to "1."

The determination unit 211C receives the pitching moment $M_y$ calculated by the tire force sensor and a pitching moment threshold value $M_{yth1}$ stored in the storage device of the control device 50. The pitching moment threshold value $M_{yth1}$ is set based on a point of view for determining whether the vehicle is decelerating. The determination unit 211C compares the pitching moment $M_y$ with the pitching moment threshold value $M_{yth1}$ and sets a value of a flag F23 based on a comparison result thereof. When the value of the pitching moment $M_y$ is less than the pitching moment threshold value $M_{yth1}$, the determination unit 211C sets the value of the flag F23 to "0." When the value of the pitching moment $M_y$ is greater than the pitching moment threshold value $M_{yth1}$, the determination unit 211C sets the value of the flag F23 to "1."

The determination unit 211D receives the value of the flag F21 set by the determination unit 211A, the value of the flag F22 set by the determination unit 211B, and the value of the flag F23 set by the determination unit 211C. The determination unit 211D sets the value of the flag F8 as a determination result indicating whether the vehicle is decelerating based on the values of the flag F21, the flag F22, and the flag F23. When the value of at least one of the flag F21, the flag F22, and the flag F23 is "0," the determination unit 211D determines that the vehicle is not decelerating, and sets the value of the flag F8 to "0." When the values of all the flag F21, the flag F22, and the flag F23 are "1," the determination unit 211D determines that the vehicle is decelerating, and sets the value of the flag F8 to "1."

Figure 23:
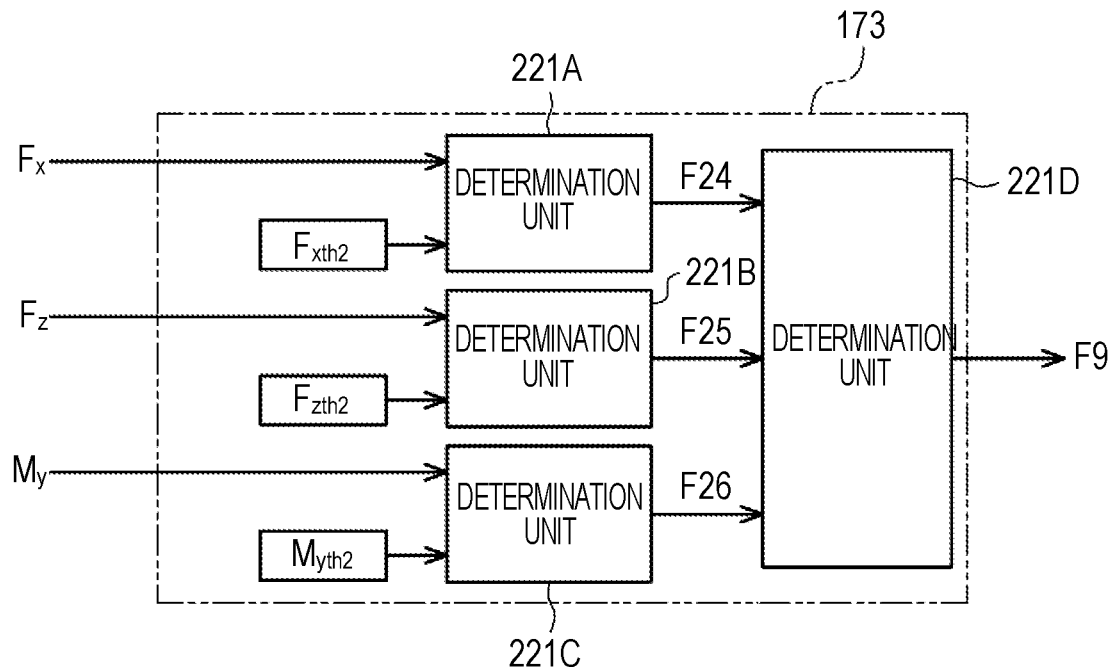
FIG. 23 is a block diagram illustrating an acceleration determining unit according to the seventh embodiment.

As illustrated in FIG. 23, the acceleration determining unit 173 includes four determination units 221A, 221B, 221C, and 221D. The determination unit 221A receives the longitudinal load $F_x$ calculated by the tire force sensor and a longitudinal load threshold value $F_{xth2}$ stored in the storage device of the control device 50. The longitudinal load threshold value $F_{xth2}$ is set based on a point of view for determining whether the vehicle is accelerating. The determination unit 221A compares the longitudinal load $F_x$ with the longitudinal load threshold value $F_{xth2}$ and sets a value of a flag F24 based on a comparison result thereof. When the value of the longitudinal load $F_x$ is less than the longitudinal load threshold value $F_{xth2}$, the determination unit 221A sets the value of the flag F24 to "0." When the value of the longitudinal load $F_x$ is greater than the longitudinal load threshold value $F_{xth2}$, the determination unit 221A sets the value of the flag F24 to "1."

The determination unit 221B receives the vertical load $F_z$ calculated by the tire force sensor and a vertical load threshold value $F_{zth2}$ stored in the storage device of the control device 50. The vertical load threshold value $F_{zth2}$ is set based on a point of view for determining whether the vehicle is accelerating. The determination unit 221B compares the vertical load $F_z$ with the vertical load threshold value $F_{zth2}$ and sets a value of a flag F25 based on a comparison result thereof. When the value of the vertical load $F_z$ is less than the vertical load threshold value $F_{zth2}$, the determination unit 221B sets the value of the flag F25 to "0." When the value of the vertical load $F_z$ is greater than the vertical load threshold value $F_{zth2}$, the determination unit 221B sets the value of the flag F25 to "1."

The determination unit 221C receives the pitching moment $M_y$ calculated by the tire force sensor and a pitching moment threshold value $M_{yth2}$ stored in the storage device of the control device 50. The pitching moment threshold value $M_{yth2}$ is set based on a point of view for determining whether the vehicle is accelerating. The determination unit 221C compares the pitching moment $M_y$ with the pitching moment threshold value $M_{yth2}$ and sets a value of a flag F26 based on a comparison result thereof. When the value of the pitching moment $M_y$ is less than the pitching moment threshold value $M_{yth2}$, the determination unit 221C sets the value of the flag F26 to "0." When the value of the pitching moment $M_y$ is greater than the pitching moment threshold value $M_{yth2}$, the determination unit 221C sets the value of the flag F26 to "1."

The determination unit 221D receives the value of the flag F24 set by the determination unit 221A, the value of the flag F25 set by the determination unit 221B, and the value of the flag F26 set by the determination unit 221C. The determination unit 221D sets the value of the flag F9 as a determination result indicating whether the vehicle is accelerating based on the values of the flag F24, the flag F25, and the flag F26. When the value of at least one of the flag F24, the flag F25, and the flag F26 is "0," the determination unit 221D determines that the vehicle is not accelerating, and sets the value of the flag F9 to "0." When the values of all the flag F24, the flag F25, and the flag F26 are "1," the determination unit 221D determines that the vehicle is accelerating, and sets the value of the flag F9 to "1."

Accordingly, according to the seventh embodiment, the following advantages can be obtained. When a tire force sensor is provided in each wheel of the vehicle, whether the vehicle is turning, whether the vehicle is decelerating, and whether the vehicle is accelerating can be determined based on the tire force detected by the tire force sensor.

Eighth Embodiment

A steering control device according to an eighth embodiment will be described below. This embodiment is different from the first embodiment in the configurations of the limiting axial force calculating unit 82.

Figure 24:
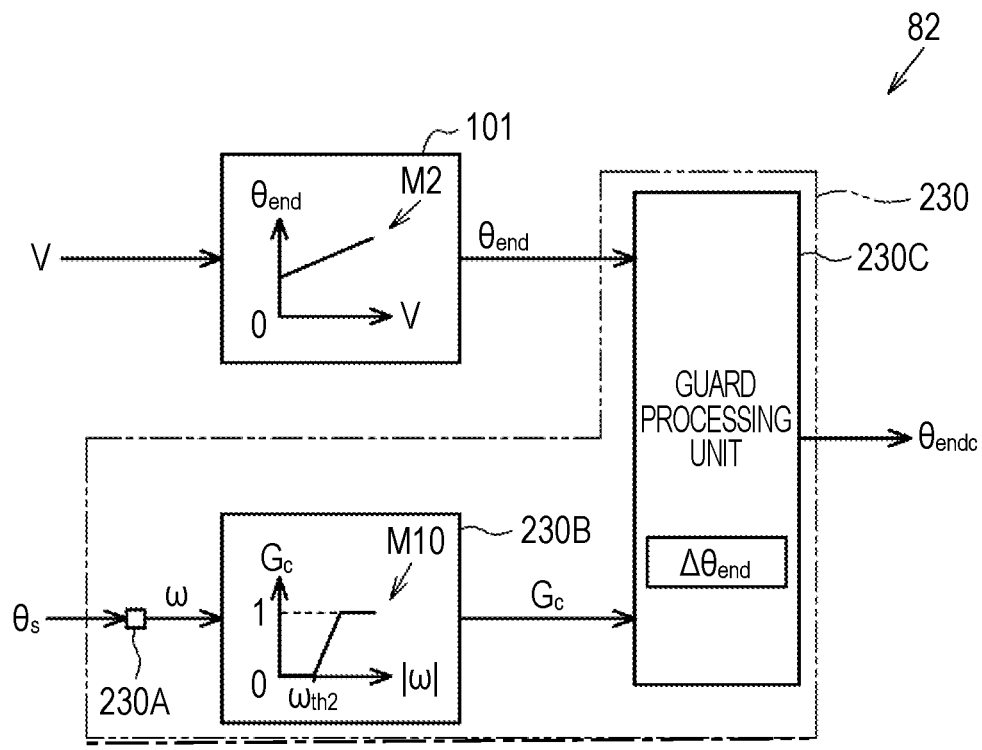
FIG. 24 is a block diagram illustrating a limiting axial force calculating unit according to an eighth embodiment.

As illustrated in FIG. 24, the limiting axial force calculating unit 82 includes a correction processing unit 230. The correction processing unit 230 includes a differentiator 230A, a gain calculating unit 230B, and a guard processing unit 230C.

The differentiator 230A calculates a steering angular velocity ω by differentiating the steering angle $θ_s$ calculated by the steering angle calculating unit 51. The gain calculating unit 230B calculates a gain $G_c$ based on the steering angular velocity ω calculated by the differentiator 230A. The gain calculating unit 230B calculates the gain $G_c$ using a map M10 which is stored in the storage device of the control device 50. The map M10 is a two-dimensional map in which a relationship between the steering angular velocity ω and the gain $G_c$ is defined, and has the following characteristics. That is, when the absolute value of the steering angular velocity ω is equal to or less than a threshold value $ω_{th2}$, the value of the gain $G_c$ is maintained at "0." When the absolute value of the steering angular velocity ω is greater than the threshold value $ω_{th2}$, the value of the gain $G_c$ increases quickly with the increase of the absolute value of the steering angular velocity ω and reaches "1." After the value of the gain $G_c$ has reached "1," the value of the gain $G_c$ is maintained at "1" regardless of the increase of the absolute value of the steering angular velocity ω. The threshold value $ω_{th2}$ is set based on the steering angular velocity ω when the steering wheel 11 is in a held steering state or when the steering wheel 11 is steered slowly.

The guard processing unit 230C receives the steering end angle $θ_{end}$ calculated by the steering end angle calculating unit 101 and the gain $G_c$ calculated by the gain calculating unit 230B. The guard processing unit 230C limits a change per operation cycle of the steering end angle $θ_{end}$ to a limit value $Δθ_{end}$. The limit value $Δθ_{end}$ is set based on a point of view for curbing quick change of the steering end angle $θ_{end}$. The limit value $Δθ_{end}$ may be a fixed value or may be a variable which varies depending on the steering angular velocity ω, the steering angle $θ_s$, or the vehicle speed V. The guard processing unit 230C calculates a final limit value $Δθ_{end}$ by multiplying the limit value $Δθ_{end}$ by the gain $G_c$.

When the value of the gain $G_c$ is "0," the final limit value $Δθ_{end}$ is "0" and thus the change per operation cycle of the steering end angle $θ_{end}$ is limited to "0." Accordingly, when the value of the steering angular velocity ω is equal to or less than the threshold value $ω_{th2}$, the steering end angle $θ_{end}$ is fixed to a value when the value of the steering angular velocity ω has reached a value equal to or less than the threshold value $ω_{th2}$. When the value of the gain $G_c$ is "1," the change per operation cycle of the steering end angle $θ_{end}$ is limited to the limit value $Δθ_{end}$.

Operations of the eighth embodiment will be described below. For example, when the vehicle is turning in a state in which the steering wheel 11 is held at a constant steering angle $θ_s$, the value of the steering angular velocity ω is "0." At this time, since the value of the gain $G_c$ is "0," the change per operation cycle of the steering end angle $θ_{end}$ is limited to "0." Accordingly, a corrected steering end angle $θ_{endc}$ which is a final steering end angle $θ_{end}$ used to calculate the limiting axial force AF4 is fixed to the same value as the steering end angle $\theta_{end}$ based on the vehicle speed V when the steering wheel 11 is in the held steering state (more accurately when the steering angular velocity ω has reached a value equal to or less than the threshold value $\omega_{th2}$) regardless of the change of the vehicle speed V. That is, the value of the corrected steering end angle $\theta_{endc}$ does not change with the change of the vehicle speed V.

Accordingly, when the vehicle is decelerating in the state in which the steering wheel 11 is held at a constant steering angle $\theta_s$, the operation range of the steering wheel 11 does not narrow with the decrease of the vehicle speed V. Accordingly, the steering wheel 11 does not rotated such that it is pushed back in the direction opposite to the current steering direction. As a result, a driver does not feel discomfort such as a feeling of being repelled. When the vehicle is accelerating in the state in which the steering wheel 11 is held at a constant steering angle $\theta_s$, the operation range of the steering wheel 11 does not broaden with the increase of the vehicle speed V. That is, since the current limit position of the operation range is maintained, a driver does not feel a so-called feeling of steering error. In this way, even when the vehicle speed V is changing in the state in which the steering wheel 11 is held at a constant steering angle $\theta_s$, it is possible to curb change of a feeling of steering which is not intended by a driver.

When the steering wheel 11 is steered slowly at a steering angular velocity ω equal to or less than a threshold value, the value of the corrected steering end angle $\theta_{endc}$ is fixed similarly to a case in which the steering wheel 11 is in the held steering state.

Then, when steering of the steering wheel 11 is restarted, there is the following concern. That is, it is conceivable that the value of the corrected steering end angle $\theta_{endc}$ which is fixed immediately before the steering of the steering wheel 11 is restarted becomes different from the value of the steering end angle $\theta_{end}$ calculated by the steering end angle calculating unit 101 immediately after the steering of the steering wheel 11 is restarted.

In this regard, when the steering angular velocity ω becomes greater than the threshold value $\omega_{th2}$ due to restarting of the steering of the steering wheel 11, the value of the gain $G_c$ is set to, for example, "1." Accordingly, even when the value of the steering end angle $\theta_{end}$ which is calculated immediately after the steering of the steering wheel 11 is restarted becomes different from the value of the corrected steering end angle $\theta_{endc}$ which is fixed immediately before the steering of the steering wheel 11 is restarted, the change per operation cycle of the steering end angle $\theta_{end}$ is limited to the limit value $\Delta\theta_{end}$ by the guard processing unit 230C. Accordingly, the corrected steering end angle $\theta_{endc}$ which is a final steering end angle $\theta_{end}$ used to calculate the limiting axial force AF4 changes slowly to the steering end angle $\theta_{end}$ calculated by the steering end angle calculating unit 101 with time. That is, it is possible to curb quick change of the value of the corrected steering end angle $\theta_{endc}$.

Accordingly, according to the eighth embodiment, the following advantages can be obtained in addition to the same advantages as in the first embodiment. It is possible to correct the steering end angle $\theta_{end}$ using an electrical signal (the steering angular velocity ω herein) which is a state variable in which the steering state is reflected without performing a determination process such as end determination of the steering wheel 11.

In addition, the same configuration as the corrected vehicle speed calculating unit 113 according to the first embodiment illustrated in FIG. 8 may be employed as the correction processing unit 230. In this case, the gain calculating unit 230B illustrated in FIG. 24 is provided instead of the determination unit 113A. The switch 113C receives the gain $G_c$ instead of the flag F3. The vehicle speed V is replaced with the steering end angle $\theta_{end}$ and the corrected vehicle speed $V_c$ is replaced with the corrected steering end angle $\theta_{endc}$. The upper limit value calculating unit 113D calculates an upper limit value for the change per operation cycle of the steering end angle $\theta_{end}$ instead of the upper limit value $V_{UL}$ for the change per operation cycle of the temporary vehicle speed value $V_{temp}$. The lower limit value calculating unit 113E calculates a lower limit value for the change per operation cycle of the steering end angle $\theta_{end}$ instead of the lower limit value $V_{LL}$ for the change per operation cycle of the temporary vehicle speed value $V_{temp}$. The determination unit 113G determines whether the change per operation cycle of the steering end angle $\theta_{end}$ is to be limited, and sets the value of the flag F4 indicating a determination result thereof. The guard processing unit 113H limits the change per operation cycle of the steering end angle $\theta_{end}$ instead of the temporary vehicle speed value $V_{temp}$ to the upper limit value or the lower limit value. In this case, the same advantages as in the first embodiment and the eighth embodiment as described above can also be obtained.

The same configuration as the correction processing unit 160 according to the third embodiment illustrated in FIG. 12 may be employed as the correction processing unit 230. In this case, the gain calculating unit 230B illustrated in FIG. 24 is provided instead of the end determining unit 162 and the determination unit 163. The speed increasing ratio ν is replaced with the steering end angle $\theta_{end}$ and the corrected speed increasing ratio $\nu_c$ is replaced with the corrected steering end angle $\theta_{endc}$. The upper limit value calculating unit 166 calculates an upper limit value for the change per operation cycle of the steering end angle $\theta_{end}$ instead of the upper limit value $\nu_{UL}$ for the change per operation cycle of the speed increasing ratio ν. The lower limit value calculating unit 113E calculates a lower limit value for the change per operation cycle of the steering end angle $\theta_{end}$ instead of the lower limit value $\nu_{LL}$ for the change per operation cycle of the speed increasing ratio ν. The guard processing unit 169 limits the change per operation cycle of the steering end angle $\theta_{end}$ instead of the speed increasing ratio ν to the upper limit value or the lower limit value. In this case, the same advantages as in the first embodiment and the eighth embodiment as described above can also be obtained.

Ninth Embodiment

A steering control device according to a ninth embodiment will be described below. This embodiment is different from the first embodiment in the configurations of the steering reaction force command value calculating unit 52.

Figure 25:
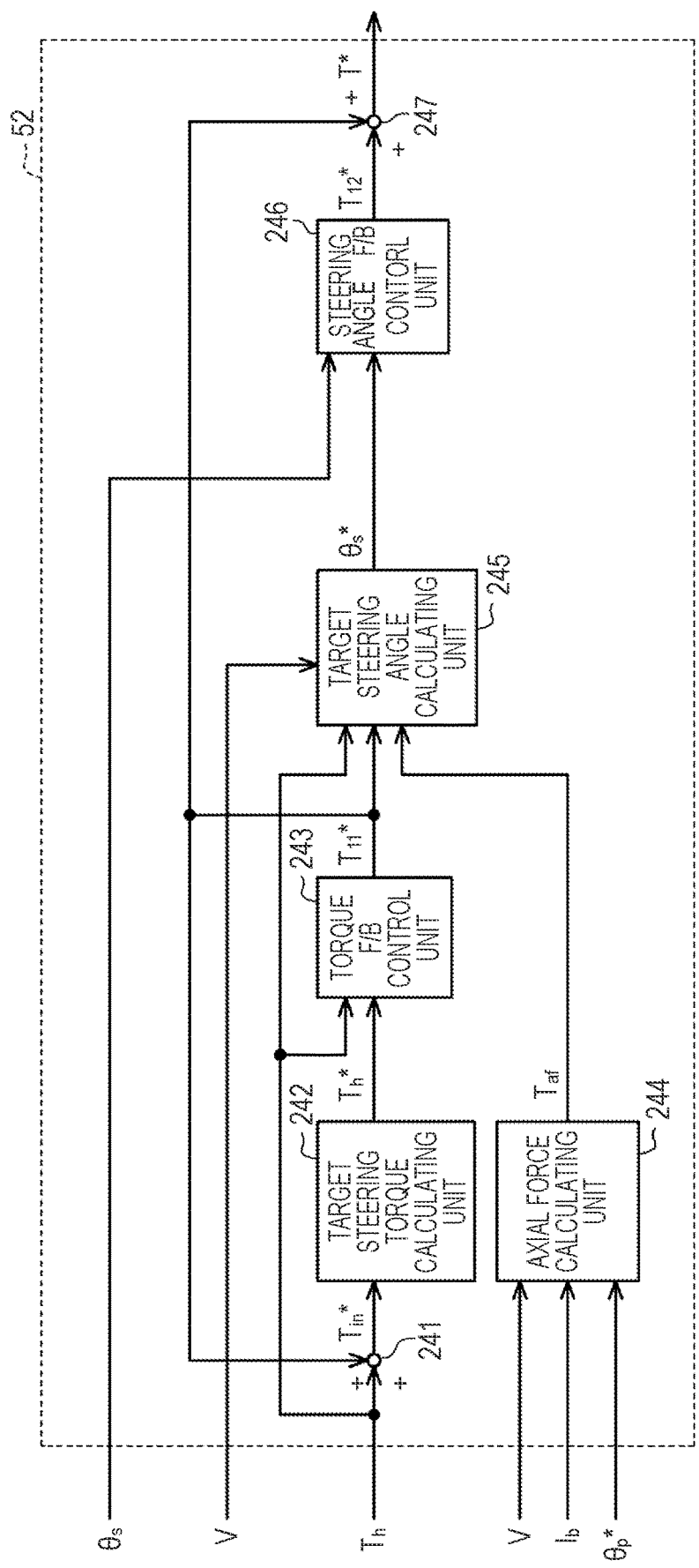
FIG. 25 is a block diagram illustrating a steering reaction force command value calculating unit according to a ninth embodiment.

As illustrated in FIG. 25, the steering reaction force command value calculating unit 52 includes an adder 241, a target steering torque calculating unit 242, a torque feedback control unit 243, an axial force calculating unit 244, a target steering angle calculating unit 245, a steering angle feedback control unit 246, and an adder 247.

The adder 241 calculates an input torque $T_{in}^*$ which is a torque applied to the steering shaft 12 by adding a first steering reaction force command value $T_{11}^*$ calculated by the torque feedback control unit 243 to the steering torque $T_h$ detected by the torque sensor 34.

The target steering torque calculating unit 242 calculates a target steering torque $T_h^*$ based on the input torque $T_{in}^*$ calculated by the adder 241. The target steering torque $T_h^*$ is a target value of the steering torque $T_h$ to be applied to the steering wheel 11. The target steering torque calculating unit 242 calculates the target steering torque $T_h^*$ such that the absolute value thereof increases as the absolute value of the input torque $T_{in}^*$ increases.

The torque feedback control unit 243 receives the steering torque $T_h$ detected by the torque sensor 34 and the target steering torque $T_h^*$ calculated by the target steering torque calculating unit 242. The torque feedback control unit 243 calculates the first steering reaction force command value $T_{11}^*$ through feedback control of the steering torque $T_h$ such that the steering torque $T_h$ detected by the torque sensor 34 conforms to the target steering torque $T_h^*$.

The axial force calculating unit 244 calculates an axial force acting on the turning shaft 14, for example, based on the pinion angle $\theta_p$, the value of the current $I_b$ of the turning motor 41, and the vehicle speed V, and calculates a converted torque value (that is, a steering reaction force based on the axial force) $T_{af}$ by converting the calculated axial force to a torque.

The target steering angle calculating unit 245 receives the steering torque $T_h$ detected by the torque sensor 34, the first steering reaction force command value $T_{11}^*$ calculated by the torque feedback control unit 243, the converted torque value $T_{af}$ calculated by the axial force calculating unit 244, and the vehicle speed V detected by the vehicle speed sensor 501. The target steering angle calculating unit 245 calculates a target steering angle $\theta_s^*$ of the steering wheel 11 based on the steering torque $T_h$, the first steering reaction force command value $T_{11}^*$, the converted torque value $T_{af}$, and the vehicle speed V.

The target steering angle calculating unit 245 calculates a final input torque $T_{in}^*$ for the steering wheel 11 by subtracting the converted torque value $T_{af}$ (the steering reaction force based on the axial force) from the input torque $T_{in}^*$ which is the sum of the first steering reaction force command value $T_{11}^*$ and the steering torque $T_h$. The target steering angle calculating unit 245 calculates the target steering angle $\theta_s^*$ based on the final input torque $T_{in}^*$ and an ideal model expressed by the following Expression (A6). The ideal model is obtained by modeling the steering angle of the steering wheel 11 corresponding to an ideal turning angle based on the input torque $T_{in}^*$ based on the premise of a steering system in which the steering wheel 11 is mechanically connected to the turning wheels 16 and 16.

$$T_{in}^* = J\theta_s'' + C\theta_s' + K\theta_s \qquad (A6)$$

Here, "J" represents an inertia coefficient corresponding to a moment of inertia of the steering wheel 11 and the steering shaft 12, "C" represents a viscosity coefficient (friction coefficient) corresponding to friction or the like of the turning shaft 14 against the housing, and "K" represents a spring coefficient when the steering wheel 11 and the steering shaft 12 are considered as springs. The viscosity coefficient C and the inertia coefficient J have values based on the vehicle speed V. "$\theta_s''$" is a second-order differential value of the steering angle $\theta_s$, and "$\theta_s'$" is a first-order differential value of the steering angle $\theta_s$.

The steering angle feedback control unit 246 receives the steering angle $\theta_s$ calculated by the steering angle calculating unit 51 and the target steering angle $\theta_s^*$ calculated by the target steering angle calculating unit 245. The steering angle feedback control unit 246 calculates a second steering reaction force command value $T_{12}^*$ through feedback control of the steering angle $\theta_s$ such that the actual steering angle $\theta_s$ calculated by the steering angle calculating unit 51 conforms to the target steering angle $\theta_s^*$.

The adder 247 calculates a steering reaction force command value $T^*$ by adding the second steering reaction force command value $T_{12}^*$ calculated by the steering angle feedback control unit 246 to the first steering reaction force command value $T_{11}^*$ calculated by the torque feedback control unit 243.

Figure 26:
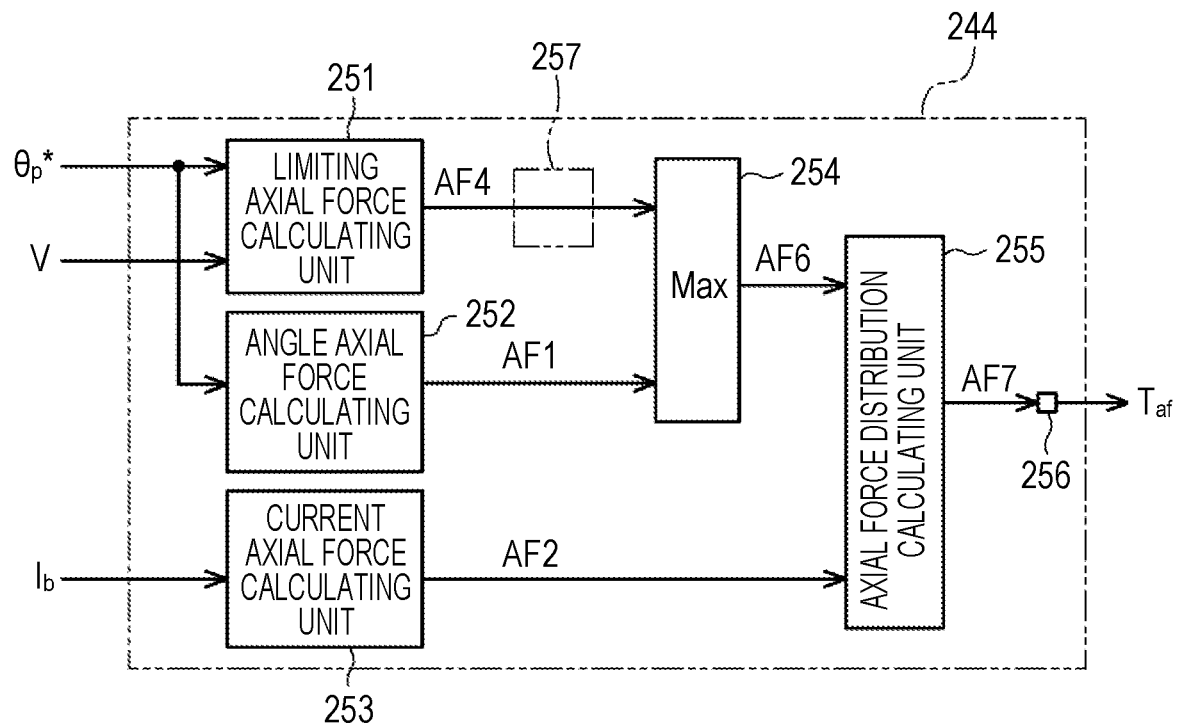
FIG. 26 is a block diagram illustrating an axial force calculating unit according to the ninth embodiment.

The axial force calculating unit 244 will be described below in detail. As illustrated in FIG. 26, the axial force calculating unit 244 includes a limiting axial force calculating unit 251, an angle axial force calculating unit 252, a current axial force calculating unit 253, a maximum value selecting unit 254, an axial force distribution calculating unit 255, and a converter 256.

The limiting axial force calculating unit 251 calculates a limiting axial force AF4 based on the target pinion angle $\theta_p^*$ calculated by the target pinion angle calculating unit. The limiting axial force calculating unit 251 calculates the limiting axial force AF4 using a map M11 stored in the storage device of the control device 50.

Figure 27:
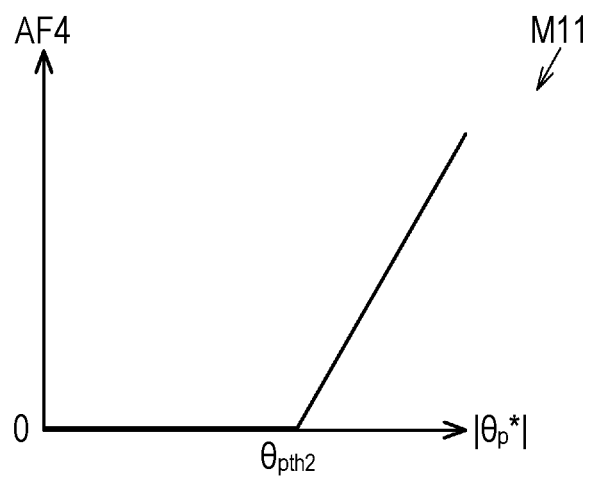
FIG. 27 is a graph illustrating a map for defining a relationship between a target pinion angle and a limiting axial force according to the ninth embodiment.

As illustrated in FIG. 27, the map M11 is a two-dimensional map in which a relationship between the target pinion angle $\theta_p^*$ and the limiting axial force AF4 is defined, and has the following characteristics. That is, when the absolute value of the target pinion angle $\theta_p^*$ is equal to or less than a threshold value $\theta_{pth2}$, the value of the limiting axial force AF4 is maintained at "0." When the absolute value of the target pinion angle $\theta_p^*$ is greater than the threshold value $\theta_{pth2}$, the value of the limiting axial force AF4 increases quickly with the increase of the absolute value of the target pinion angle $\theta_p^*$.

The limiting axial force calculating unit 251 may calculate the limiting axial force AF4 based on the target pinion angle $\theta_p^*$ calculated by the target pinion angle calculating unit and the vehicle speed V detected by the vehicle speed sensor 501.

The angle axial force calculating unit 252 has the same function as the angle axial force calculating unit 91 according to the first embodiment illustrated in FIG. 4. The angle axial force calculating unit 252 calculates the angle axial force AF1 which is an ideal value of the axial force acting on the turning shaft 14 based on the target pinion angle $\theta_p^*$.

The current axial force calculating unit 253 has the same function as the current axial force calculating unit 92 according to the first embodiment illustrated in FIG. 4. The current axial force calculating unit 253 calculates a current axial force AF2 acting on the turning shaft 14 based on the value of the current $I_b$ of the turning motor 41.

The maximum value selecting unit 254 receives the limiting axial force AF4 calculated by the limiting axial force calculating unit 251 and the angle axial force AF1 calculated by the angle axial force calculating unit 252. The maximum value selecting unit 254 selects an axial force with the larger absolute value of the limiting axial force AF4 and the angle axial force AF1, and sets the selected limiting axial force AF4 or angle axial force AF1 as a selected axial force AF6.

The axial force distribution calculating unit 255 has the same function as the axial force distribution calculating unit 93 according to the first embodiment illustrated in FIG. 4. The axial force distribution calculating unit 255 individually sets distribution proportions for the selected axial force AF6 and the current axial force AF2 based on various state variables in which the vehicle behavior, the steering state, or the road surface state is reflected. The axial force distribution calculating unit 255 calculates a combined axial force AF7 by summing values obtained by multiplying the distribution proportions individually set for the selected axial force AF6 and the current axial force AF2.

The converter 256 calculates a converted torque value $T_{af}$ by converting the combined axial force AF7 calculated by the axial force distribution calculating unit 255 to a torque. Based on the premise of this configuration, as indicated by a two-dot chain line in FIG. 26, a correction processing unit 257 that corrects the limiting axial force AF4 calculated by the limiting axial force calculating unit 251 is provided in the axial force calculating unit 244. The correction processing unit 257 has the same configuration as the correction processing unit 160 according to the third embodiment illustrated in FIG. 12. The speed increasing ratio ν is replaced with the limiting axial force AF4, and the corrected speed increasing ratio $ν_c$ is replaced with a corrected limiting axial force. The upper limit value calculating unit 166 calculates an upper limit value for a change per operation cycle of the limiting axial force AF4 instead of the upper limit value $ν_{UL}$ for the change per operation cycle of the speed increasing ratio ν. The lower limit value calculating unit 113E calculates a lower limit value for the change per operation cycle of the limiting axial force AF4 instead of the lower limit value $ν_{LL}$ for the change per operation cycle of the speed increasing ratio ν. The guard processing unit 169 limits the change per operation cycle of the limiting axial force AF4 instead of the speed increasing ratio ν to the upper limit value or the lower limit value. In this case, the same advantages as in the first embodiment can also be obtained.

Other Embodiments

The aforementioned embodiments may be modified as follows. In the aforementioned embodiments, a clutch may be provided in the steering system 10. In this case, as indicated by a two-dot chain line in FIG. 1, the steering shaft 12 and the pinion shaft 13 are connected to each other via the clutch 21. An electromagnetic clutch that performs connection/disconnection of power by controlling supply of electric power to an excitation coil is employed as the clutch 21. The control device 50 performs connection/disconnection control that the clutch 21 switches between engagement and disengagement. When the clutch 21 is disengaged, power transmission between the steering wheel 11 and the turning wheels 16 is mechanically cut off. When the clutch 21 is engaged, the power transmission between the steering wheel 11 and the turning wheels 16 is mechanically set up.

In the aforementioned embodiments, the steering system 10 may be a lateral independence type steering system that independently turn two right and left turning wheels with respect to the traveling direction of the vehicle. The steering system 10 may be configured as a four-wheel independence type steering system that independently turn four turning wheels in a four-wheel-drive vehicle.

What is claimed is:

1. A steering control device configured to control a reaction motor that generates a steering reaction force applied to a steering wheel of a steer-by-wire steering system in which power transmission between the steering wheel and turning wheels is cut off, the steering control device comprising:
a first processor configured to change a virtual operation range of the steering wheel according to a steering state or a vehicle state by controlling the reaction motor; and
a second processor configured to change a degree of change of the virtual operation range of the steering wheel when an operation position of the steering wheel reaches a position at or within a predetermined threshold of a limit position of the virtual operation range, wherein
the first processor is configured to calculate a limit value of the virtual operation range of the steering wheel according to a value of a vehicle speed,
the second processor is configured to fix the value of the vehicle speed which is used to calculate the limit value when the operation position of the steering wheel reaches the position at or within the predetermined threshold of the limit position of the virtual operation range, and
the second processor is configured to non-instantaneously change the value of the vehicle speed which is used to calculate the limit value of the virtual operation range of the steering wheel to a current value of the vehicle speed which is detected by a vehicle speed sensor when the operation position of the steering wheel becomes no longer within the predetermined threshold of the limit position of the virtual operation range.

2. The steering control device according to claim 1, wherein
the first processor is configured to calculate the limit value of the virtual operation range of the steering wheel by dividing a rotation angle of a shaft which rotates with a turning operation of the turning wheels by a speed increasing ratio between the steering wheel and the shaft which is calculated based on the vehicle speed, and
the second processor is configured to limit a change per unit time of the speed increasing ratio which is used to calculate the limit value when the operation position of the steering wheel reaches the position at or within the predetermined threshold of the limit position of the virtual operation range.

3. The steering control device according to claim 2, wherein the second processor is configured to non-instantaneously change a value of the speed increasing ratio which is used to calculate the limit value of the virtual operation range of the steering wheel to a current value of the speed increasing ratio which is calculated by the first processor when the operation position of the steering wheel becomes no longer within the predetermined threshold of the limit position of the virtual operation range.

4. A steering control device configured to control a reaction motor that generates a steering reaction force applied to a steering wheel of a steer-by-wire steering system in which power transmission between the steering wheel and turning wheels is cut off, the steering control device comprising:
a first processor configured to change a virtual operation range of the steering wheel according to a steering state or a vehicle state by controlling the reaction motor; and
a second processor configured to change a degree of change of the virtual operation range of the steering wheel when an operation position of the steering wheel reaches a position at or within a predetermined threshold of a limit position of the virtual operation range, wherein
the first processor is configured to calculate a limit value of the virtual operation range of the steering wheel according to a value of a vehicle speed,
the second processor is configured to limit a change per unit time of the limit value calculated by the first processor when the steering wheel is held at a constant steering angle with respect to a neutral position of the steering wheel, and the second processor is configured to non-instantaneously change the limit value of the virtual operation range of the steering wheel to a current limit value which is calculated by the first processor when a state in which the steering wheel is held at the constant steering angle with respect to the neutral position of the steering wheel is released.

5. A steering control device configured to control a reaction motor that generates a steering reaction force applied to a steering wheel of a steer-by-wire steering system in which power transmission between the steering wheel and turning wheels is cut off, the steering control device comprising:
- a first processor configured to change a virtual operation range of the steering wheel according to a steering state or a vehicle state by controlling the reaction motor;
- a second processor configured to change a degree of change of the virtual operation range of the steering wheel when an operation position of the steering wheel reaches a position at or within a predetermined threshold of a limit position of the virtual operation range; and
- a third processor configured to calculate a limiting axial force which is an axial force of a turning shaft that turns the turning wheels which is reflected in the steering reaction force to virtually limit the operation of the steering wheel based on a target rotation angle of a shaft which rotates with the operation of the turning shaft and a vehicle speed, wherein
the second processor is configured to limit a change per unit time of the limiting axial force calculated by the third processor when the operation position of the steering wheel reaches the position at or within the predetermined threshold of the limit position of the virtual operation range, and
the second processor is configured to non-instantaneously change a value of the limiting axial force which is reflected in the steering reaction force to the current limiting axial force which is calculated by the third processor when the operation position of the steering wheel becomes no longer within the predetermined threshold of the limit position of the virtual operation range.

* * * * *